United States Patent
Liu et al.

(10) Patent No.: US 12,028,300 B2
(45) Date of Patent: Jul. 2, 2024

(54) METHOD, APPARATUS, AND SYSTEM FOR SENDING PICTURES AFTER THUMBNAIL SELECTIONS

(71) Applicant: HUAWEI TECHNOLOGIES CO., LTD., Guangdong (CN)

(72) Inventors: Min Liu, Nanjing (CN); Zhong Du, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/927,425

(22) PCT Filed: May 26, 2021

(86) PCT No.: PCT/CN2021/095981
§ 371 (c)(1),
(2) Date: Nov. 23, 2022

(87) PCT Pub. No.: WO2021/238967
PCT Pub. Date: Dec. 2, 2021

(65) Prior Publication Data
US 2023/0208790 A1 Jun. 29, 2023

(30) Foreign Application Priority Data
May 29, 2020 (CN) .......................... 202010473781.1

(51) Int. Cl.
*H04L 51/10* (2022.01)
*G06F 3/04817* (2022.01)
(Continued)

(52) U.S. Cl.
CPC .......... *H04L 51/10* (2013.01); *G06F 3/04817* (2013.01); *G06F 3/04842* (2013.01); *H04L 51/58* (2022.05)

(58) Field of Classification Search
CPC . G06F 3/04817; G06F 3/04842; H04L 51/10; H04L 51/58
(Continued)

(56) References Cited

U.S. PATENT DOCUMENTS 9,116,596 B2 8/2015 Roman et al.
10,469,283 B1 11/2019 Kinney et al.
(Continued)

FOREIGN PATENT DOCUMENTS

CN 102916866 A 2/2013
CN 103037319 A 4/2013
(Continued)

OTHER PUBLICATIONS

Bluetooth (Reg. No. 2911905; U.S. Appl. No. 76/054,633; Dec. 21, 2004) (Year: 2004).*
(Continued)

*Primary Examiner* — David P Zarka
(74) *Attorney, Agent, or Firm* — HUAWEI TECHNOLOGIES CO., LTD.

(57) ABSTRACT

Embodiments of the present disclosure disclose a content sharing method, apparatus, and system. The method is applied to a first terminal. The first terminal generates a first picture in response to detecting a first operation; sends a first message to a second terminal via a near field connection, where the first message comprises a thumbnail of the first picture to indicate the second terminal to display a first prompt that comprises the thumbnail of the first picture; receives, from the second terminal, a second message corresponding to a second operation associated with the first prompt; and sends the first picture to the second terminal in response to the second message.

14 Claims, 42 Drawing Sheets

(51) Int. Cl.
*G06F 3/04842* (2022.01)
*H04L 51/58* (2022.01)

(58) Field of Classification Search
USPC ............................................................ 709/206
See application file for complete search history.

(56) References Cited

U.S. PATENT DOCUMENTS

| | | | |
|---|---|---|---|
| 2009/0074224 A1 | 3/2009 | Wright | |
| 2011/0128825 A1* | 6/2011 | Tanaka | G06T 3/40 368/29 |
| 2012/0069199 A1 | 3/2012 | Chang et al. | |
| 2013/0145287 A1 | 6/2013 | Jung et al. | |
| 2014/0087654 A1 | 3/2014 | Kiveisha et al. | |
| 2014/0228063 A1 | 8/2014 | Harris et al. | |
| 2015/0032889 A1 | 1/2015 | Chan et al. | |
| 2015/0065091 A1 | 3/2015 | Lee et al. | |
| 2015/0244770 A1* | 8/2015 | Yang | H04L 51/52 726/3 |
| 2015/0365453 A1 | 12/2015 | Cheng | |
| 2016/0026352 A1 | 1/2016 | Brown et al. | |
| 2017/0093833 A1 | 3/2017 | Sugaya | |
| 2017/0220311 A1 | 8/2017 | Oh et al. | |
| 2017/0244655 A1 | 8/2017 | Moon et al. | |
| 2017/0344253 A1 | 11/2017 | Zhang | |
| 2018/0063313 A1 | 3/2018 | Lee et al. | |
| 2018/0183881 A1 | 6/2018 | Lewis et al. | |
| 2018/0373398 A1 | 12/2018 | Seixeiro et al. | |
| 2019/0149863 A1 | 5/2019 | Lewis et al. | |
| 2019/0158725 A1* | 5/2019 | Shintani | H04N 23/63 |
| 2019/0188222 A1 | 6/2019 | Li et al. | |
| 2019/0313367 A1 | 10/2019 | Ryu et al. | |
| 2019/0364005 A1 | 11/2019 | Sun | |
| 2021/0185162 A1* | 6/2021 | Takahashi | G06F 1/169 |

FOREIGN PATENT DOCUMENTS

| | | |
|---|---|---|
| CN | 103108007 A | 5/2013 |
| CN | 103179156 A | 6/2013 |
| CN | 103257813 A | 8/2013 |
| CN | 102523346 B | 12/2013 |
| CN | 103634389 A | 3/2014 |
| CN | 103873657 A | 6/2014 |
| CN | 103888907 A | 6/2014 |
| CN | 104092749 A | 10/2014 |
| CN | 104094183 A | 10/2014 |
| CN | 104301777 A | 1/2015 |
| CN | 104661080 A | 5/2015 |
| CN | 104822128 A | 8/2015 |
| CN | 104866523 A | 8/2015 |
| CN | 105025164 A | 11/2015 |
| CN | 105049329 A | 11/2015 |
| CN | 105225457 A | 1/2016 |
| CN | 105518578 A | 4/2016 |
| CN | 105592193 A | 5/2016 |
| CN | 105812563 A | 7/2016 |
| CN | 105892977 A | 8/2016 |
| CN | 105975571 A | 9/2016 |
| CN | 106203186 A | 12/2016 |
| CN | 106210262 A | 12/2016 |
| CN | 106294798 A | 1/2017 |
| CN | 106332310 A | 1/2017 |
| CN | 106464571 A | 2/2017 |
| CN | 106488306 A | 3/2017 |
| CN | 106528617 A | 3/2017 |
| CN | 106604244 A | 4/2017 |
| CN | 107025059 A | 8/2017 |
| CN | 107769881 A | 3/2018 |
| CN | 103491119 B | 5/2018 |
| CN | 108616663 A | 10/2018 |
| CN | 108702602 A | 10/2018 |
| CN | 108924364 A | 11/2018 |
| CN | 109156041 A | 1/2019 |
| CN | 109275032 A | 1/2019 |
| CN | 109660842 A | 4/2019 |
| CN | 109862266 A | 6/2019 |
| CN | 110046013 A | 7/2019 |
| CN | 105578227 B | 8/2019 |
| CN | 110175082 A | 8/2019 |
| CN | 110199503 A | 9/2019 |
| CN | 110224920 A | 9/2019 |
| CN | 110377250 A | 10/2019 |
| CN | 110389736 A | 10/2019 |
| CN | 111010479 A | 4/2020 |
| CN | 111240547 A | 6/2020 |
| CN | 111404802 A | 7/2020 |
| CN | 112134788 A | 12/2020 |
| IN | 103916984 A | 7/2014 |
| IN | 109088815 A | 12/2018 |
| JP | 2002359670 A | 12/2002 |
| JP | 2009087063 A | 4/2009 |
| JP | 2010108448 A | 5/2010 |
| JP | 2014053692 A | 3/2014 |
| JP | 2015076816 A | 4/2015 |
| JP | 2016513398 A | 5/2016 |
| KR | 20170013190 A | 2/2017 |
| KR | 20170099330 A | 8/2017 |
| TW | 201033818 A | 9/2010 |
| TW | M502853 U | 6/2015 |
| WO | 2010050567 A1 | 5/2010 |
| WO | 2012157328 A1 | 11/2012 |
| WO | 2014088231 A1 | 6/2014 |
| WO | 2014200730 A1 | 12/2014 |
| WO | 2015063000 A1 | 5/2015 |
| WO | 2015196656 A1 | 12/2015 |
| WO | 2017097088 A1 | 6/2017 |
| WO | 2017163496 A1 | 9/2017 |
| WO | 2018104834 A1 | 6/2018 |
| WO | 2019186566 A1 | 10/2019 |
| WO | 2019213882 A1 | 11/2019 |
| WO | 2019222946 A1 | 11/2019 |
| WO | 2020042119 A1 | 3/2020 |
| WO | 2021164445 A1 | 8/2021 |

OTHER PUBLICATIONS

WI-FI (Reg. No. 4415824; U.S. Appl. No. 85/684,971; Oct. 8, 2013) (Year: 2013).*
Diana Roe, The Windows 10 system tray—How to show or hide icons!, Digitial Citizen, pp. 1-23 (2019) (Year: 2019).*
Ma Wanzheng et al., Associated Information Pushing System Based on Content image recognition, Shenzhen Cool Open Network Technology Co., Ltd., May 2018, with the English Abstract, 7 pages.
Tan Dong, Advanced Practice of Android Development, Published May 2020, Press Machinery Industry Press, with the English abstract and the related part, 4 pages.

* cited by examiner

TO

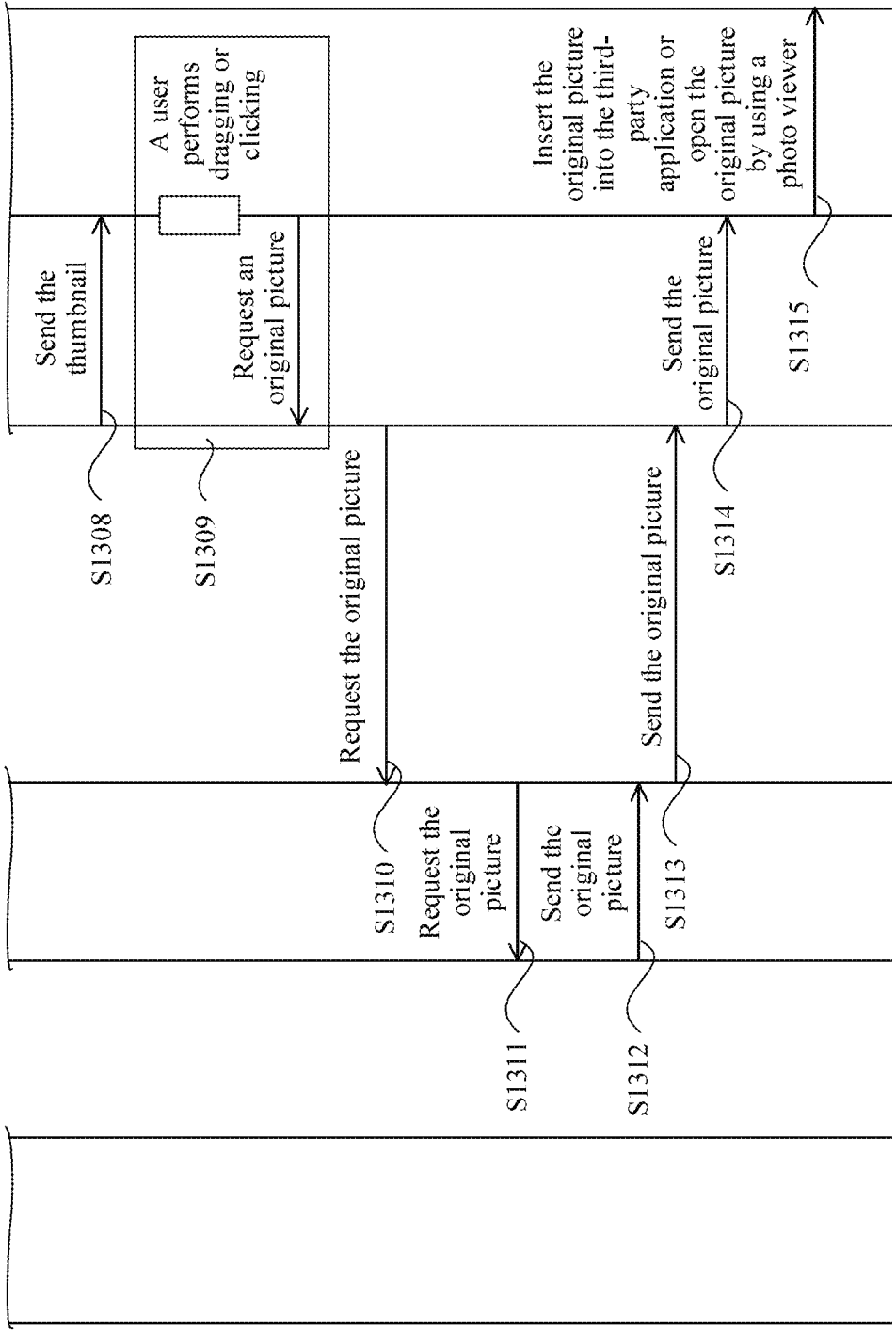

Content sharing apparatus

Picture receiving apparatus

METHOD, APPARATUS, AND SYSTEM FOR SENDING PICTURES AFTER THUMBNAIL SELECTIONS

CROSS-REFERENCE TO RELATED APPLICATIONS

This application is a national stage of International Application No. PCT/CN2021/095981, filed on May 26, 2021, which claims priority to Chinese Patent Application No. 202010473781.1, filed May 29, 2020. Both of the aforementioned applications are hereby incorporated by reference in their entireties.

This application claims priority to Chinese Patent Application No. 202010473781.1, filed with the China National Intellectual Property Administration on May 29, 2020 and entitled "CONTENT SHARING METHOD, APPARATUS, AND SYSTEM", which is incorporated herein by reference in its entirety.

TECHNICAL FIELD

This application relates to the communications field, and in particular, to a content sharing method, apparatus, and system.

BACKGROUND

With development of wireless communications technologies, terminals such as a smartphone and a tablet computer begin to support sending of content such as a picture, a video, and a document to another terminal, to improve efficiency and experience of sharing content by a user. For example, the user may share, with another device by using a wireless communications technology such as Bluetooth or Wi-Fi, a picture and a video that are taken by a smartphone.

Currently, if a user wants to share, with another terminal, content such as a picture that is taken, scanned, or captured on a terminal device such as a smartphone, an objective is usually achieved in the following manner: First, a first terminal device obtains a picture in a manner of photographing, scanning, or screen capture, and selects the picture in Gallery. Then, after establishing a connection to a second terminal device by using Bluetooth, Wi-Fi, or a third-party instant messaging application, the first terminal device sends the picture to the second terminal device.

It can be learned that in the foregoing content sharing manner, after the first terminal device obtains the picture through photographing, scanning, or screen capture, the user needs to perform a complex operation to send the picture to the second terminal device. This greatly reduces use efficiency of the terminal device.

SUMMARY

Embodiments of this application provide a content sharing method, apparatus, and system, to simplify an operation step in which a user shares content (such as a picture, a video, and a file), improve purposefulness of content sharing, and provide convenience for the user.

To achieve the foregoing objective, according to one aspect of this application, a content sharing method is provided and is applied to a first terminal. The method includes: The first terminal detects a first operation, and generates first content. The first terminal sends a first message to a second terminal in response to the generated first content. The first terminal and the second terminal are in a near field connection, and the first terminal and the second terminal have a predetermined association relationship. The first message is used to enable the second terminal to display a first prompt when the second terminal detects a second operation. The first prompt is a prompt for the first content. The first terminal sends the first content to the second terminal in response to a second message. The second message is a message sent by the second terminal to the first terminal after the second terminal detects a third operation on the first prompt.

According to this solution, in an entire content sharing process, in addition to an operation of generating content, the first terminal can share, without any other operation, the content with a nearby device that needs the content. This provides convenience for a user, improves purposefulness of content sharing, and improves user experience.

In an implementation, the first content is a picture, and the picture is from a photographing application, a scanning application, or a screen capture application. In this way, the first terminal can conveniently and quickly share the generated picture with a nearby device that needs the picture. This improves picture sharing efficiency.

In an implementation, the first message includes a picture thumbnail, and the first prompt includes a picture thumbnail notification box. The picture thumbnail notification box includes a thumbnail of the picture. In this way, the picture thumbnail is sent to another device, and the another device can intuitively display information about the to-be-received picture, so that the user performs a subsequent operation.

In an implementation, the third operation includes a detected tap operation on the thumbnail in the picture thumbnail notification box; a detected tap operation on a download button, where the thumbnail notification box includes the download button; or a detected drag operation on the thumbnail in the picture thumbnail notification box. This provides a plurality of optional operations for the user, and improves user experience.

In an implementation, the second message is a message for requesting the picture. In this way, the user can obtain an original picture of the picture.

In an implementation, the first message is a message indicating that the picture is to be received. That the first message enables the second terminal to display a first prompt when the second terminal detects a second operation includes: The first message enables the second terminal to send a picture thumbnail request message to the first terminal when the second terminal detects the second operation. The first terminal sends a thumbnail of the picture to the second terminal in response to the picture thumbnail request message, and the second terminal displays the first prompt that includes a thumbnail notification box. In this way, after obtaining the picture, the first device does not directly send the thumbnail to another device, but sends the thumbnail to the another device only after the another device requests the thumbnail. This can save network resources, and avoid pushing the thumbnail to another device that does not need the picture.

In an implementation, the picture thumbnail request message includes a picture thumbnail request message that is sent by the second terminal to the first terminal when the second terminal detects the second operation within first limited duration. This improves timeliness of sending the picture thumbnail request message when the second operation is detected, and improves user experience.

In an implementation, the near field connection includes a Bluetooth connection or a Wi-Fi connection. The association relationship includes: A device account of the first terminal is the same as a device account of the second terminal, or a device account of the second terminal is in a sharing device list of the first terminal. The sharing device list is a set of device accounts. In this way, data is transmitted by using Bluetooth or Wi-Fi, to improve transmission efficiency. The user can share the content with a specified device based on a setting of the user, to improve purposefulness of content sharing.

In an implementation, the first prompt includes a first prompt displayed by the second terminal when the second terminal detects the second operation within second limited duration. This improves timeliness of displaying the first prompt when the second operation is detected, and improves user experience.

In an implementation, the second message includes a message sent by the second terminal to the first terminal after the second terminal detects the third operation on the first prompt within third limited duration. This improves timeliness of detecting the third operation on the first prompt, and improves user experience.

In an implementation, before the first terminal detects the first operation and generates the first content, the method further includes: The first terminal detects the first operation and generates second content. The first terminal sends a third message to the second terminal in response to the generated second content.

In an implementation, the first content is a first picture, and the second content is a second picture. The first message is a message indicating that the first picture is to be received, and the third message is a message indicating that the second picture is to be received. That the first message enables the second terminal to display a first prompt when the second terminal detects a second operation includes: The first message enables the second terminal to send a request message for a plurality of thumbnails to the first terminal when the second terminal detects the second operation. The first terminal sends a thumbnail of the first picture and a picture quantity to the second terminal in response to the request message for the plurality of thumbnails. The second terminal displays the first prompt that includes a thumbnail notification box. The thumbnail notification box includes the thumbnail of the first picture and the picture quantity.

In an implementation, the third operation includes a tap operation on a download button, where the thumbnail notification box includes the download button; or a drag operation on the thumbnail of the first picture. That the first terminal sends the first content to the second terminal in response to a second message includes: The first terminal sends the first picture and the second picture to the second terminal in response to the second message.

In an implementation, the third operation includes a tap operation on the thumbnail of the first picture. That the first terminal sends the first content to the second terminal in response to a second message includes: The first terminal sends a fourth message to the second terminal in response to the second message. The fourth message includes a thumbnail of the second picture, and the fourth message enables the second terminal to display a second prompt. The second prompt includes the thumbnail of the first picture and the thumbnail of the second picture. The first terminal sends the first picture to the second terminal in response to a fifth message. The fifth message is a message sent by the second terminal to the first terminal when the second terminal receives a fifth operation on the thumbnail of the first picture. In this way, the user can tap a thumbnail in a notification box with a plurality of thumbnails to expand and display the plurality of thumbnails, and the user can further perform an operation on one of the plurality of thumbnails to select a picture desired by the user. This improves user experience.

In an implementation, the first content includes a video, a text, or a file. In this way, the user can purposefully share content, for example, a video, a text, or a downloaded file, with another nearby device, to improve user experience.

According to another aspect of this application, a first terminal is provided and includes one or more processors and one or more memories. The one or more memories store one or more computer programs, and the one or more computer programs include instructions. When the instructions are executed by the one or more processors, the first terminal is enabled to perform the following steps: detecting a first operation, generating first content, and sending a first message to a second terminal in response to the generated first content. The first terminal and the second terminal are in a near field connection state, and the first terminal and the second terminal have a predetermined association relationship. The first message enables the second terminal to display a first prompt when the second terminal detects a second operation. The first prompt is a prompt for the first content. The first terminal sends the first content to the second terminal in response to a second message. The second message is a message sent by the second terminal to the first terminal after the second terminal detects a third operation on the first prompt.

By using the terminal in the foregoing solution, in an entire content sharing process, in addition to an operation of generating content, the content can be shared, without any other operation, with a nearby device that needs the content. This provides convenience for a user, improves purposefulness of content sharing, and improves user experience.

In an implementation, the first content is a picture, and the picture is from a photographing application, a scanning application, or a screen capture application. In this way, the terminal can conveniently and quickly share the generated picture with a nearby device that needs the picture. This improves picture sharing efficiency.

In an implementation, the first message includes a picture thumbnail, and the first prompt includes a picture thumbnail notification box. The thumbnail notification box includes a thumbnail of the picture. In this way, the picture thumbnail is sent to another device, and the another device can intuitively display information about the to-be-received picture, so that the user performs a subsequent operation.

In an implementation, the third operation includes a detected tap operation on the thumbnail in the picture thumbnail notification box; a detected tap operation on a download button, where the thumbnail notification box includes the download button; or a detected drag operation on the thumbnail in the picture thumbnail notification box. This provides a plurality of optional operations for the user, and improves user experience.

In an implementation, the second message is a message for requesting the picture. In this way, the user can obtain an original picture of the picture.

In an implementation, the first message is a message indicating that the picture is to be received. That the first message enables the second terminal to display a first prompt when the second terminal detects a second operation includes: The first message enables the second terminal to send a picture thumbnail request message to the first terminal when the second terminal detects the second operation. The first terminal sends a thumbnail of the picture to the second terminal in response to the picture thumbnail request message, and the second terminal displays the first prompt that includes a thumbnail notification box. In this way, after obtaining the picture, the first terminal does not directly send the thumbnail to another device, but sends the thumbnail to the another device only after the another device requests the thumbnail. This can save network resources, and avoid pushing the thumbnail to another device that does not need the picture.

In an implementation, the picture thumbnail request message includes a picture thumbnail request message that is sent by the second terminal to the first terminal when the second terminal detects the second operation within first limited duration. This improves timeliness of sending the picture thumbnail request message when the second operation is detected, and improves user experience.

In an implementation, the near field connection includes a Bluetooth connection or a Wi-Fi connection. The association relationship includes: A device account of the first terminal is the same as a device account of the second terminal, or a device account of the second terminal is in a sharing device list of the first terminal. The sharing device list is a set of device accounts. In this way, data is transmitted by using Bluetooth or Wi-Fi, to improve transmission efficiency. The user can share the content with a specified device based on a setting of the user, to improve purposefulness of content sharing.

In an implementation, the first prompt includes a first prompt displayed by the second terminal when the second terminal detects the second operation within second limited duration. This improves timeliness of displaying the first prompt when the second operation is detected, and improves user experience.

In an implementation, the second message includes a message sent by the second terminal to the first terminal after the second terminal detects the third operation on the first prompt within third limited duration. This improves timeliness of detecting the third operation on the first prompt, and improves user experience.

In an implementation, the processor is further configured to: before the first terminal detects the first operation and generates the first content, detect the first operation and generate second content. The first terminal sends a third message to the first terminal in response to the generated second content.

In an implementation, the first content is a first picture, and the second content is a second picture. The first message is a message indicating that the first picture is to be received, and the third message is a message indicating that the second picture is to be received. That the first message enables the second terminal to display a first prompt when the second terminal detects a second operation includes: The first message enables the second terminal to send a request message for a plurality of thumbnails to the first terminal when the second terminal detects the second operation. The first terminal sends a thumbnail of the first picture and a picture quantity to the second terminal in response to the request message for the plurality of thumbnails. The second terminal displays the first prompt that includes a thumbnail notification box. The thumbnail notification box includes the thumbnail of the first picture and the picture quantity.

In an implementation, the third operation includes a tap operation on a download button, where the thumbnail notification box includes the download button; or a drag operation on the thumbnail of the first picture. That the first terminal sends the first content to the second terminal in response to a second message includes: The first terminal sends the first picture and the second picture to the second terminal in response to the second message.

In an implementation, the third operation includes a tap operation on the thumbnail of the first picture. That the first terminal sends the first content to the second terminal in response to a second message includes: The first terminal sends a fourth message to the second terminal in response to the second message. The fourth message includes a thumbnail of the second picture, and the fourth message enables the second terminal to display a second prompt. The second prompt includes the thumbnail of the first picture and the thumbnail of the second picture. The first terminal sends the first picture to the second terminal in response to a fifth message. The fifth message is a message sent by the second terminal to the first terminal when the second terminal receives a fifth operation on the thumbnail of the first picture. In this way, the user can tap a thumbnail in a notification box with a plurality of thumbnails to expand and display the plurality of thumbnails, and the user can further perform an operation on one of the plurality of thumbnails to select a picture desired by the user. This improves user experience.

In an implementation, the first content includes a video, a text, or a file. In this way, the user can purposefully share content, for example, a video, a text, or a downloaded file, with another nearby device, to improve user experience.

According to another aspect of this application, a content sharing system is provided and includes a first terminal and a second terminal. The first terminal and the second terminal are in a near field connection state, and the first terminal and the second terminal have a predetermined association relationship. The first terminal detects a first operation and generates first content. The first terminal sends a first message to the second terminal in response to the generated first content. The second terminal detects a second operation and displays a first prompt. The first prompt is a prompt for the first content. The second terminal detects a third operation on the first prompt and sends a second message to the first terminal. The first terminal sends the first content to the second terminal in response to the second message.

By using the content sharing system in the foregoing solution, in an entire content sharing process, in addition to an operation of generating content, the first terminal can share, without any other operation, the content with a nearby device that needs the content. The second terminal responds to and receives the content based on a requirement of the second terminal. This provides convenience for a user, improves purposefulness of content sharing, and improves user experience.

In an implementation, the first content is a picture, and the picture is from a photographing application, a scanning application, or a screen capture application. In this way, the terminal can conveniently and quickly share the generated picture with a nearby device that needs the picture. This improves picture sharing efficiency.

In an implementation, the first message includes a picture thumbnail, and the first prompt includes a picture thumbnail notification box. The thumbnail notification box includes a thumbnail of the picture. In this way, the picture thumbnail is sent to another device, and the another device can intuitively display information about the to-be-received picture, so that the user performs a subsequent operation.

In an implementation, the third operation includes a detected tap operation on the thumbnail in the picture thumbnail notification box; a detected tap operation on a download button, where the thumbnail notification box includes the download button; or a detected drag operation on the thumbnail in the picture thumbnail notification box.

This provides a plurality of optional operations for the user, and improves user experience.

In an implementation, the second message is a message for requesting the picture. In this way, the user can obtain an original picture of the picture.

In an implementation, the first message is a message indicating that the picture is to be received. That the first message enables the second terminal to display a first prompt when the second terminal detects a second operation includes: The first message enables the second terminal to send a picture thumbnail request message to the first terminal when the second terminal detects the second operation. The first terminal sends a thumbnail of the picture to the second terminal in response to the picture thumbnail request message, and the second terminal displays the first prompt that includes a thumbnail notification box. In this way, after obtaining the picture, the first terminal does not directly send the thumbnail to another device, but sends the thumbnail to the another device only after the another device requests the thumbnail. This can save network resources, and avoid pushing the thumbnail to another device that does not need the picture.

In an implementation, the picture thumbnail request message includes a picture thumbnail request message that is sent by the second terminal to the first terminal when the second terminal detects the second operation within first limited duration. This improves timeliness of sending the picture thumbnail request message when the second operation is detected, and improves user experience.

In an implementation, the near field connection includes a Bluetooth connection or a Wi-Fi connection. The association relationship includes: A device account of the first terminal is the same as a device account of the second terminal, or a device account of the second terminal is in a sharing device list of the first terminal. The sharing device list is a set of device accounts. In this way, data is transmitted by using Bluetooth or Wi-Fi, to improve transmission efficiency. The user can share the content with a specified device based on a setting of the user, to improve purposefulness of content sharing.

In an implementation, the first prompt includes a first prompt displayed by the second terminal when the second terminal detects the second operation within second limited duration. This improves timeliness of displaying the first prompt when the second operation is detected, and improves user experience.

In an implementation, the second message includes a message sent by the second terminal to the first terminal after the second terminal detects the third operation on the first prompt within third limited duration. This improves timeliness of detecting the third operation on the first prompt, and improves user experience.

In an implementation, the processor is further configured to: before the first terminal detects the first operation and generates the first content, detect the first operation and generate second content. The first terminal sends a third message to the first terminal in response to the generated second content.

In an implementation, the first content is a first picture, and the second content is a second picture. The first message is a message indicating that the first picture is to be received, and the third message is a message indicating that the second picture is to be received. That the first message enables the second terminal to display a first prompt when the second terminal detects a second operation includes: The first message enables the second terminal to send a request message for a plurality of thumbnails to the first terminal when the second terminal detects the second operation. The first terminal sends a thumbnail of the first picture and a picture quantity to the second terminal in response to the request message for the plurality of thumbnails. The second terminal displays the first prompt that includes a thumbnail notification box. The thumbnail notification box includes the thumbnail of the first picture and the picture quantity.

In an implementation, the third operation includes a tap operation on a download button, where the thumbnail notification box includes the download button; or a drag operation on the thumbnail of the first picture. That the first terminal sends the first content to the second terminal in response to a second message includes: The first terminal sends the first picture and the second picture to the second terminal in response to the second message.

In an implementation, the third operation includes a tap operation on the thumbnail of the first picture. That the first terminal sends the first content to the second terminal in response to a second message includes: The first terminal sends a fourth message to the second terminal in response to the second message. The fourth message includes a thumbnail of the second picture, and the fourth message enables the second terminal to display a second prompt. The second prompt includes the thumbnail of the first picture and the thumbnail of the second picture. The first terminal sends the first picture to the second terminal in response to a fifth message. The fifth message is a message sent by the second terminal to the first terminal when the second terminal receives a fifth operation on the thumbnail of the first picture. In this way, the user can tap a thumbnail in a notification box with a plurality of thumbnails to expand and display the plurality of thumbnails, and the user can further perform an operation on one of the plurality of thumbnails to select a picture desired by the user. This improves user experience.

In an implementation, the first content includes a video, a text, or a file. In this way, the user can purposefully share content, for example, a video, a text, or a downloaded file, with another nearby device, to improve user experience.

According to another aspect of this application, a computer program product is provided and includes instructions. When the computer program product runs on a first terminal, the first terminal is enabled to perform the method according to the first aspect.

According to another aspect of this application, a computer-readable storage medium is provided and includes instructions. When the instructions are run on a first terminal, the first terminal is enabled to perform the method according to the first aspect.

According to another aspect of this application, a chip is provided and is configured to execute instructions. When the chip runs, the chip performs the method according to the first aspect.

According to another aspect of this application, a content sharing apparatus is provided. The content sharing apparatus is disposed on a first terminal, and the content sharing apparatus includes: a generation unit, configured to detect a first operation and generate first content; and a sending unit, configured to send a first message to a second terminal in response to the generated first content. The first terminal and the second terminal are in a near field connection state, and the first terminal and the second terminal have a predetermined association relationship. The first message enables the second terminal to display a first prompt when the second terminal detects a second operation. The first prompt is a prompt for the first content. The sending unit is further configured to send the first content to the second terminal in response to a second message. The second message is a message sent by the second terminal to the first terminal after the second terminal detects a third operation on the first prompt.

BRIEF DESCRIPTION OF DRAWINGS

FIG. 5A-1 to FIG. 5H are UI diagrams of an embodiment corresponding to the flowchart 1 of this application;

FIG. 11A-1 to FIG. 11I are UI diagrams of an embodiment corresponding to the flowchart 3 of this application;

FIG. 13A and FIG. 13B are a diagram of message exchange between picture sharing system modules according to an embodiment of this application;

DESCRIPTION OF EMBODIMENTS

To facilitate understanding of this application, a concept of an apparatus in this application is first explained and described.

An apparatus in this application is a terminal device that has a communication transmission function. A plurality of APPs may be installed on the terminal device to provide different functions for a user. For example, the terminal device may take a picture by using a photographing APP. The terminal device may be a mobile phone, a computer, a watch, a tablet, a vehicle-mounted device, a wearable device, an industrial device, an artificial intelligence device, an augmented reality (augmented reality, AR) device, a virtual reality (virtual reality, VR) device, or the like.

Figure 1:
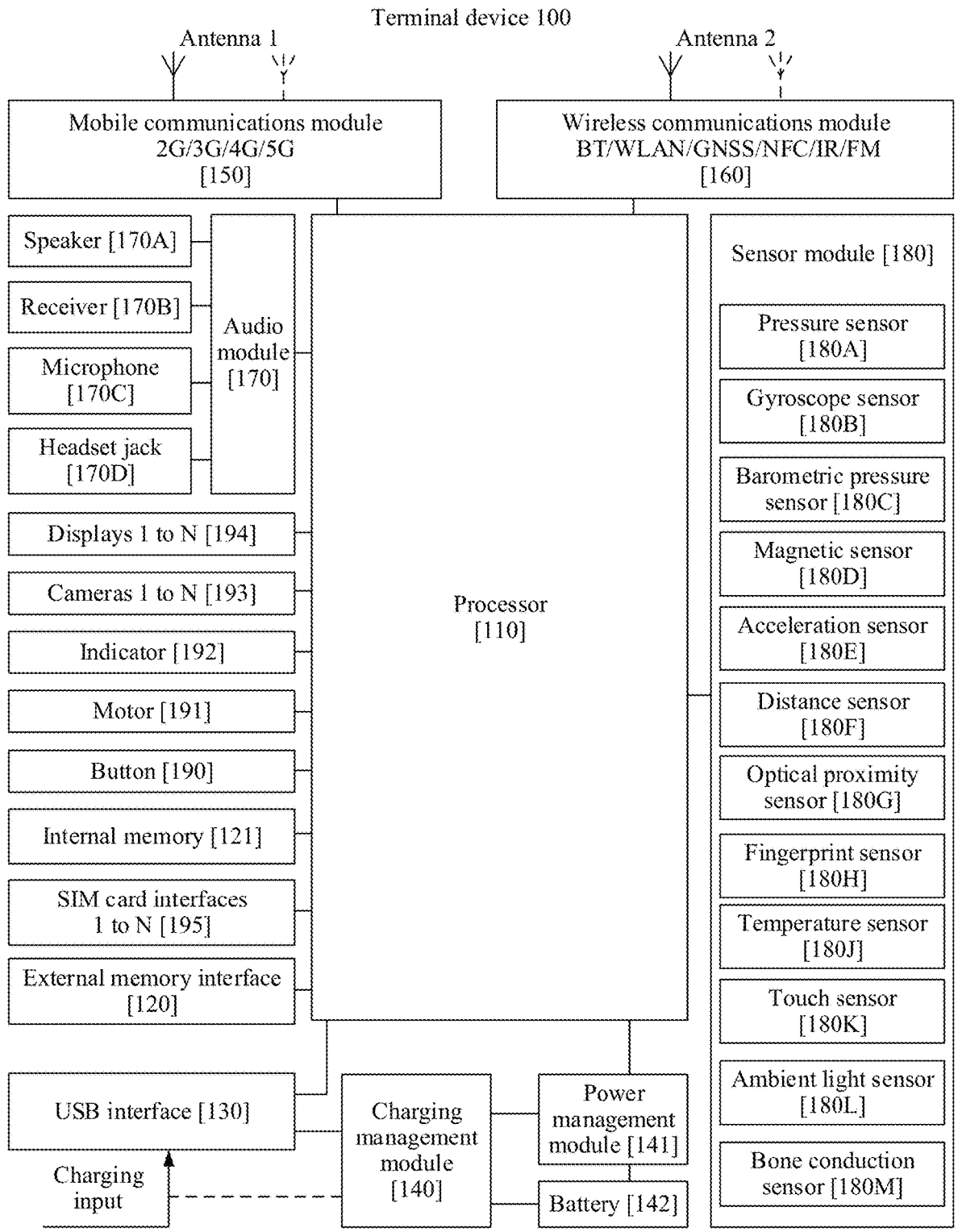
FIG. 1 is a schematic diagram of a structure of a terminal device according to an embodiment of this application.

The following describes a structure of the terminal device with reference to FIG. 1.

FIG. 1 is a schematic diagram of a structure of a terminal device according to an embodiment of this application. As shown in FIG. 1, a terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a two-way synchronous serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the terminal 100, or may be configured to transmit data between the terminal 100 and a peripheral device, or may be configured to connect to a headset, to play audio through the headset. The interface may be further configured to connect to another terminal such as an AR device.

It may be understood that the interface connection relationship between the modules shown in this embodiment of the present disclosure is merely an example for description, and does not constitute a limitation on the structure of the terminal 100. In some other embodiments of this application, the terminal 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communications solution that is applied to the terminal 100 and that includes 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the terminal 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the terminal 100 is coupled to the mobile communications module 150, and the antenna 2 is coupled to the wireless communications module 160, so that the terminal 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to a digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 can play or record videos in a plurality of coding formats, for example, moving picture experts group (moving picture experts group, MPEG)-1, MPEG-2, MPEG-3 and MPEG-4.

The NPU is a neural-network (neural-network, NN) computing processor. The NPU quickly processes input information by referring to a structure of a biological neural network, for example, by referring to a mode of transmission between human brain neurons, and may further continuously perform self-learning. The NPU can implement applications such as intelligent cognition of the terminal 100, such as image recognition, facial recognition, speech recognition, and text understanding.

The external memory interface 120 may be configured to connect to an external storage card, for example, a micro SD card, to extend a storage capability of the terminal 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the terminal 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) created during use of the terminal 100. In addition, the internal memory 121 may include a high-speed random access memory, or may include a nonvolatile memory, for example, at least one magnetic disk storage device, a flash memory, or a universal flash storage (universal flash storage, UFS).

The terminal 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode audio signals. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The terminal 100 may be used to listen to music or answer a call in a hands-free mode by using the speaker 170A.

The receiver 170B, also referred to as an "earpiece", is configured to convert an electrical audio signal into a sound signal. When a call is answered or voice information is received by using the terminal 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation by using the pressure sensor 180A. The terminal 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on the icon of Messages, an instruction for creating a new SMS message is executed.

The gyroscope sensor 180B may be configured to determine a motion posture of the terminal 100. In some embodiments, an angular velocity of the terminal 100 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the terminal 100 jitters, calculates, based on the angle, a distance for which a lens module needs to compensate, and allows a lens to cancel the jitter of the terminal 100 through reverse motion, to implement the image stabilization. The gyroscope sensor 180B may also be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall effect sensor. The terminal 100 may detect opening and closing of a flip cover by using the magnetic sensor 180D. In some embodiments, when the terminal 100 is a clamshell phone, the terminal 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitudes of accelerations of the terminal 100 in various directions (usually on three axes). A magnitude and a direction of gravity may be detected when the terminal 100 is still. The acceleration sensor 180E may further be configured to recognize a posture of the terminal, and is applied in an application such as a pedometer or screen switching between a landscape mode and a portrait mode.

The distance sensor 180F is configured to measure a distance. The terminal 100 may measure a distance in an infrared manner or a laser manner. In some embodiments, in a photographing scenario, the terminal 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The terminal 100 transmits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen for power saving. The optical proximity sensor 180G may also be used in a leather case mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may alternatively be disposed on a surface of the terminal 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 is compatible with different types of SIM cards. The SIM card interface 195 is also compatible with an external storage card. The terminal 100 interacts with a network by using the SIM card, to implement functions such as calling and data communication. In some embodiments, the terminal 100 uses an eSIM, namely, an embedded SIM card. The eSIM card may be embedded in the terminal 100, and cannot be separated from the terminal 100.

The terminal 100 may further include a magnetometer (not shown in the figure), which may also be referred to as an electronic compass or a compass, and may be configured to detect intensity and a direction of a magnetic field.

Based on the structure of the terminal device described above, the following further describes in detail a related background technology in this application.

A sharing process of a related technology in this application is described by using an example in which a terminal device takes a picture and shares the picture.

1. A user needs to open a camera application on the terminal to take a picture.

Figure 2A:
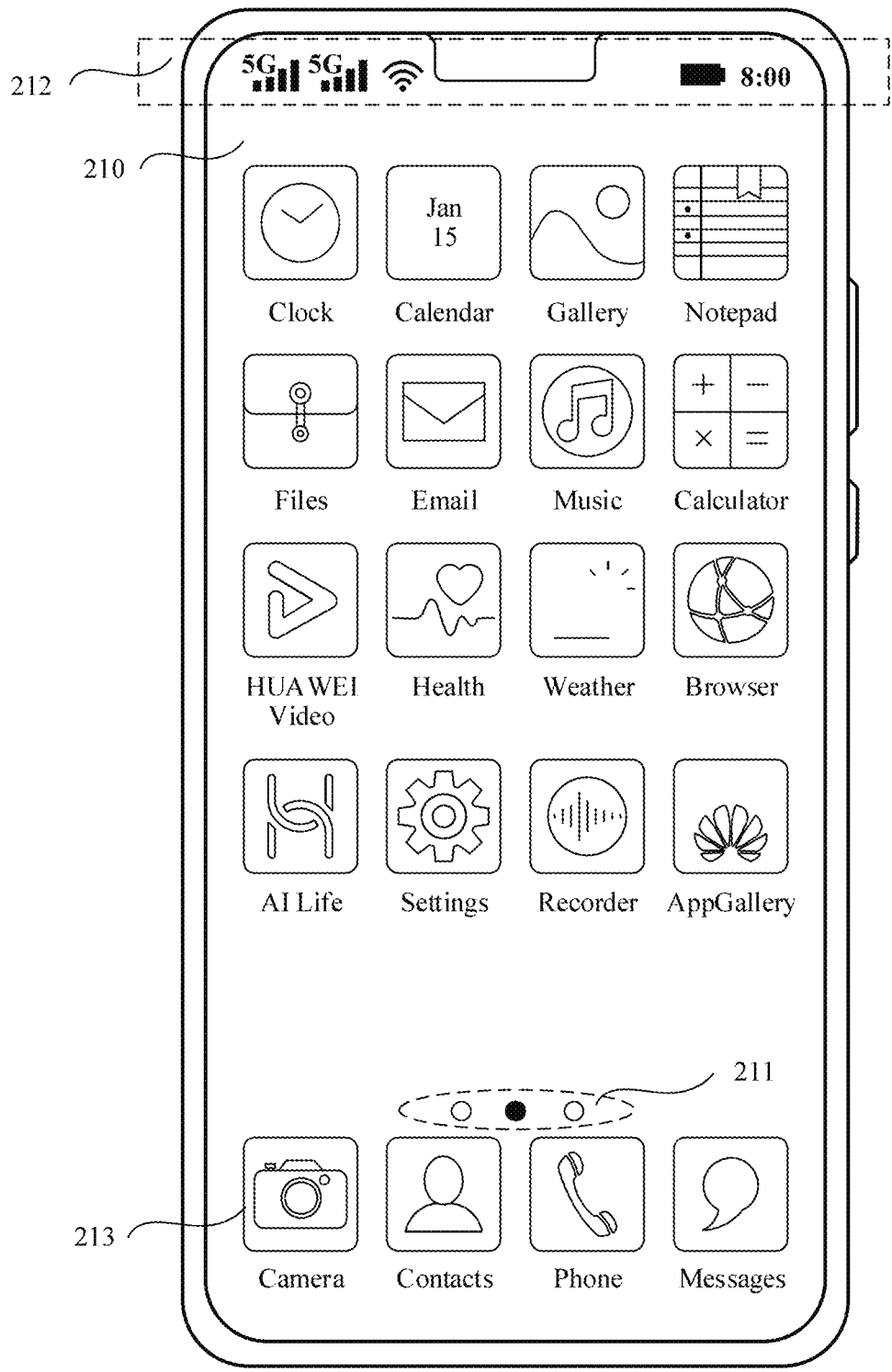
FIG. 2A to FIG. 2F are user interface (UI) diagrams of a sharing process of a related technology according to an embodiment of this application.

FIG. 2A shows an example of a home screen 210 displayed by a terminal such as a smartphone. The home screen 210 displays a page on which an application icon is placed. The page includes a plurality of icons (for example, an icon of Clock, an icon of Calendar, an icon of Gallery, an icon of Notepad, an icon of Files, an icon of Browser, and an icon of Camera). A page indicator 211 is further displayed below the plurality of application icons, to indicate a location relationship between the currently displayed page and another page. There are a plurality of tray icons below the page indicator, and the tray icons remain displayed when a page is switched. In some embodiments, the page may alternatively include a plurality of application icons and a page indicator. The page indicator may not be a part of the page, and may exist independently. The application icons are also optional. This is not limited in embodiments of this application. A status bar 212 is displayed in an upper part of the home screen 210. The status bar 212 may include one or more signal strength indicators of a mobile communication signal (which may also be referred to as a cellular signal), a battery status indicator, a time indicator, and the like. When the terminal enables a Bluetooth function, the status bar 212 may further display a Bluetooth enabling indicator. The user may perform an operation on the terminal by using a preset gesture, for example, backing to the home screen or displaying an opened application. A specific operation gesture is not limited in this application. The terminal may perform a related operation by using a virtual button or a physical button without being limited to the gesture operation. The user taps an icon 213 of Camera to enter an interface of Camera.

Figure 2B:
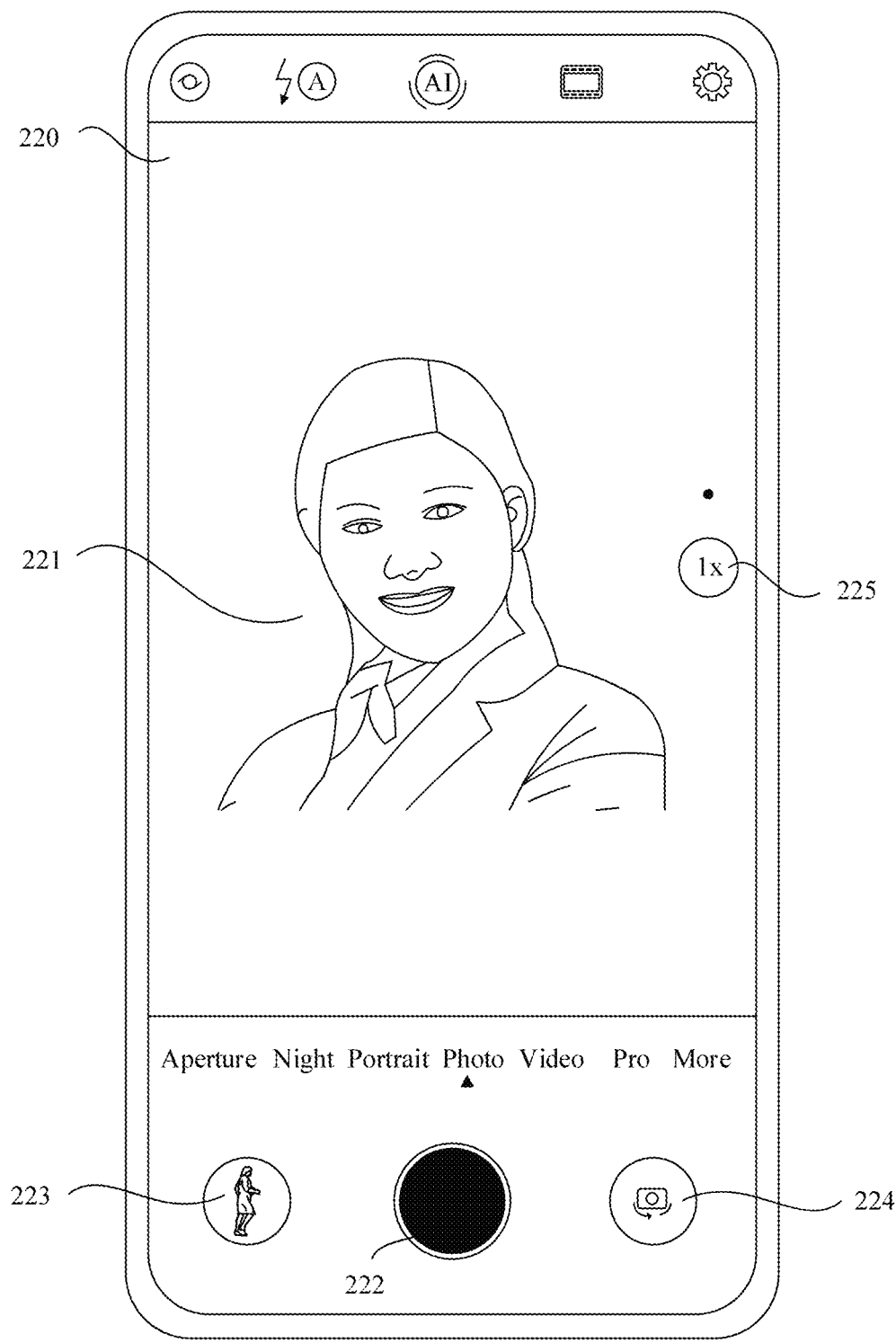

FIG. 2B shows an example of an interface 220 of Camera. The interface 220 includes a preview area 221 for a to-be-photographed object, a photographing button 222, a thumbnail button 223 for a latest picture in Gallery, a button 224 for switching between a front-facing camera and a rear-facing camera, and the like. The interface 220 of Camera further includes a camera focus adjustment button 225. The user may adjust a camera focus by performing a drag operation on the button 225.

The user may tap the photographing button 222 for photographing. After obtaining a picture in response to the operation, the terminal displays an interface of Camera shown in FIG. 2C. In this case, a thumbnail of the picture just taken is displayed in the thumbnail button 223 for the latest picture in Gallery.

2. The user selects the latest taken picture.

Figure 2C:

The user may tap the thumbnail button 223 for the latest picture in Gallery in FIG. 2C. In response to the operation, the terminal displays a picture display interface 240 shown in FIG. 2D.

Figure 2D:
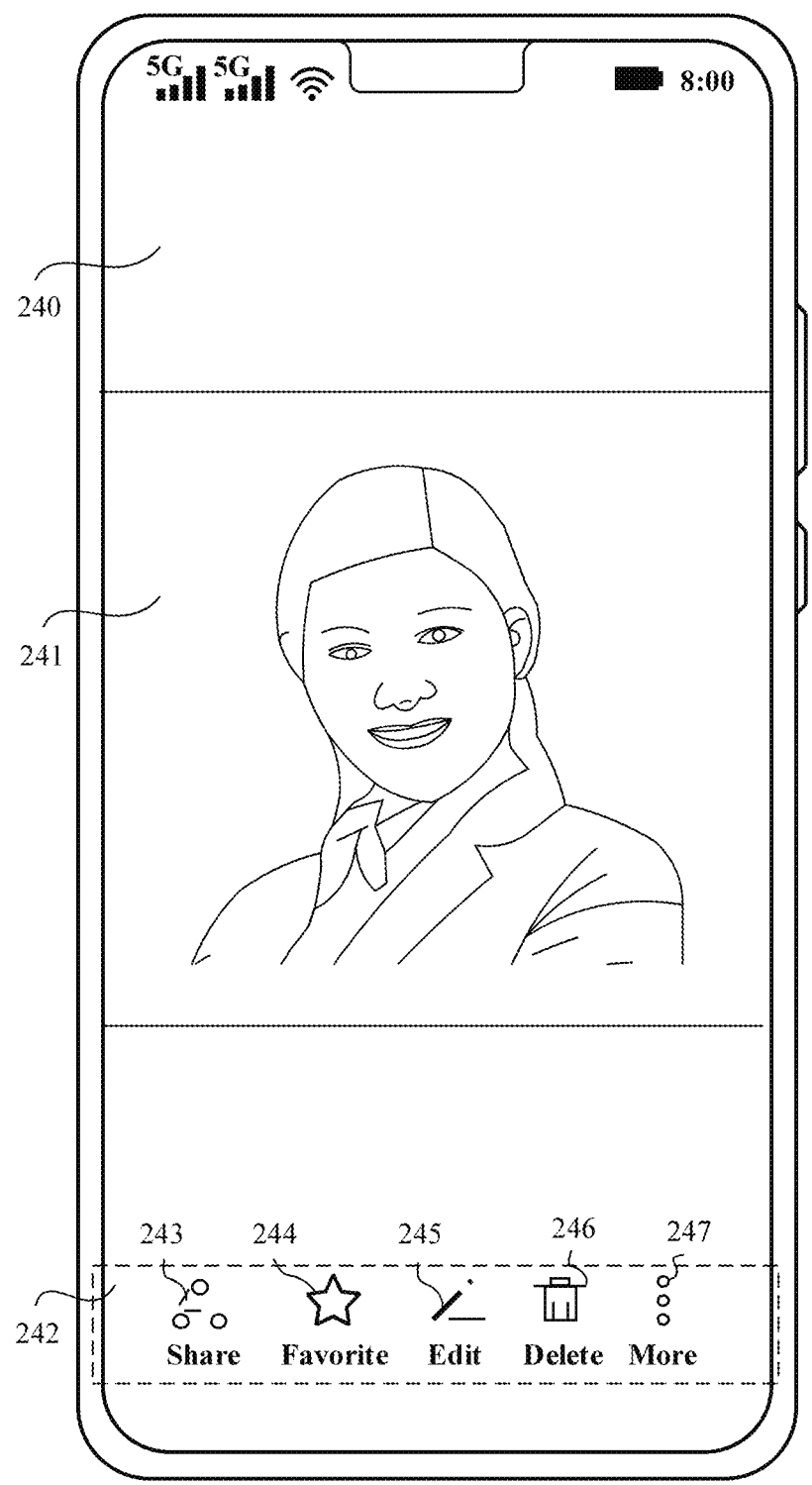

As shown in FIG. 2D, the picture display interface 240 displays a picture 241 and a menu 242. The menu 242 includes a "Share" button 243, a "Favorite" button 244, an "Edit" button 245, a "Delete" button 246, and a "More" button 247. The "Share" button 243 may be used to trigger opening of a picture sharing interface. The "Favorite" button 244 may be used to add the picture 241 to a favorites folder. The "Edit" button 245 may be used to trigger an editing function such as rotation, cropping, filtering, or blurring for the picture 241. The "Delete" button 246 may be used to trigger deletion of the picture 241. The "More" button 247 may be used to open more functions related to the picture.

3. The user taps the "Share" button on the picture display interface to open the picture sharing interface.

The terminal may receive an input operation (for example, a single tap) performed by the user on the "Share" button 243 in FIG. 2D. In response to the input operation, the terminal may display a file sharing interface 250 shown in FIG. 2E.

Figure 2E:
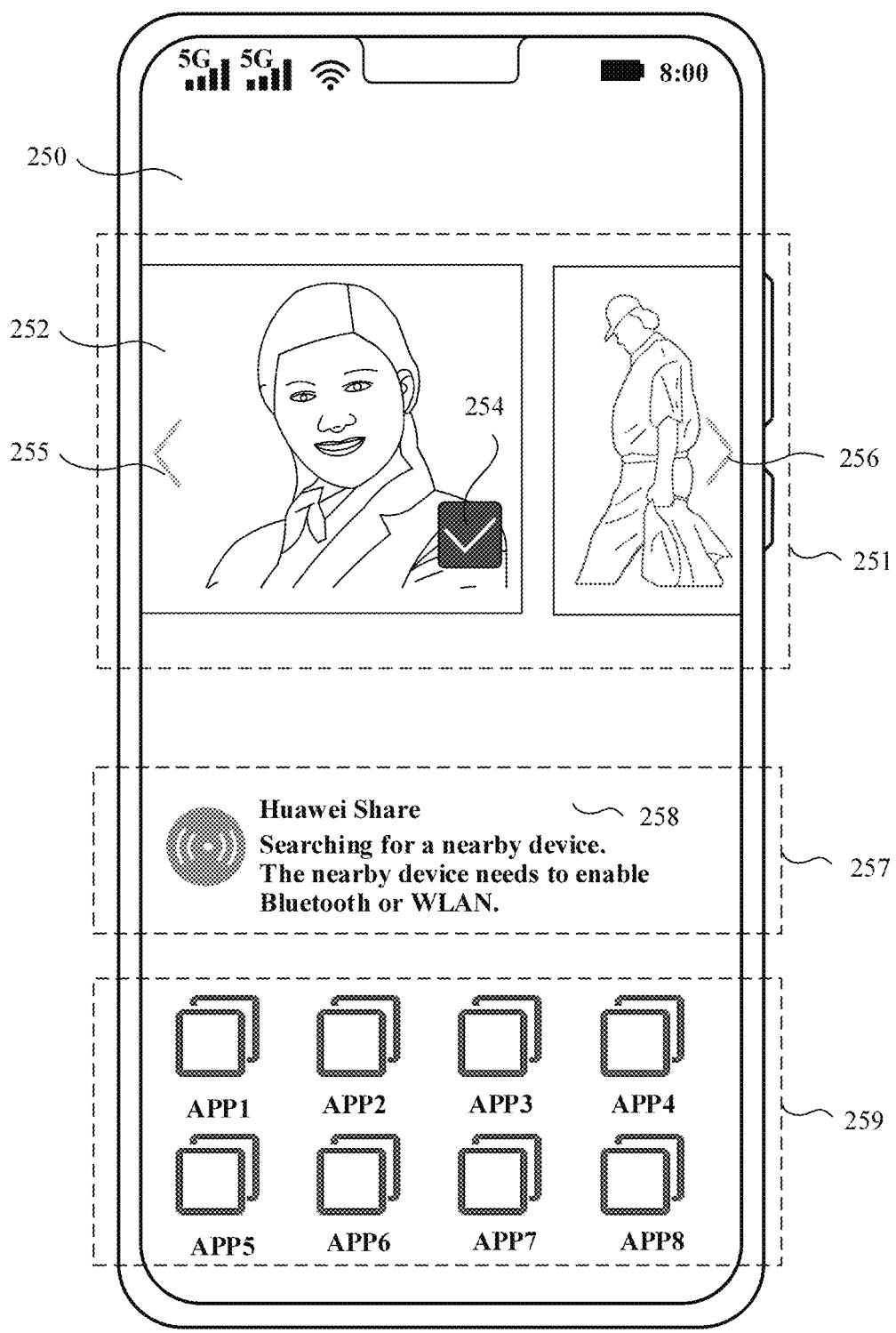

As shown in FIG. 2E, the file sharing interface 250 includes an area 251, an area 257, and an area 259.

The area 251 may be used to display one or more pictures or videos in Gallery, and the one or more pictures or videos may include a picture or a video selected by the user, for example, a selected picture 252. A mark 254 may be displayed on the selected picture 252, and the mark 254 may be used to indicate that the picture 252 corresponding to the mark 254 is selected by the terminal. A control 255 and a control 256 are further displayed in the area 251. The control 255 and the control 256 may be used to switch and update a picture displayed in the area 251. The picture or a video image that is displayed in the area 251 may be a thumbnail.

The area 257 may be used to display an option of a nearby device discovered by the terminal, and one or more user options. The user option corresponds to the nearby device discovered by the terminal. The terminal may display a search prompt 258 in the area 257 when searching for a nearby device.

One or more service options may be displayed in the area 259. An application corresponding to the service option may support sharing, with a contact or a server, of the picture selected by the user. The user may share data by using the application corresponding to the service option. For example, the user shares the selected picture with one or more contacts in WeChat. For another example, the user shares the selected picture with a dynamic publishing platform (namely, a server) of WeChat.

4. After the terminal finds the nearby device, the user may tap the option of the nearby device in the picture sharing interface, to share the selected picture with the nearby device.

Figure 2F:
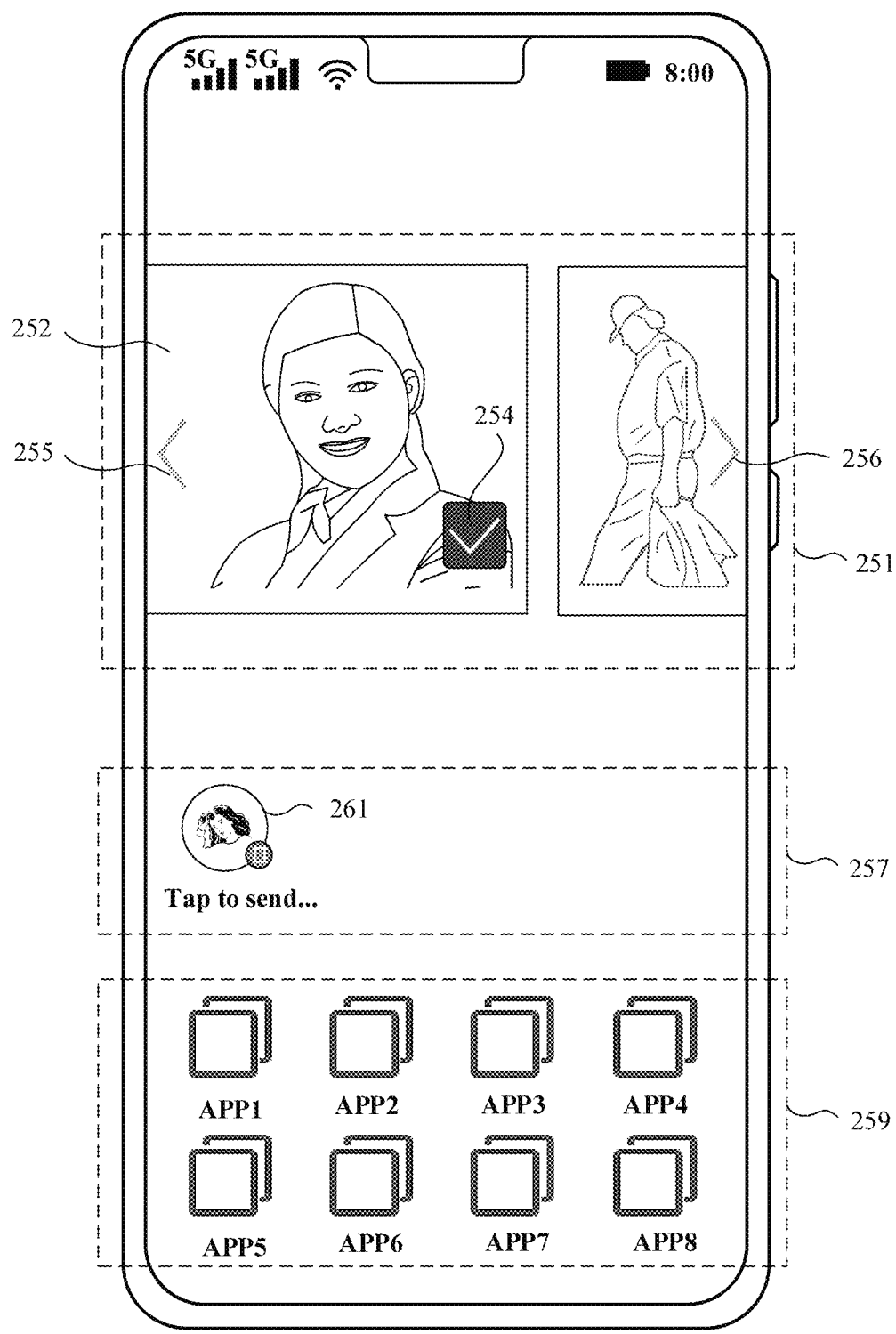

As shown in FIG. 2F, after finding the nearby device, the terminal may display, in the area 257, the option of the nearby device or the user option corresponding to the nearby device, for example, a user option 261.

The terminal may receive an input operation (for example, a single tap) of the user for the user option 261. In response to the input operation, the terminal may establish a communication connection to a device corresponding to the user option 261, and then transmit, by using the communication connection, the selected picture to the device corresponding to the user option.

It can be learned from the foregoing description of the process of taking the picture and sharing the picture in a related technology that, after taking the picture on the terminal device, the user needs to perform a cumbersome operation procedure to share the picture with another terminal device. This affects user experience.

Figure 3A:
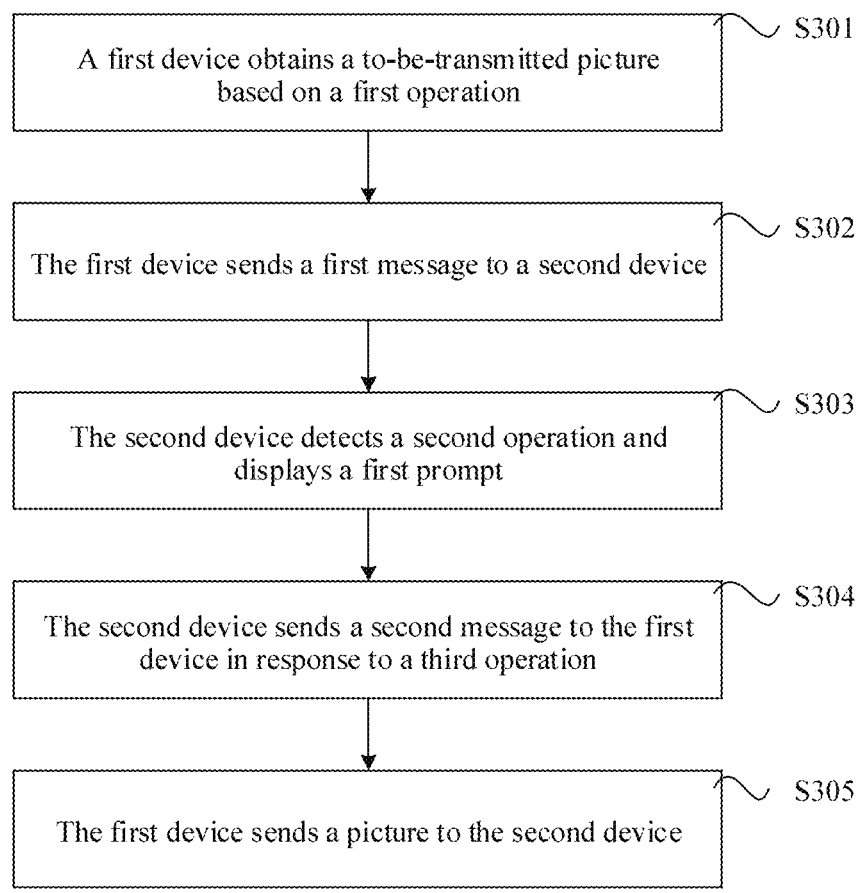
FIG. 3A is an overall flowchart of a cross-device picture transmission method according to an embodiment of this application.

Based on this, FIG. 3A is an overall flowchart of a cross-device picture transmission method according to an embodiment of this application.

S301: A first device may obtain a to-be-transmitted picture based on a first operation (for example, photographing, scanning, or screen capture).

S302: The first device pushes a first message to a second device in a near field connection state (for example, a Wi-Fi P2P (peer to peer) connection or a Bluetooth connection) after obtaining the to-be-transmitted picture, where the first message is picture notification information.

S303: After the second device receives the picture notification information, if the second device detects a second operation, where the second operation is an interaction event (for example, a mouse slide), the second device displays a first prompt to a user, where the first prompt includes a picture thumbnail notification box.

S304: The second device sends a second message to the first device in response to a third operation, that is, requests an original picture, where the third operation includes an operation (for example, tapping or dragging) performed by the user on the picture thumbnail notification box.

S305: The first device sends a third message to the second device in response to the request for the original picture, where the third message includes the original picture.

The first device and the second device are in the near field connection state, and the first device and the second device may have a relationship of being logged in to by using a same account (ID), or may have a user-defined association. This can simplify an operation step in which the user transmits the picture, improve purposefulness of picture transmission, and provide convenience for the user.

In the foregoing method, the picture notification information pushed by the first device to the second device includes two scenarios. In one scenario, the picture notification information pushed by the first device to the second device is thumbnail information, and the second device displays the thumbnail notification box to the user after detecting the interaction event. In the other scenario, the picture notification information pushed by the first device to the second device is a "picture to be received" message, the second device requests a thumbnail from the first device after detecting the interaction event, then the first device sends the thumbnail to the second device, and finally the second device displays the thumbnail notification box to the user. There is a difference between the foregoing two scenarios in underlying network interaction, but the user cannot perceive the difference. Details are described in the following embodiment.

Figure 3B:
FIG. 3B is a diagram of an architecture of a system according to an embodiment of this application.

FIG. 3B is a diagram of an architecture of a system according to an embodiment of this application. As shown in FIG. 3B, the system 30 includes a mobile phone 310 serving as a first device and nearby second devices. The second devices include a mobile phone 311, a personal computer (PC) 312, and the like. FIG. 3B shows an example of some application scenarios of embodiments of this application. The mobile phone 311 and the personal computer (PC) 312 are on a right side of the mobile phone 310. The three devices in FIG. 3B are in a near field connection state. A lightning icon 313 and a lightning icon 314 respectively indicate that the mobile phone 310 and the mobile phone 311 are in the near field connection state and that the mobile phone 310 and the personal computer (PC) 312 are in the near field connection state.

In embodiments of this application, the first device may be a mobile phone, a personal computer (PC), a tablet computer (PAD), or the like. The second device may also be a mobile phone, a personal computer (PC), a tablet computer (PAD), or the like. In FIG. 3B, an example in which there are two second devices around the first device is merely used to explain this application, and should not be construed as a limitation.

Figure 4:
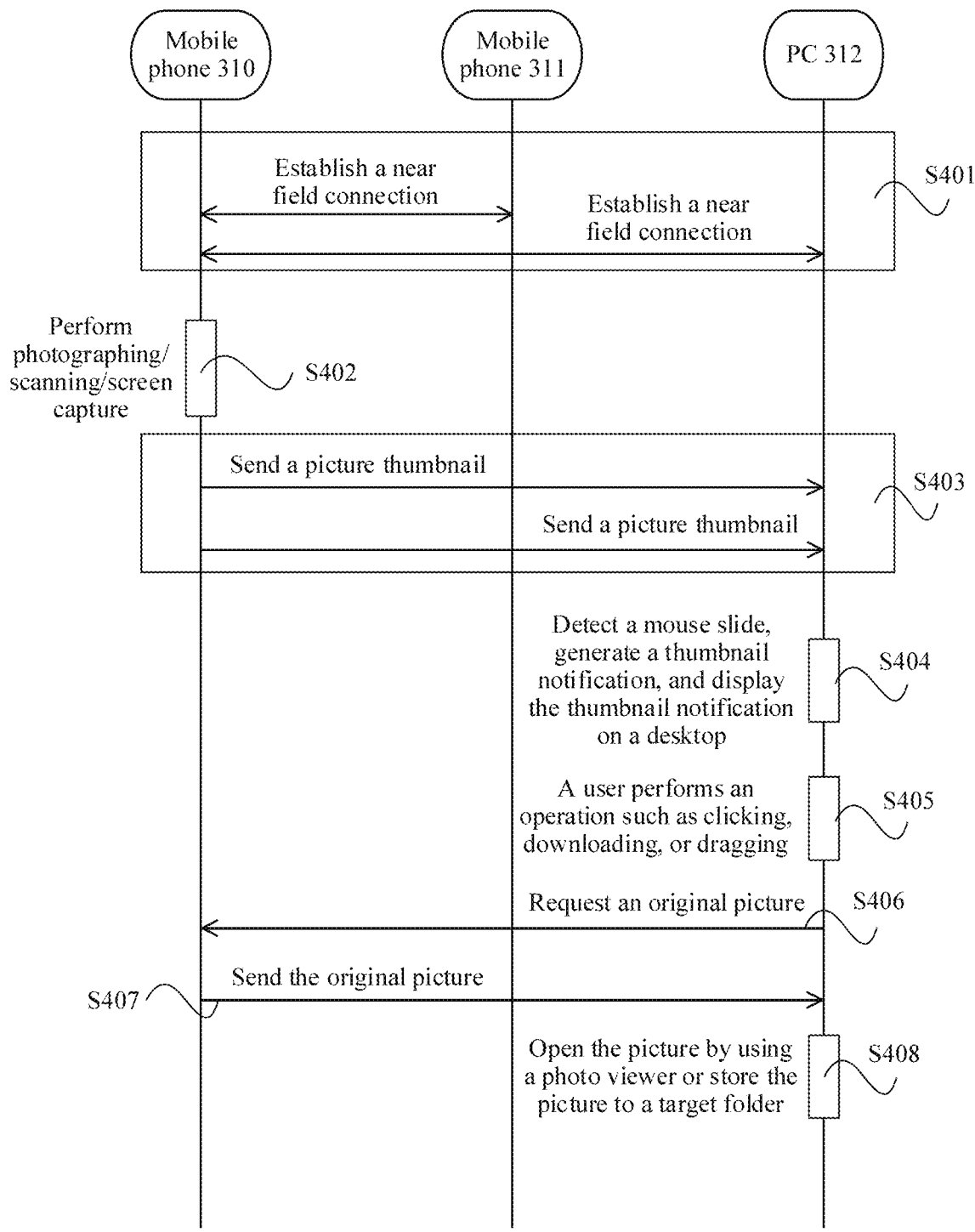
FIG. 4 is a flowchart 1 of a picture sharing method according to an embodiment of this application.

FIG. 4 is a flowchart 1 of a picture sharing method according to an embodiment of this application. The following describes in detail the picture sharing method provided in an embodiment of this application with reference to the foregoing diagram FIG. 3B of the architecture of the system and FIG. 4. As shown in FIG. 4, the method includes the following steps.

S401: A mobile phone 310 establishes a near field connection (for example, a Bluetooth connection) to each of a mobile phone 311 and a personal computer (PC) 312. The mobile phone 310, the mobile phone 311, and the personal computer (PC) 312 are logged in to by using a same account (ID) and are different devices of a same user.

S402: The mobile phone 310 invokes a photographing/screen capture/scanning program to obtain a picture.

S403: The mobile phone 310 sends a thumbnail of the just obtained picture to other devices, namely, the mobile phone 311 and the personal computer (PC) 312.

S404: After receiving the thumbnail, the personal computer (PC) 312 detects a mouse sliding operation, generates a thumbnail notification box, and displays the thumbnail notification box on a desktop.

S405: The user may perform an operation such as clicking, downloading, or dragging on the thumbnail notification box displayed on the desktop of the personal computer (PC) 312.

S406: The personal computer (PC) 312 sends an original picture request message to the mobile phone 310 in response to the operation such as the clicking, downloading, or dragging performed by the user on the thumbnail notification box.

S407: The mobile phone 310 sends, to the personal computer (PC) 312 in response to the original picture request message, an original picture of the picture that is just taken.

S408: The personal computer (PC) 312 opens the received original picture by using a photo viewer, or stores the received original picture in a target folder, or inserts the received original picture into a target application.

It can be learned that the foregoing picture sharing method provided in the embodiment of this application includes: The user obtains a picture after performing a photographing, scanning, or screen capture operation by using a first device. The first device sends a thumbnail of the picture to a second device. The first device and the second device are in a near field connection state, and are logged in to by using a same ID. The second device displays thumbnail notification information of the picture to the user when detecting an interaction event (for example, a mouse slide). The second device may perform an operation such as tapping, downloading, or dragging on the thumbnail notification information of the picture, to trigger the first device to send an original picture to the second device. In this way, provided that the second device detects the interaction event, the second device can notify the user that there is a picture that can be received, and the user may obtain the picture after performing an operation such as tapping. In addition, as long as the first device obtains the picture after performing the photographing, scanning, or screen capture operation, the first device automatically sends the thumbnail of the picture to the second device, and further sends the original picture to the second device in response to an original picture request message from the second device. This simplifies an operation step in which the user shares the picture obtained through photographing, scanning, or screen capture, improves purposefulness of picture sharing, and improves user experience.

Optionally, 5403 and 5404 in the steps in the foregoing procedure may be exchanged. After the first device obtains the picture through photographing, scanning, or screen capture, the first device sends a thumbnail to the second device after the second device detects a user interaction event and sends a thumbnail request message to the first device. In such a procedure, the second device needs to actively send the interaction event to the first device continuously, and the first device sends the thumbnail to the second device in response to an active request from the second device.

Based on the flowchart 4 of the foregoing embodiment, the following further describes in detail a picture sharing method provided in an embodiment of this application with reference to a more specific embodiment and the accompanying drawings. In an example of a user interface (UI) embodiment shown in FIG. 5A-1 to FIG. 5H, a user may trigger opening of Camera on the mobile phone 310, tap a photographing button, and send a thumbnail of a picture obtained through photograph to another device. The another device and the mobile phone 310 are in a near field connection state, and are logged in to by using a same ID.

Figures 1, 2, 5A:
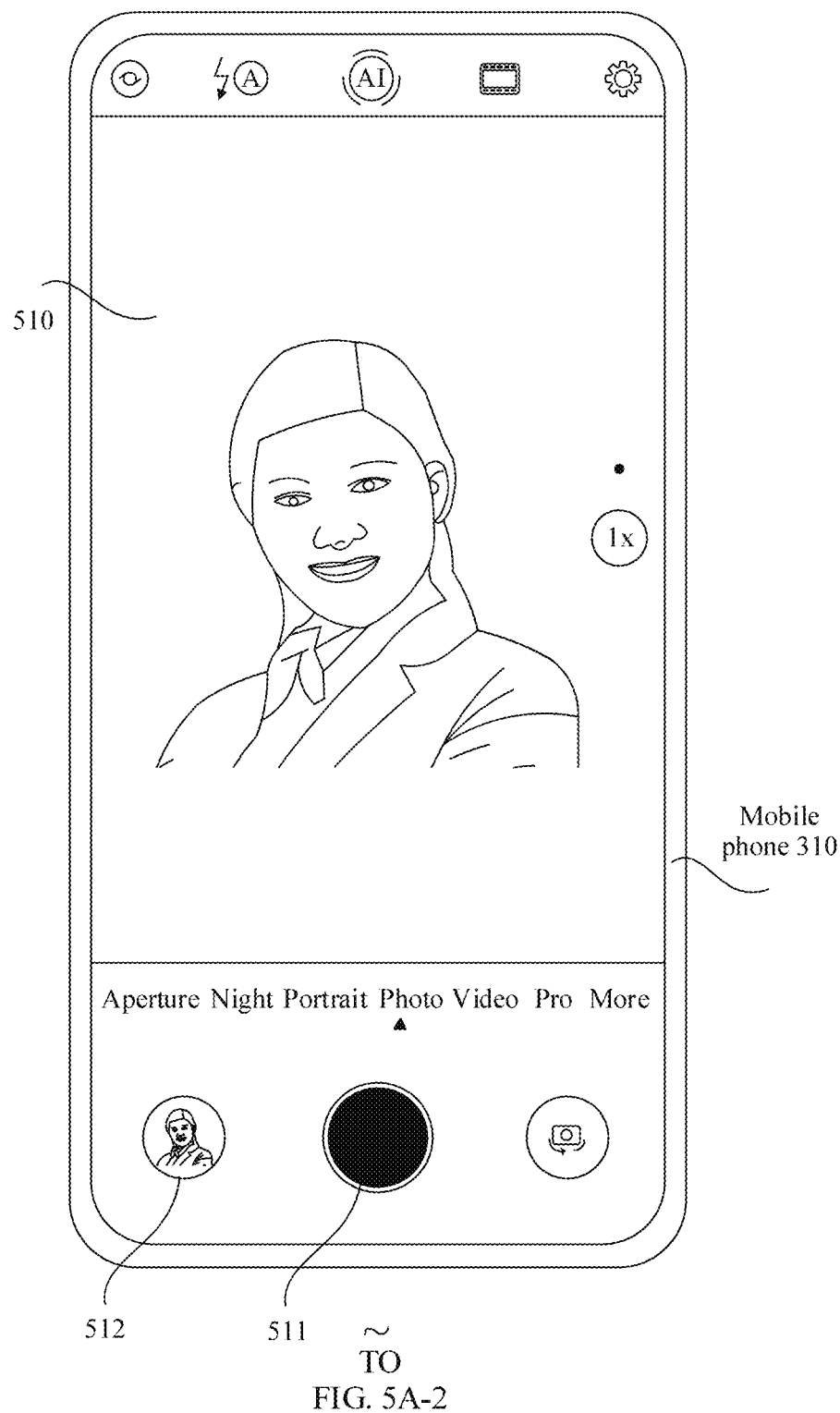
Figures 2, 5A:
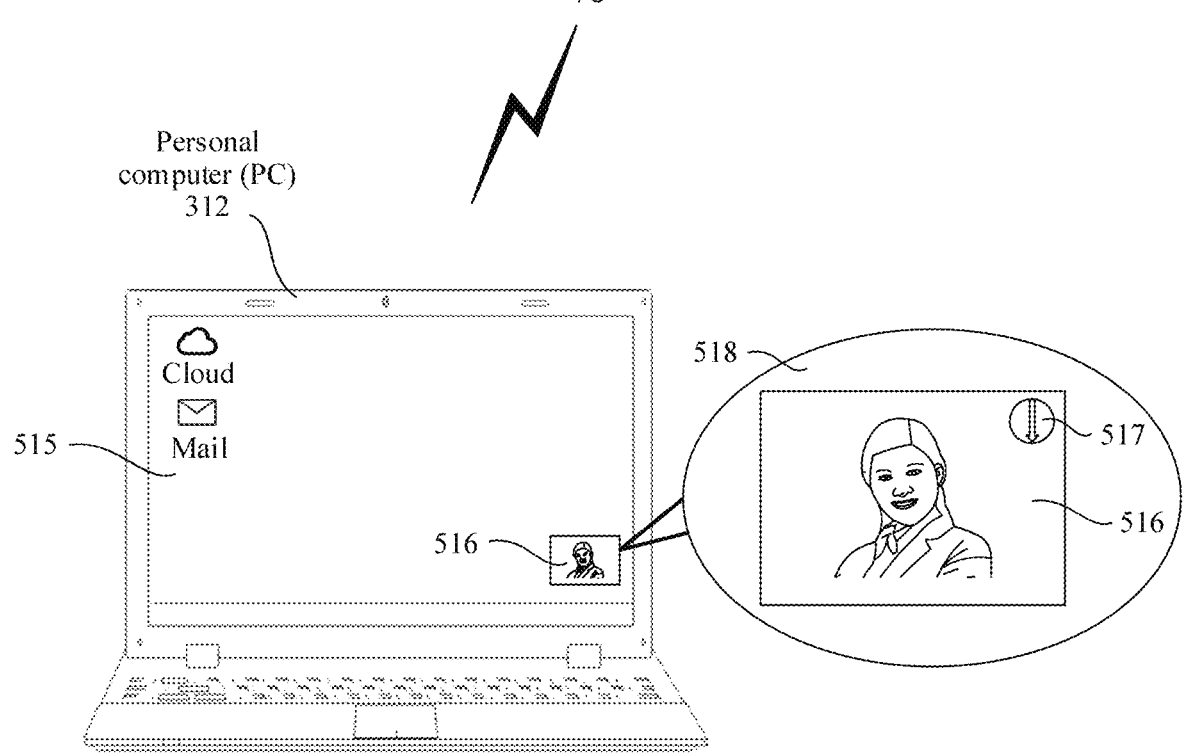

FIG. 5A-1 and FIG. 5A-2 include the mobile phone 310 and the personal computer (PC) 312. The figure shows an example of an interface 510 of Camera of the mobile phone 310. The interface 510 is the same as the interface 220 shown in FIG. 2B. Therefore, the text description of the interface 220 in FIG. 2B is also applicable to the interface 510 of the mobile phone 310 in FIG. 5A-1 and FIG. 5A-2. Details are not described herein again. The user may tap a photographing button 511 for photographing. In this case, a thumbnail of a picture just taken is displayed in a thumbnail button 512 for a latest picture in Gallery.

After taking the picture, the mobile phone 310 sends, in a near field communication manner (for example, Bluetooth or Wi-Fi) to the another device that is logged in to by using the same ID as the mobile phone 310 and that is in the near field connection state, thumbnail information of the picture that is just taken. If the personal computer (PC) 312 that is in a connected state and is logged in to by using the same ID detects an interaction event (for example, a mouse sliding operation), the personal computer (PC) 312 displays, on a desktop, a notification box with the picture thumbnail shown in FIG. 5A-1 and FIG. 5A-2. As shown in FIG. 5A-1 and FIG. 5A-2, a notification box 516 appears in a lower right corner of a desktop interface 515 of the personal computer (PC) 312, and a partial enlarged view 518 of the notification box 516 is shown in the figure. The thumbnail of the latest picture that is just taken by the mobile phone 310 is displayed in the notification box 516, and a download button 517 is displayed in an upper right corner of the notification box 516.

Figure 5B:
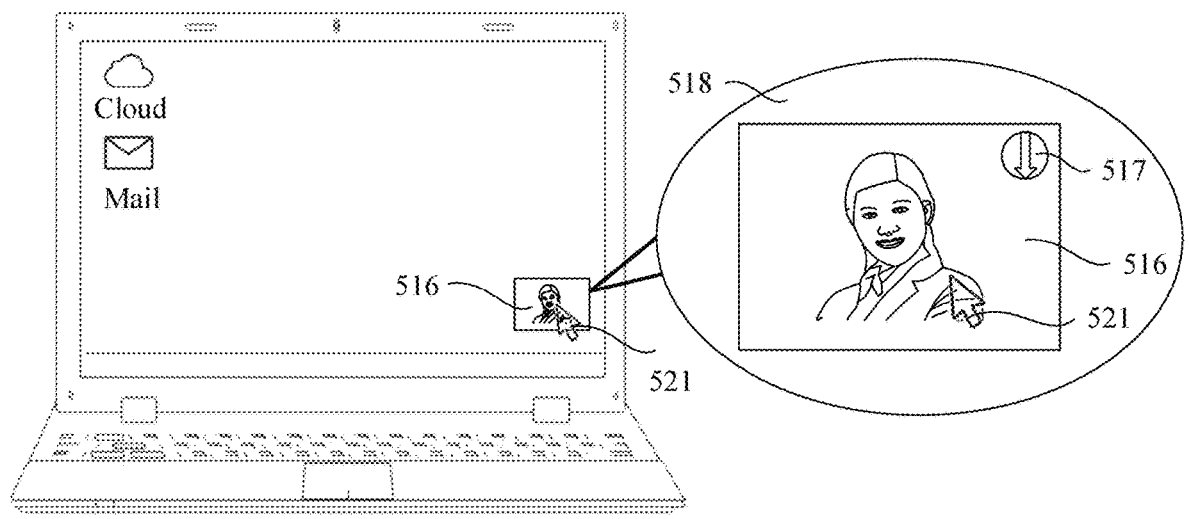
Figure 5C:
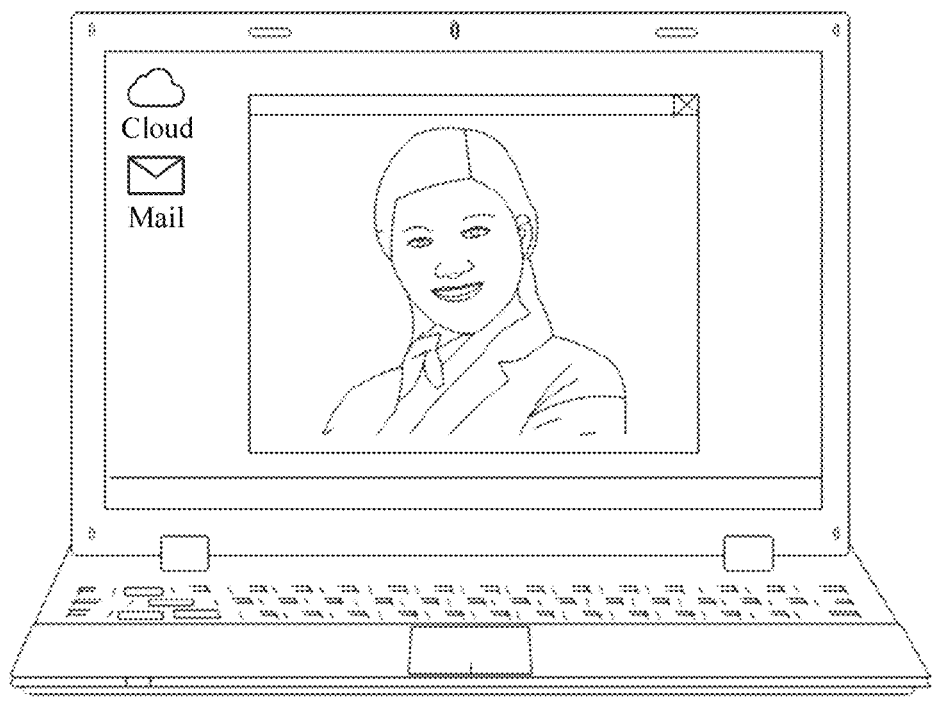

As shown in FIG. 5B, the personal computer (PC) 312 may receive a single click operation performed by the user on the thumbnail in the notification box 516. For example, the user uses a mouse to place a cursor 521 on the thumbnail in the notification box 516 to perform a left-mouse-button single click operation. The partial enlarged view 518 of the notification box 516 is shown in the figure. In this case, the personal computer (PC) 312 sends an original picture request message to the mobile phone 310, and the mobile phone 310 sends, to the personal computer (PC) 312 in response to the original picture request message, an original picture of the latest picture that is just taken. After receiving the original picture, the personal computer (PC) 312 invokes a photo viewer to display the picture that is just taken by the mobile phone 310, as shown in FIG. 5C.

Figure 5D:
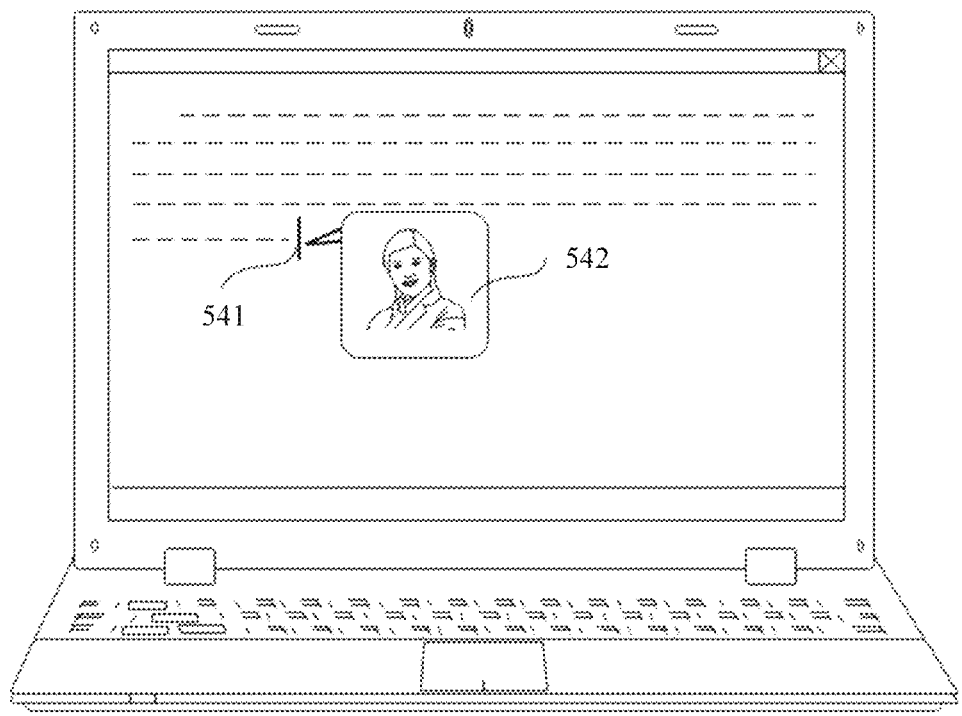

In some embodiments, when the mobile phone 310 sends a picture thumbnail to the personal computer (PC) 312 after photographing, the personal computer (PC) 312 is currently enabling a document editing program (for example, Word) and is in an editing state. As shown in FIG. 5D, an editing cursor 541 is being located at a location in a Word document, and the user slides the mouse (without pressing a left mouse button or a right mouse button). In this case, a notification box 542 with the thumbnail appears near the editing cursor 541. If the user clicks the thumbnail in the notification box 542, the personal computer (PC) 312 sends an original picture request to the mobile phone 310. The mobile phone 310 sends, to the personal computer (PC) 312 in response to the original picture request message, an original picture of the latest picture that is just taken. The personal computer (PC) 312 inserts the original picture at the location of the editing cursor 541 in the document after receiving the original picture. After the notification box 542 with the thumbnail is displayed at the location of the editing cursor 541, if the user does not want to use the picture, the user may click the left mouse button one time at another location. In this case, the notification box 542 with the thumbnail disappears.

In some embodiments, the personal computer (PC) 312 detects a click operation performed by the user on the thumbnail in the thumbnail notification box, and requests an original picture from the mobile phone 310. When sending the original picture to the personal computer (PC) 312, the mobile phone 310 sends, to the mobile phone 311 that does not request the original picture, a message to indicate to delete a picture thumbnail. Subsequently, even if the mobile phone 311 detects an interaction event, the mobile phone 311 does not display a notification message of the picture thumbnail to the user. This improves purposefulness of picture transmission, and avoids causing interference to another device.

Figure 5E:
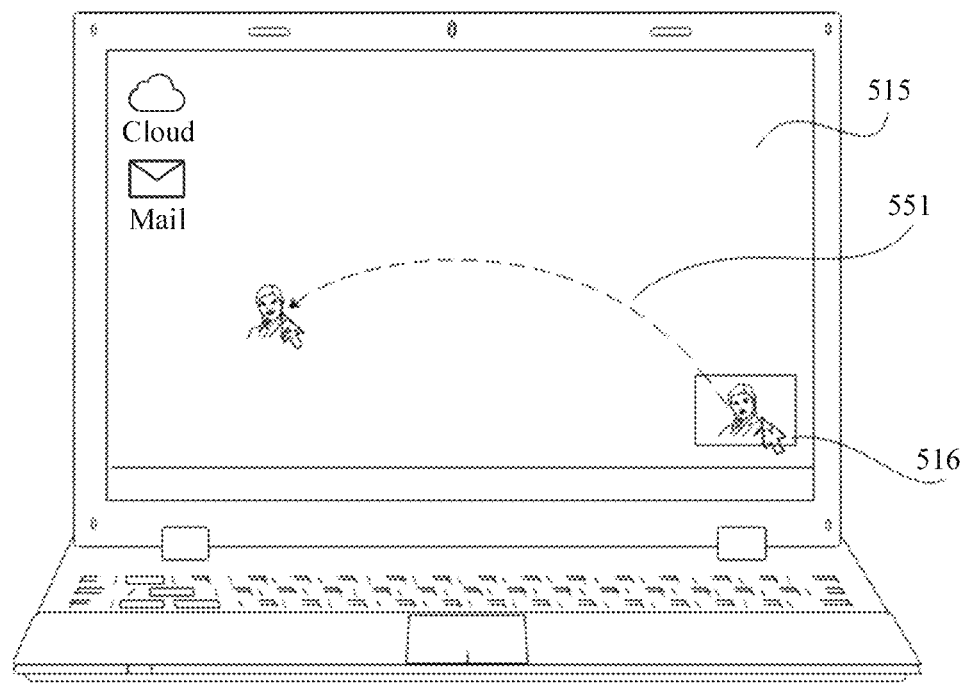
Figure 5F:
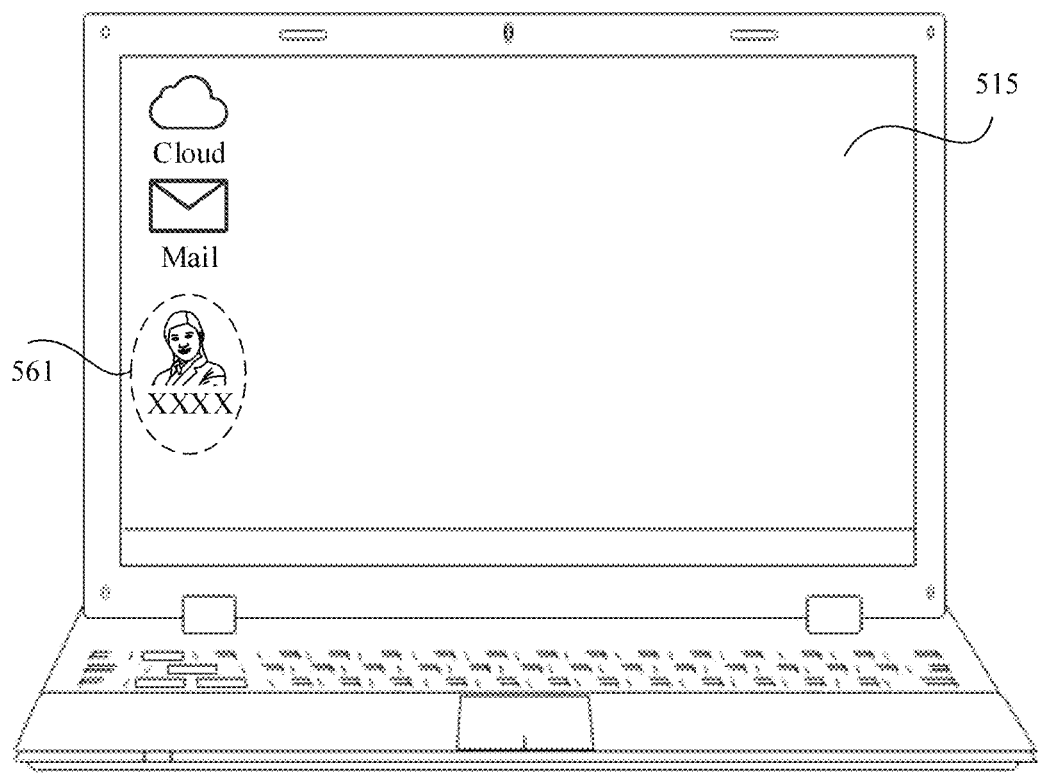

In some embodiments, the personal computer (PC) 312 may receive a drag operation performed by the user on the thumbnail in the notification box 516 after displaying the notification box 516. As shown in FIG. 5E, the user may place a mouse cursor on the thumbnail in the notification box 516, press and hold the left mouse button, and drag the thumbnail along a dashed-line track 551 to the desktop (or another folder). The user drags the thumbnail to the desktop and then releases the left mouse button. In this case, the personal computer (PC) 312 sends an original picture request message to the mobile phone 310, and the mobile phone 310 sends, to the personal computer (PC) 312 in response to the original picture request message, an original picture of the latest picture that is just taken. The personal computer (PC) 312 displays thumbnail information and name information 561 of the picture on the desktop interface 515, as shown in FIG. 5F. The user may view the picture by performing an operation such as double-clicking.

Figure 5G:
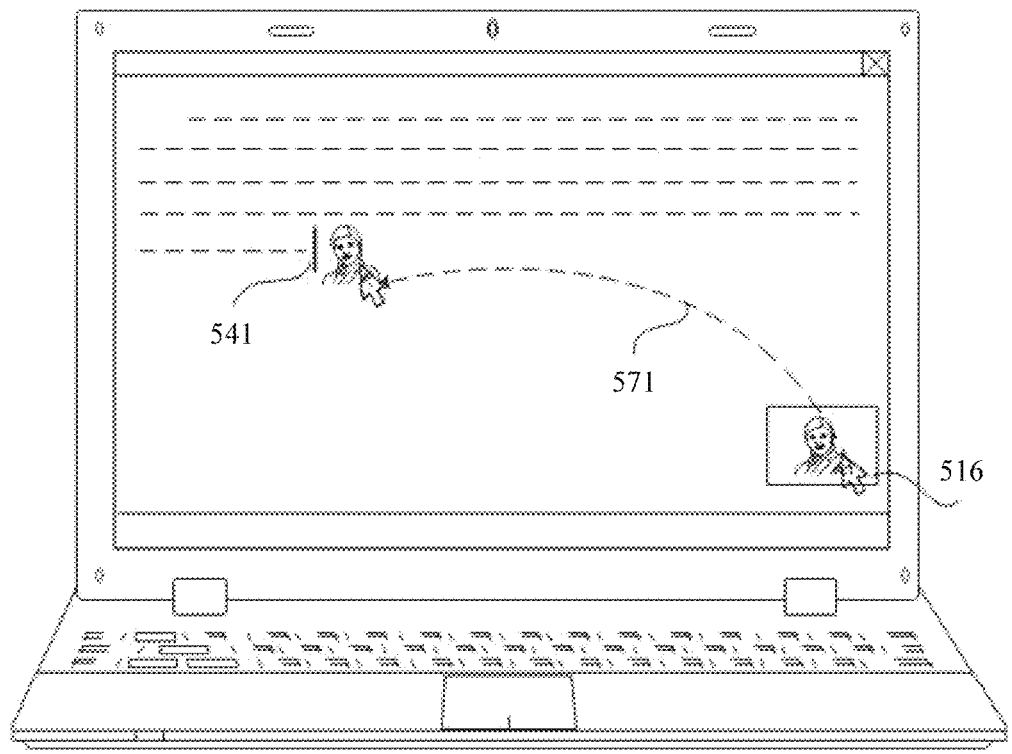

In some embodiments, after the personal computer (PC) 312 displays the notification box 516, the user may drag the thumbnail in the notification box 516 to a target application, for example, a document editing program. As shown in FIG. 5G, the personal computer (PC) 312 displays the document editing program being enabled. In this case, the thumbnail notification box 516 is displayed on the desktop. The user may place the mouse cursor on the thumbnail in the notification box 516, press and hold the left mouse button, and drag the thumbnail along a dashed line 571 to the document editing program that is being enabled. The user drags the thumbnail to a specific location of the document editing program and then releases the left mouse button. In this case, the personal computer (PC) 312 sends an original picture request to the mobile phone 310. The mobile phone 310 sends, to the personal computer (PC) 312 in response to the original picture request message, an original picture of the latest picture that is just taken. The personal computer (PC) 312 inserts the original picture of the picture into a document editor. The user may perform a further operation on the picture subsequently.

In some embodiments, after the personal computer (PC) 312 displays the notification box 516, the user may perform a click operation on the download button 517 (as shown in FIG. 5A-1 and FIG. 5A-2) of the thumbnail displayed in the notification box 516. In this case, the personal computer (PC) 312 sends an original picture request to the mobile phone 310. The mobile phone 310 sends, to the personal computer (PC) 312 in response to the original picture request message, an original picture of the latest picture that is just taken. The personal computer (PC) 312 stores the original picture in a default folder or a folder specified by the user.

Figure 5H:
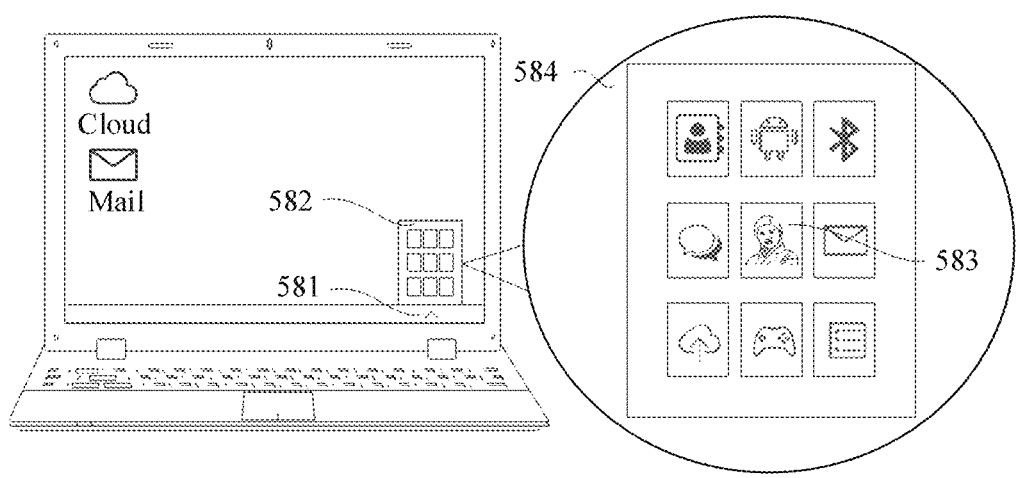

In some embodiments, after the personal computer (PC) 312 displays the notification box 516, if no operation performed by the user on the notification box 516 is received for a period of time (for example, 10s), the notification box 516 is automatically hidden. Subsequently, the user may find a thumbnail notification of the picture in a notification bar of the personal computer (PC) 312, and continue to perform the foregoing operation such as single-clicking, dragging, or downloading. As shown in FIG. 5H, a Microsoft operating system is used as an example. The user may set to hide a notification that does not need to be displayed on the desktop. There is a notification bar expansion button 581 in a lower right corner of the desktop of the personal computer (PC) 312. A notification bar expansion window 582 appears when the notification bar expansion button 581 is clicked, and currently hidden notification information is displayed in the notification bar expansion window 582. A partial enlarged view 584 of the notification bar expansion window 582 is shown in the figure. The user may find a thumbnail notification 583 of the picture in the notification bar expansion window 582, and continue to perform an operation such as clicking or downloading.

In FIG. 5A-1 to FIG. 5H, the picture sharing method is described by using an example in which a terminal device takes a picture and shares the picture. A flowchart of an embodiment of this application in FIG. 4 is also applicable to picture sharing for operations such as scanning and screen capture. A specific UI embodiment is similar to that shown in FIG. 5. Details are not described herein again.

Figure 6:
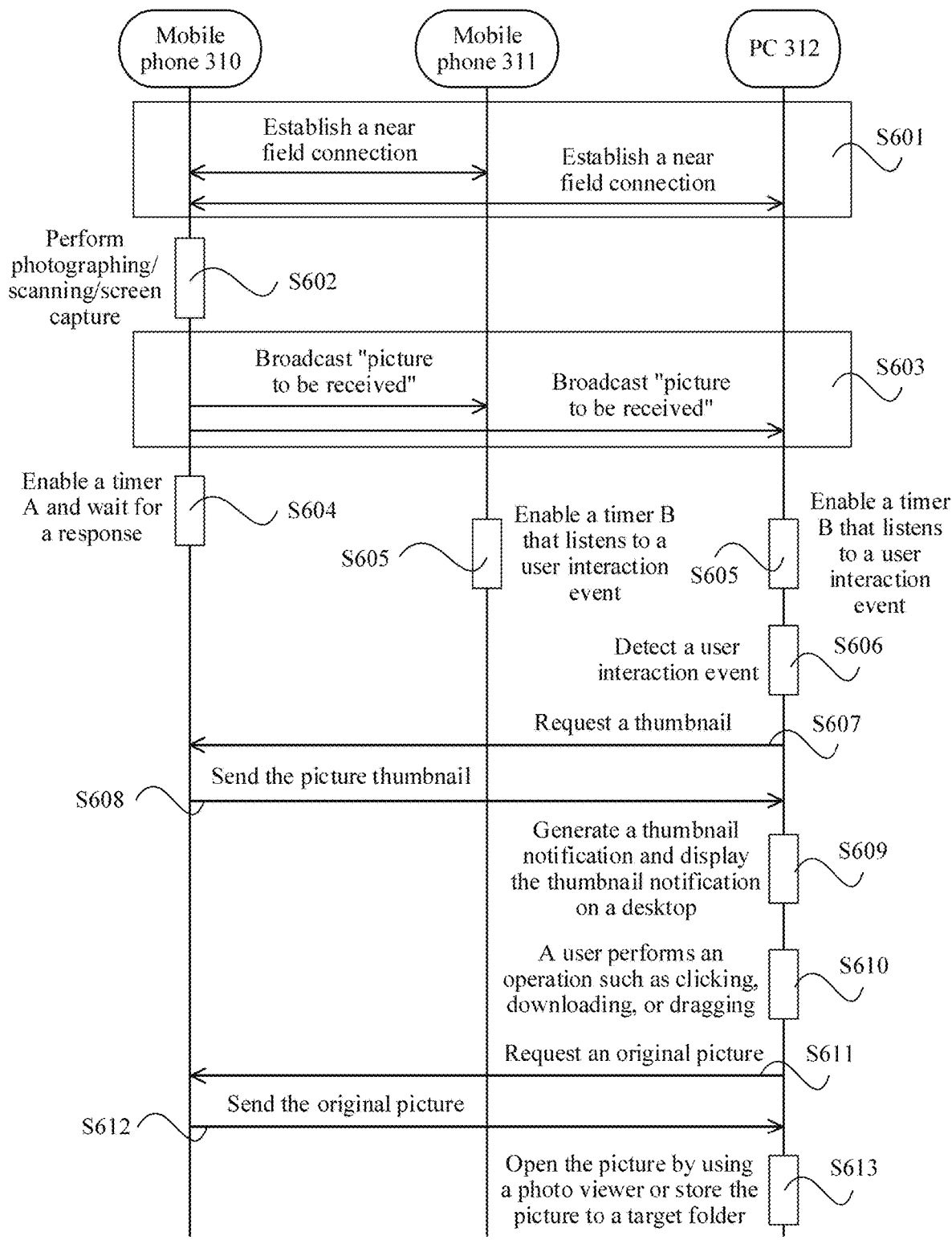
FIG. 6 is a flowchart 2 of a picture sharing method according to an embodiment of this application.

FIG. 6 is a flowchart 2 of a picture sharing method according to an embodiment of this application. The following describes in detail another picture sharing method provided in an embodiment of this application with reference to the foregoing diagram FIG. 3B of the architecture of the system and FIG. 6. As shown in FIG. 6, the method includes the following steps.

S601: The mobile phone 310 establishes a near field connection state (for example, a Bluetooth connection) with each of the mobile phone 311 and the personal computer (PC) 312. The mobile phone 310, the mobile phone 311, and the personal computer (PC) 312 are logged in to by using a same ID and are different devices of a same user.

S602: The mobile phone 310 performs a photographing/scanning/screen capture operation to obtain a picture.

S603: The mobile phone 310 notifies, through broadcasting, the mobile phone 311 and the personal computer (PC) 312 of a "picture to be received" message, that is, notifies an operating system of the mobile phone 311 and an operating system of the personal computer (PC) 312 that there is a picture to be received.

S604: The mobile phone 310 enables a timer A with specific duration (for example, 1 minute) after photographing, and waits for a thumbnail request message from another device during running of the timer A.

S605: After receiving the "picture to be received" message, the mobile phone 311 and the personal computer (PC) 312 each enable a timer B that listens to a user interaction event and that has specific duration (for example, 1 minute).

S606: The personal computer (PC) 312 receives a user interaction event (for example, a keyboard and mouse operation) during running of the timer B that listens to the user interaction event.

S607: The personal computer (PC) 312 sends a thumbnail request message to the mobile phone 310 in response to the user interaction event.

S608: The mobile phone 310 sends a thumbnail of the just obtained picture to the personal computer (PC) 312 in response to the thumbnail request message.

S609: After receiving the thumbnail, the personal computer (PC) 312 generates a thumbnail notification, and displays the thumbnail notification on a desktop.

S610: The user may perform an operation such as clicking, downloading, or dragging on the thumbnail displayed on the desktop of the personal computer (PC) 312.

S611: The personal computer (PC) 312 sends an original picture request message to the mobile phone 310 in response to the operation such as the clicking, downloading, or dragging performed by the user on the thumbnail.

S612: The mobile phone 310 sends an original picture of the just obtained picture to the personal computer (PC) 312 in response to the original picture request message.

S613: The personal computer (PC) 312 opens the received original picture by using a photo viewer, or stores the received original picture in a target folder, or inserts the received original picture into a target application.

It can be learned that the foregoing picture sharing method provided in the embodiment of this application includes: The user performs a photographing, scanning, or screen capture operation by using a first device. Then, the first device pushes, to a second device, a "picture to be received" message, that is, notifies an operating system of the second device that there is a picture to be received. The first device and the second device are in a near field connection state, and are logged in to by using a same ID. After the second device receives the "picture to be received" message, if the second device detects that there is a user interaction event (for example, a keyboard and mouse operation), the second device sends a thumbnail request message to the first device. The first device sends, to the second device in response to the thumbnail request message, a thumbnail of the picture that is just obtained through photographing, scanning, or screen capture. The second device may perform an operation such as tapping, downloading, or dragging on the thumbnail of the picture, to obtain an original picture. This can simplify an operation step in which the user transmits the picture obtained through photographing, scanning, or screen capture, and improve efficiency of transmitting the picture to another device.

Compared with that in the picture sharing method in FIG. 4, in the picture sharing method shown in FIG. 6, after obtaining the picture, the first device does not directly send the thumbnail to the another device, but sends the thumbnail to the another device only when the another device requests the thumbnail. This can save a network resource and avoid pushing the thumbnail of the picture to another device that does not need the picture.

Optionally, in step S605 in the foregoing procedure, after receiving the "picture to be received" message, the mobile phone 311 enables the timer B that listens to the user interaction event. After receiving a user interaction event during running of the timer B, the mobile phone 311 sends a thumbnail request message to the mobile phone 310 to request a thumbnail. The mobile phone 310 sends the thumbnail to the mobile phone 311 in response to the thumbnail request message.

Based on the flowchart 6 of the foregoing embodiment, the following further describes in detail a picture sharing method provided in an embodiment of this application with reference to a more specific embodiment and the accompanying drawings. In an example of a UI embodiment shown in FIG. 7A to FIG. 7J, a user may trigger a screen capture function of the mobile phone 310 to obtain a picture through screen capture, and the mobile phone 310 sends, to another device, a "picture to be received" message. The another device and the mobile phone 310 are in a near field connection state, and are logged in to by using a same ID. After the another device receives the "picture to be received" message, if the another device detects a user interaction event, the another device sends a thumbnail request message to the mobile phone 310. The mobile phone 310 sends, in response to the thumbnail request message, a thumbnail of the picture obtained through screen capture to the another request device.

Figure 7A:
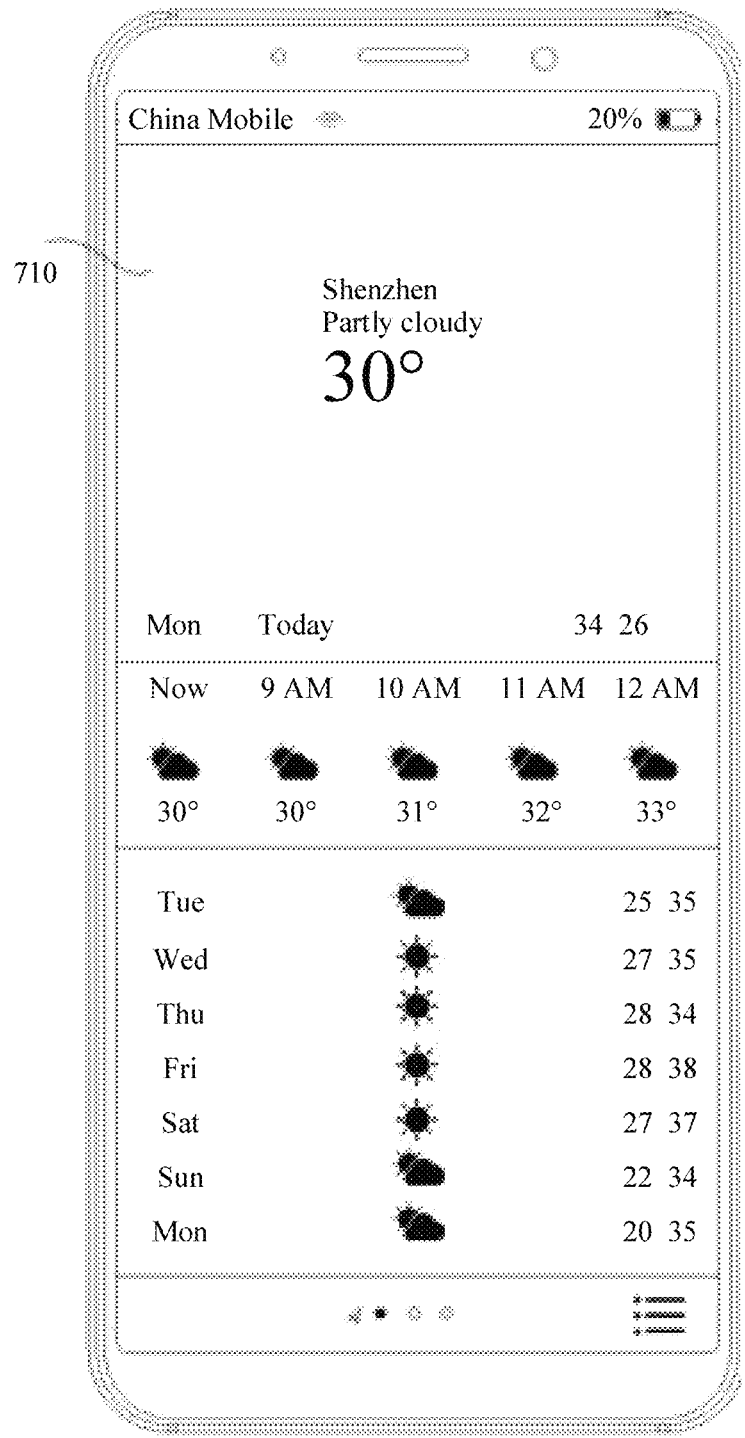
FIG. 7A to FIG. 7J are UI diagrams of an embodiment corresponding to the flowchart 2 of this application.

As shown in FIG. 7A, the mobile phone 310 displays an interface 710 of Weather. The interface 710 of Weather includes current place information, time information, and weather information.

Figure 7B:
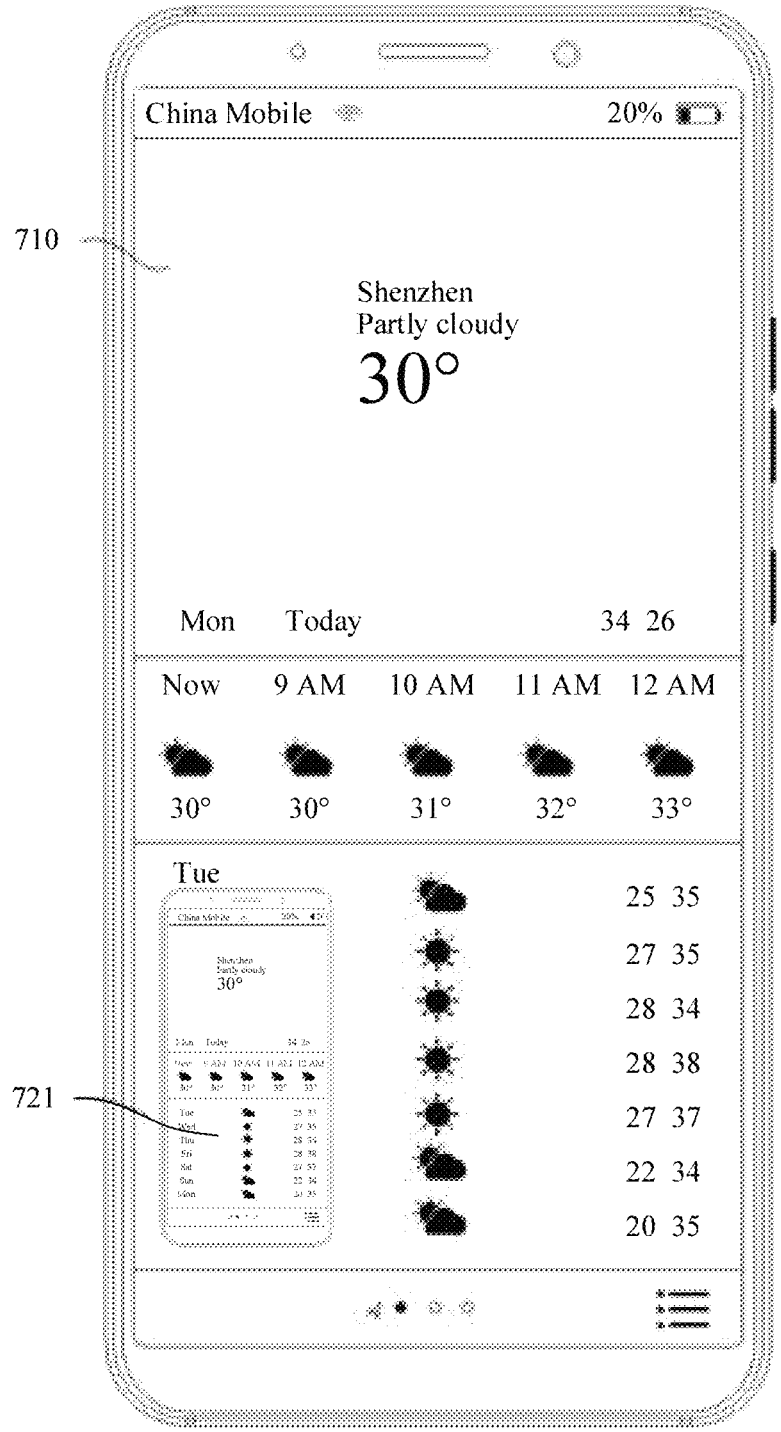
Figure 7C:
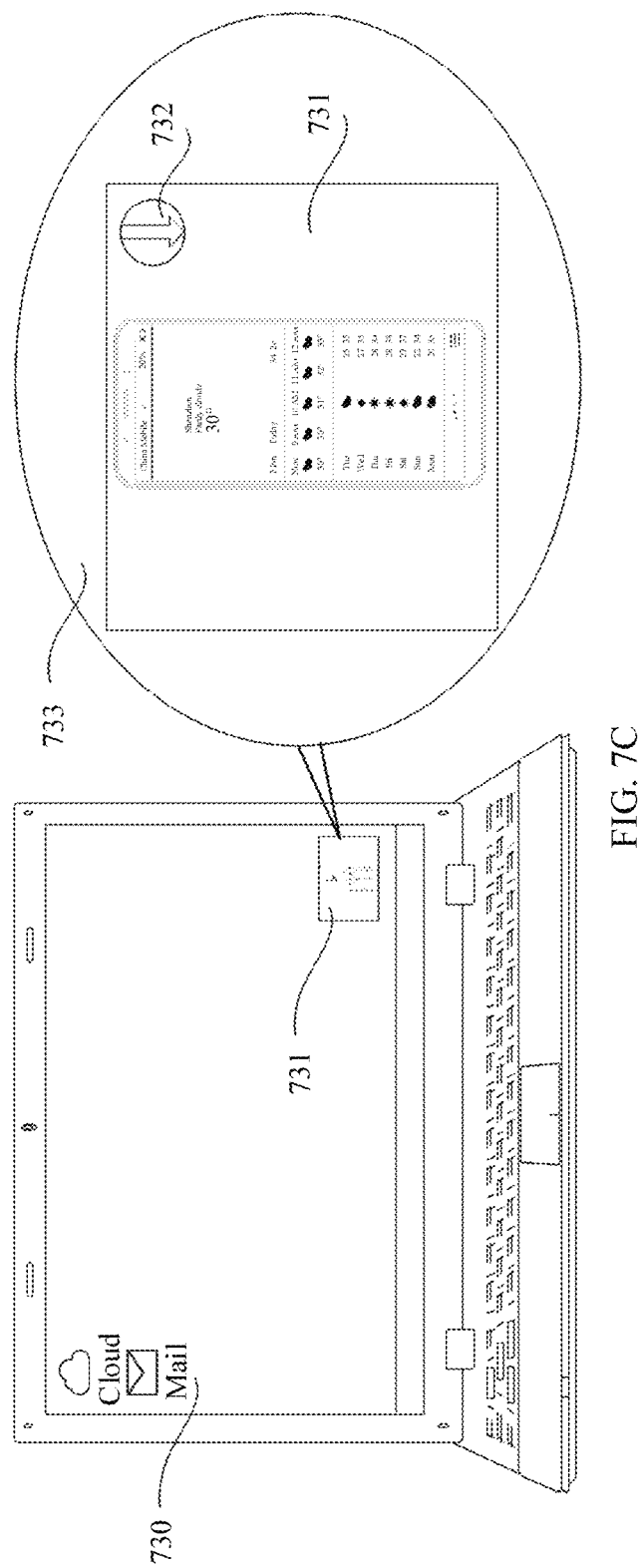

As shown in FIG. 7B, the mobile phone 310 may receive a screen capture operation (which may be a gesture operation, a physical button operation, or the like) of the user. A thumbnail 721 of a screenshot is displayed on the lower left of the terminal interface 710 after screen capture. In this case, the mobile phone 310 sends, in a near field communication manner (for example, Bluetooth or Wi-Fi) to the another device that is logged in to by using the same ID as the mobile phone 310 and that is in the near field connection state, a "picture to be received" message. After receiving the "picture to be received" message, the personal computer (PC) 312 serving as the another device detects a mouse sliding operation performed by the user, and sends a thumbnail request message to the mobile phone 310. The mobile phone 310 sends, to the mobile phone 310 in response to the thumbnail request message, thumbnail information of the picture that is just obtained through screen capture. As shown in FIG. 7C, a notification box 731 appears in a lower right corner of a desktop interface 730 of the personal computer (PC) 312, and a partial enlarged view 733 of the notification box 731 is shown in the figure. A thumbnail of a latest picture that is just obtained by the mobile phone 310 through screen capture is displayed in the notification box 731, and a download button 732 is displayed in an upper right corner of the notification box 731.

Figure 7D:
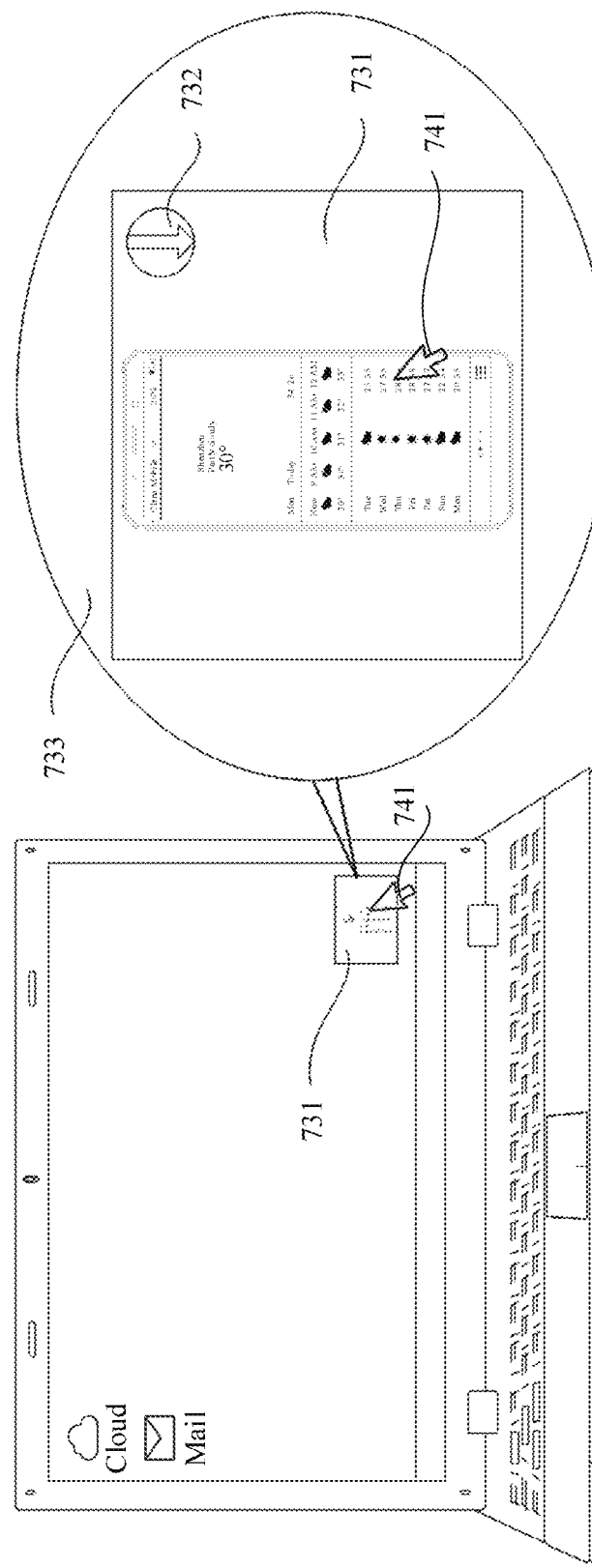
Figure 7E:
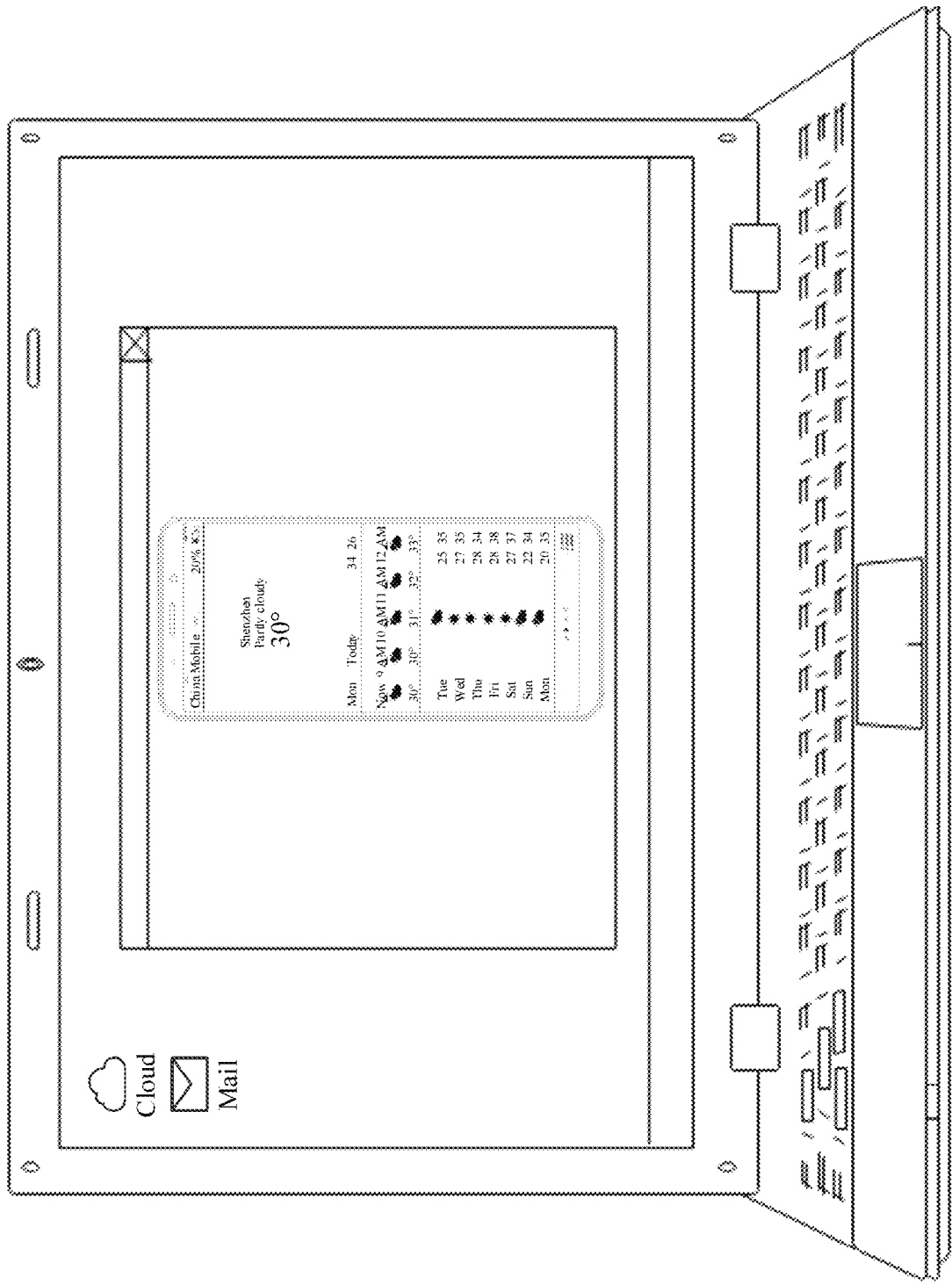

As shown in FIG. 7D, the personal computer (PC) 312 may receive a single click operation performed by the user on the thumbnail in the notification box 731. For example, the user uses a mouse to place a cursor 741 on the thumbnail in the notification box 731 to perform a left-mouse-button single click operation. The partial enlarged view 733 of the notification box 731 is shown in the figure. In this case, the personal computer (PC) 312 sends an original picture request message to the mobile phone 310, and the mobile phone 310 sends, to the personal computer (PC) 312 in response to the original picture request message, an original picture of the latest picture that is just obtained through screen capture. The personal computer (PC) 312 invokes a photo viewer to display the picture that is just obtained by the mobile phone 310 through screen capture, as shown in FIG. 7E.

Figure 7F:
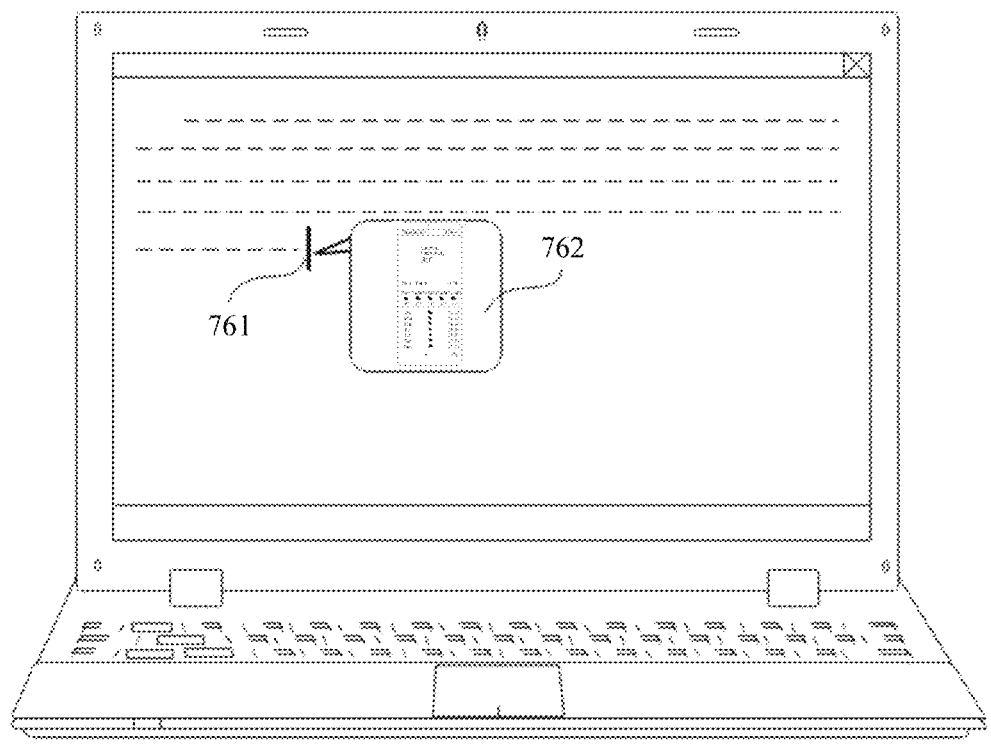

In some embodiments, when the mobile phone 310 sends a thumbnail to the personal computer (PC) 312 in response to the thumbnail request message, the personal computer (PC) 312 is currently enabling a document editing program (for example, Word) and is in an editing state. As shown in FIG. 7F, an editing cursor 761 is being located at a location in a Word document, and the user slides the mouse (without pressing a left mouse button or a right mouse button). In this case, a notification box 762 with the thumbnail appears near the editing cursor 761. If the user clicks the thumbnail in the notification box 762, the personal computer (PC) 312 sends an original picture request to the mobile phone 310. The mobile phone 310 sends, to the personal computer (PC) 312 in response to the original picture request message, an original picture of the latest picture that is just taken. The personal computer (PC) 312 inserts the original picture at the location of the editing cursor 761 in the document after receiving the original picture. After the notification box 762 with the thumbnail is displayed at the location of the editing cursor 761, if the user does not want to use the picture, the user may click the left mouse button one time at another location. In this case, the notification box 762 with the thumbnail disappears.

In some embodiments, the personal computer (PC) 312 detects a click operation performed by the user on the thumbnail in the thumbnail notification box, and requests an original picture from the mobile phone 310. When sending the original picture to the personal computer (PC) 312, the mobile phone 310 sends, to the mobile phone 311 that does not request the original picture, a message to indicate to delete a picture thumbnail. Subsequently, even if the mobile phone 311 detects an interaction event, the mobile phone 311 does not display a notification message of the picture thumbnail to the user. This improves purposefulness of picture transmission, and avoids causing interference to another device.

Figure 7G:
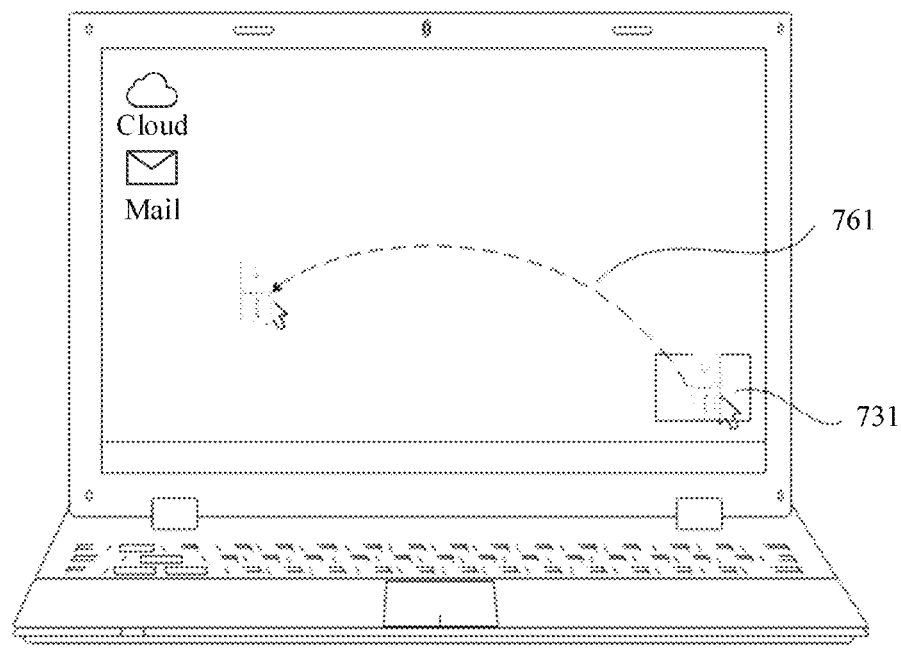
Figure 7H:
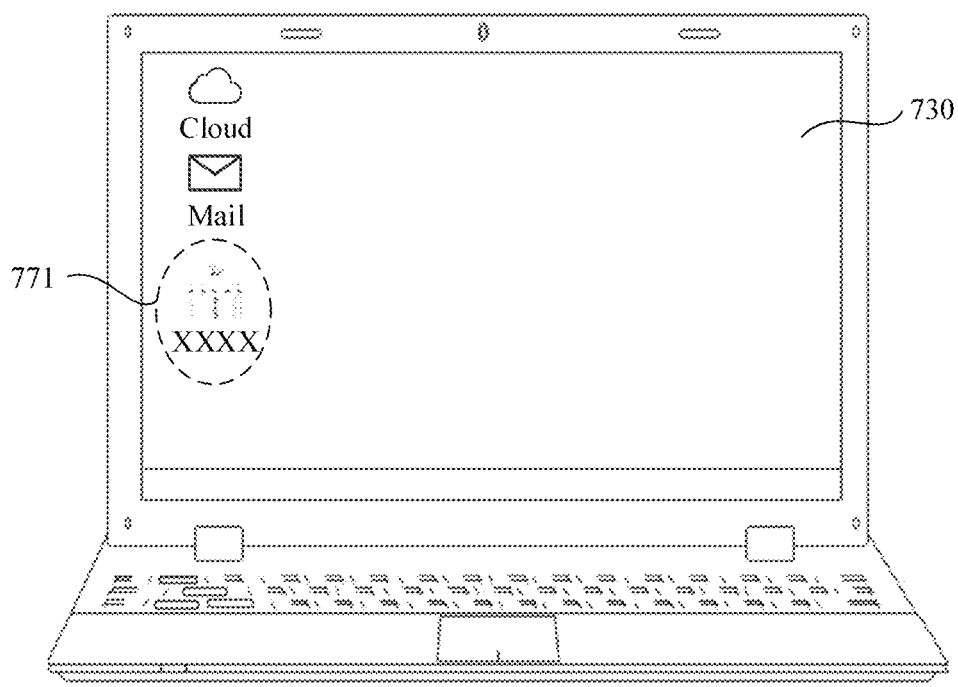

In some embodiments, the personal computer (PC) 312 may receive a drag operation performed by the user on the thumbnail in the notification box 731 after displaying the notification box 731. As shown in FIG. 7G, the user may place a mouse cursor on the thumbnail in the notification box 731, press and hold the left mouse button, and drag the thumbnail along a dashed-line track 761 to a desktop (or another folder). The user drags the thumbnail to the desktop and then releases the left mouse button. In this case, the personal computer (PC) 312 sends an original picture request message to the mobile phone 310, and the mobile phone 310 sends, to the personal computer (PC) 312 in response to the original picture request message, an original picture of the latest picture that is just obtained through screen capture. The personal computer (PC) 312 displays the thumbnail and name information 771 of the picture on the desktop interface 730, as shown in FIG. 7H. The user may view the picture by performing an operation such as double-clicking.

Figure 7I:
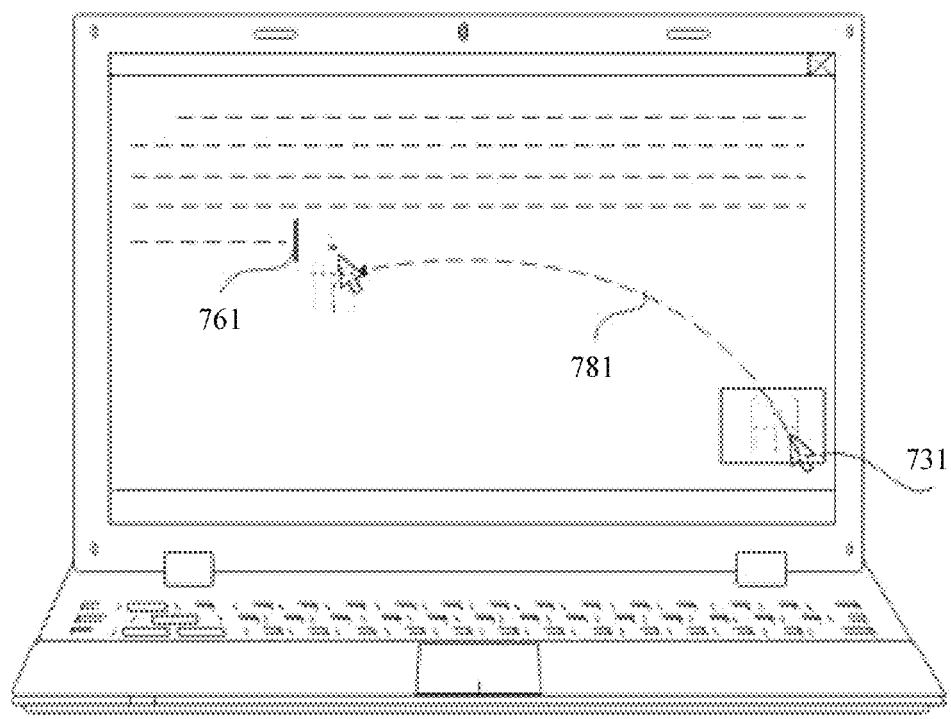

In some embodiments, after the personal computer (PC) 312 displays the notification box 731, the user may drag the thumbnail in the notification box 731 to a target application, for example, a document editing program. As shown in FIG. 7I, the personal computer (PC) 312 displays the document editing program being enabled. In this case, the thumbnail notification box 731 is displayed on the desktop. The user may place a mouse cursor on the thumbnail in the notification box 731, press and hold the left mouse button, and drag the thumbnail along a dashed line 781 to the document editing program that is being enabled. The user drags the thumbnail to a specific location of the document editing program and then releases the left mouse button. In this case, the personal computer (PC) 312 sends an original picture request to the mobile phone 310. The mobile phone 310 sends, to the personal computer (PC) 312 in response to the original picture request message, an original picture of the latest picture that is just obtained through screen capture. The personal computer (PC) 312 inserts the original picture of the picture into a document editor. The user may perform a further operation on the picture subsequently.

In some embodiments, after the personal computer (PC) 312 displays the notification box 731, the user may perform a click operation on the download button 732 (as shown in FIG. 7C) of the thumbnail displayed in the notification box 731. In this case, the personal computer (PC) 312 sends an original picture request to the mobile phone 310. The mobile phone 310 sends, to the personal computer (PC) 312 in response to the original picture request message, an original picture of the latest picture that is just obtained through screen capture. The personal computer (PC) 312 stores the original picture in a default folder or a folder specified by the user.

Figure 7J:
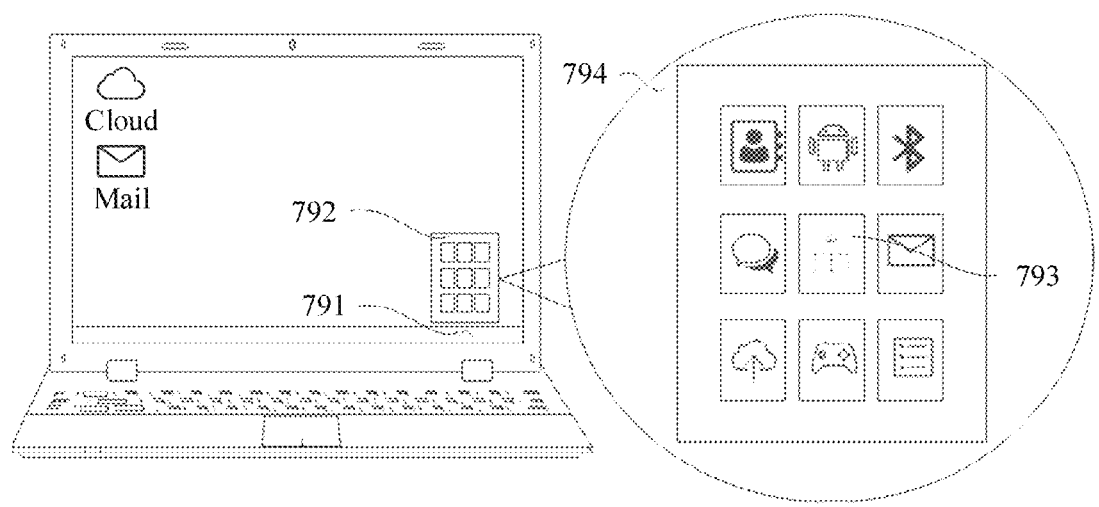

In some embodiments, after the personal computer (PC) 312 displays the notification box 731, if no operation performed by the user on the thumbnail notification box 731 is obtained for a period of time (for example, 10*s*), the notification box is automatically hidden. Subsequently, the user may find a thumbnail notification of the picture in a status bar of the personal computer (PC) 312, and continue to perform the foregoing operation such as single-clicking, dragging, or downloading. As shown in FIG. 7J, a Microsoft operating system is used as an example. The user may set to hide a notification that does not need to be displayed on the desktop. There is a notification bar expansion button 791 in a lower right corner of the desktop of the personal computer (PC) 312. A notification bar expansion window 792 appears when the notification bar expansion button 791 is clicked, and currently hidden notification information is displayed in the notification bar expansion window 792. A partial enlarged view 794 of the notification bar expansion window 792 is shown in the figure. The user may find a thumbnail 793 of the picture in the notification bar expansion window 792, and continue to perform an operation such as clicking or downloading.

In FIG. 7A to FIG. 7J, the picture sharing method is described by using an example in which a terminal device obtains a picture through screen capture and shares the picture. A flowchart of an embodiment of this application in FIG. 6 is also applicable to picture sharing for operations such as photographing and scanning. A specific UI embodiment is similar to that shown in FIG. 7. Details are not described herein again.

Figure 8:
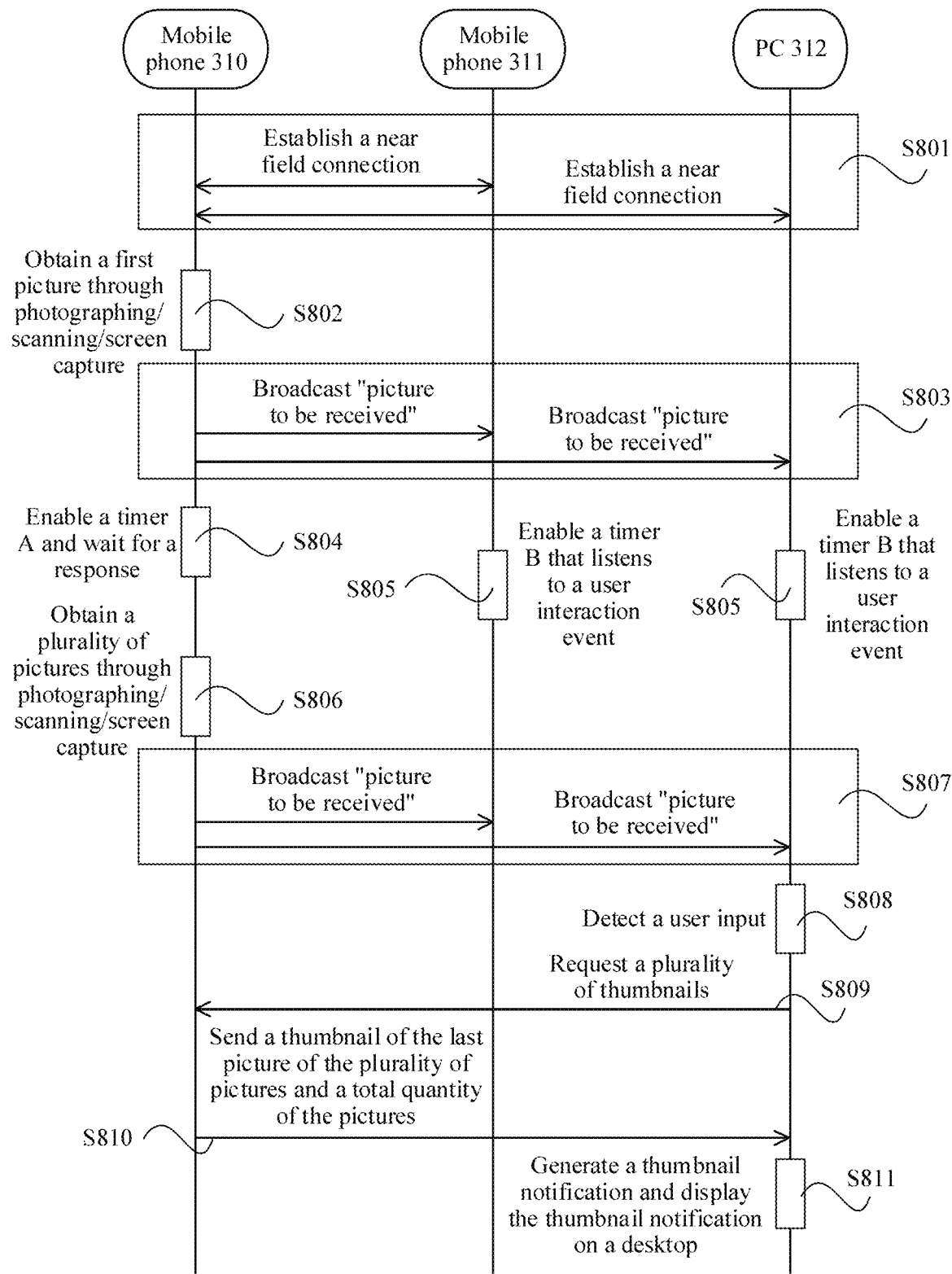
FIG. 8 to FIG. 10 are a flowchart 3 of a picture sharing method according to an embodiment of this application.
Figure 9:
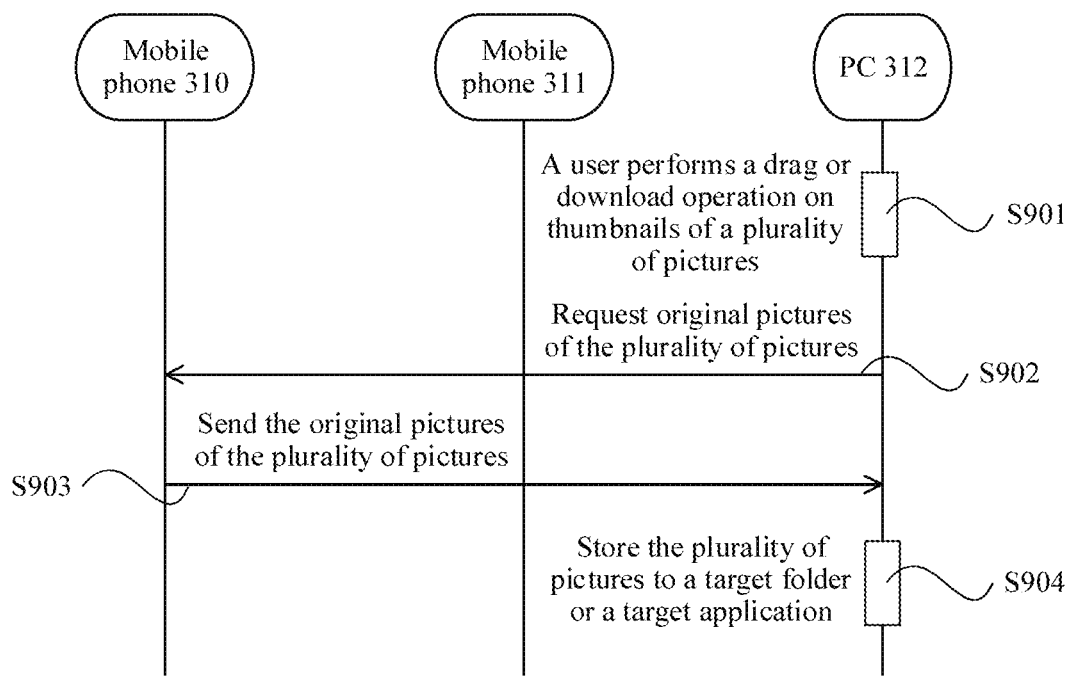
Figure 10:
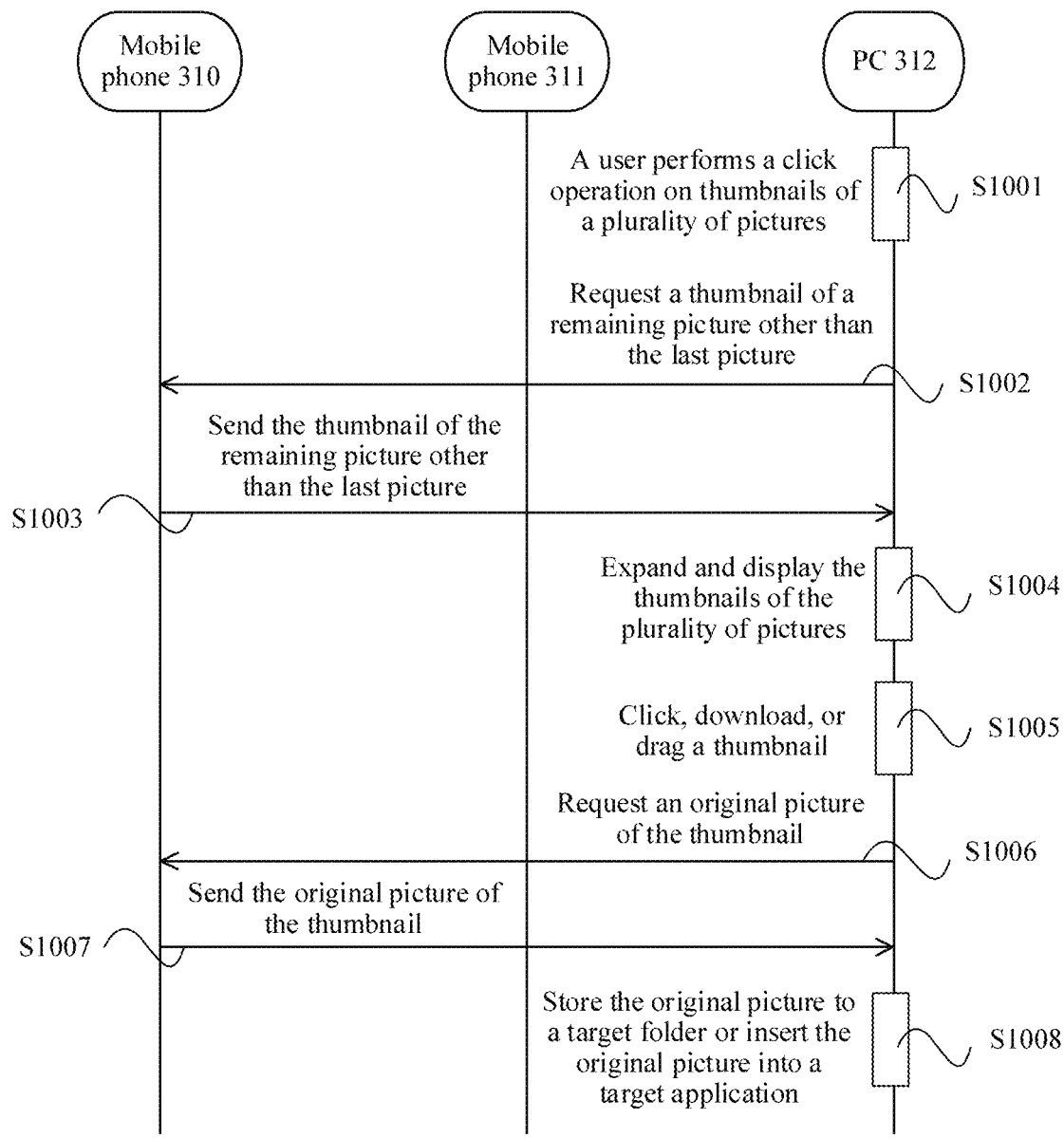

FIG. 8 to FIG. 10 are a flowchart 3 of a picture sharing method according to an embodiment of this application. The following describes in detail another picture sharing method according to an embodiment of this application with reference to the foregoing diagram FIG. 3B of the architecture of the system and FIG. 8 to FIG. 10. As shown in FIG. 8, the method includes the following steps.

S801: The mobile phone 310 establishes a near field connection state (for example, a Bluetooth connection) with each of the mobile phone 311 and the personal computer (PC) 312. The mobile phone 310, the mobile phone 311, and the personal computer (PC) 312 are logged in to by using a same ID and are different devices of a same user.

S802: The mobile phone 310 performs photographing/scanning/screen capture to obtain a first picture.

S803: The mobile phone 310 notifies, through broadcasting, the mobile phone 311 and the personal computer (PC) 312 of a "picture to be received" message, that is, notifies the mobile phone 311 and the personal computer (PC) 312 that there is a picture to be received.

S804: The mobile phone 310 enables a timer A with specific duration (for example, 1 minute) after photographing/scanning/screen capture, and waits for a thumbnail request message from another device during running of the timer A.

S805: After receiving the "picture to be received" message, the mobile phone 311 and the personal computer (PC) 312 each enable a timer B that listens to a user interaction event and that is with specific duration (for example, 1 minute).

S806: The mobile phone 310 continues to perform photographing/scanning/screen capture during the running of the timer A to obtain a plurality of pictures.

S807: Each time the mobile phone 310 obtains a picture in S806, the mobile phone 310 notifies, through broadcasting, the mobile phone 311 and the personal computer (PC) 312 of a "picture to be received" message.

S808: The personal computer (PC) 312 receives a user input operation (for example, a keyboard and mouse operation) during running of the timer B that listens to the user interaction event.

S809: The personal computer (PC) 312 sends a request message for a plurality of thumbnails to the mobile phone 310 in response to the user interaction event.

S810: The mobile phone 310 sends, to a requester, namely, the personal computer (PC) 312 in response to the request message for the plurality of thumbnails, information about a total quantity of the pictures and a thumbnail of the last picture in the plurality of pictures that are just obtained through photographing/scanning/screen capture. The total quantity of the pictures is a total quantity of the pictures that are obtained in total from step S802 when the mobile phone 310 receives the request message for the plurality of thumbnails. An Android system is used as an example. The mobile phone 310 may pack the thumbnail of the last picture and the total quantity of the pictures into a message based on a specific message structure, and invoke an interface of a network module to send the packed message to the personal computer (PC) 312.

S811: The personal computer (PC) 312 displays a thumbnail notification box with the plurality of pictures on a desktop after receiving the thumbnail of the last picture and the information about the total quantity of the pictures. The thumbnail of the last picture and the total quantity of the pictures are displayed in the notification box.

After the personal computer (PC) 312 displays the thumbnail notification box with the plurality of pictures on the desktop, there are different procedures based on specific operations performed by the user on the thumbnail notification box with the plurality of pictures.

An interaction procedure is shown in FIG. 9 when the user drags the thumbnail in the thumbnail notification box with the plurality of pictures or clicks a download button in the notification box.

S901: The personal computer (PC) 312 receives a drag operation performed by the user on the thumbnail in the thumbnail notification box with the plurality of pictures or a click operation performed by the user on the download button in the thumbnail notification box.

S902: The personal computer (PC) 312 sends an original picture request message of the plurality of pictures to the mobile phone 310 in response to the drag or download operation performed by the user.

S903: The mobile phone 310 sends original pictures of the plurality of pictures to the personal computer (PC) 312 in response to the original picture request message of the plurality of pictures.

S904: The personal computer (PC) 312 stores the plurality of received pictures in a target folder or inserts the plurality of received pictures into a target application.

An interaction procedure is shown in FIG. 10 when the user performs a click operation on the thumbnail in the thumbnail notification box with the plurality of pictures.

S1001: The personal computer (PC) 312 receives a click operation performed by the user on the thumbnail in the thumbnail notification box with the plurality of pictures.

S1002: The personal computer (PC) 312 sends a thumbnail request message of the remaining picture other than the last picture to the mobile phone 310 in response to the click operation performed by the user.

S1003: The mobile phone 310 sends a thumbnail of the remaining picture other than the last picture to the personal computer (PC) 312 in response to the received thumbnail request message of the remaining picture other than the last picture.

S1004: After receiving the thumbnail of the remaining picture other than the last picture, the personal computer (PC) 312 expands and displays thumbnails of all the pictures in combination with the received thumbnail of the last picture.

S1005: The personal computer (PC) 312 receives a click, download, or drag operation performed by the user on a thumbnail.

S1006: The personal computer (PC) 312 sends an original picture request of the thumbnail to the mobile phone 310 in response to the click, download, or drag operation performed by the user on the thumbnail.

S1007: The mobile phone 310 sends a corresponding original picture to the personal computer (PC) 312 in response to the original picture request.

S1008: After receiving the original picture, the personal computer (PC) 312 stores the original picture in a target folder or inserts the original picture into a target application.

It can be learned that the foregoing picture sharing method provided in the embodiment of this application includes: The user uses a first device to obtain a plurality of consecutive pictures through photographing, scanning, or screen capture within a period of time. Each time obtaining a picture, the first device sends, to a second device, a "picture to be received" message, that is, notifies the second device that there is a picture to be received. The first device and the second device are in a near field connection state, and are logged in to by using a same ID. After the second device receives "picture to be received" messages of a plurality of pictures, if the second device detects a user interaction event (for example, a keyboard and mouse operation), the second device sends a request message for a plurality of thumbnails to the first device. The first device sends, to the second device in response to the request message for the plurality of thumbnails, a total quantity of the pictures and a thumbnail of the last picture of the plurality of pictures that are obtained through photographing, scanning, or screen capture. The second device may perform an operation such as expanding, downloading, or dragging on the received thumbnail of the picture. This can simplify an operation step in which the user transmits the plurality of consecutive pictures obtained through photographing, scanning, or screen capture, and improve efficiency of transmitting the plurality of pictures to another device.

Optionally, in step S810 in the foregoing procedure, after receiving the request message that is for the plurality of thumbnails and that is from the first device, the second device may send thumbnails of all the pictures and a total quantity of the pictures to the second device. The first device does not need to wait, until the second device subsequently sends a thumbnail request of the remaining picture other than the last picture, to send a thumbnail of the remaining picture other than the last picture to the second device. This reduces a delay caused by network interaction in a user operation.

Optionally, in step S803 in the foregoing procedure, each time the mobile phone 310 obtains a picture, the mobile phone 310 may send a thumbnail of the picture to the mobile phone 311 and the personal computer (PC) 312. After detecting an interaction event, the mobile phone 311 and the personal computer (PC) 312 may directly display thumbnails of all pictures to the user. This reduces a delay caused by network interaction in a user operation.

Based on the flowchart shown in FIG. 8 to FIG. 10 of the foregoing embodiment, the following further describes in detail a picture sharing method provided in an embodiment of this application with reference to a more specific embodiment and the accompanying drawings. In an example of a UI embodiment shown in FIG. 11A-1 to FIG. 11I, a user may consecutively take a plurality of pictures by invoking a Camera function of the mobile phone 310 within a period of time. Each time the mobile phone 310 takes a picture, the mobile phone 310 sends, to another device, a "picture to be received" message. The another device and the mobile phone 310 are in a near field connection state, and are logged in to by using a same ID. After the another device receives "picture to be received" messages of a plurality of pictures, if the another device detects a user interaction event, the another device sends a request message for a plurality of thumbnails to the mobile phone 310. The mobile phone 310 sends, to the another request device in response to the request message for the plurality of thumbnails, a total quantity of the pictures and a thumbnail of the last picture of the plurality of pictures obtained through photographing.

Figures 1, 11A:
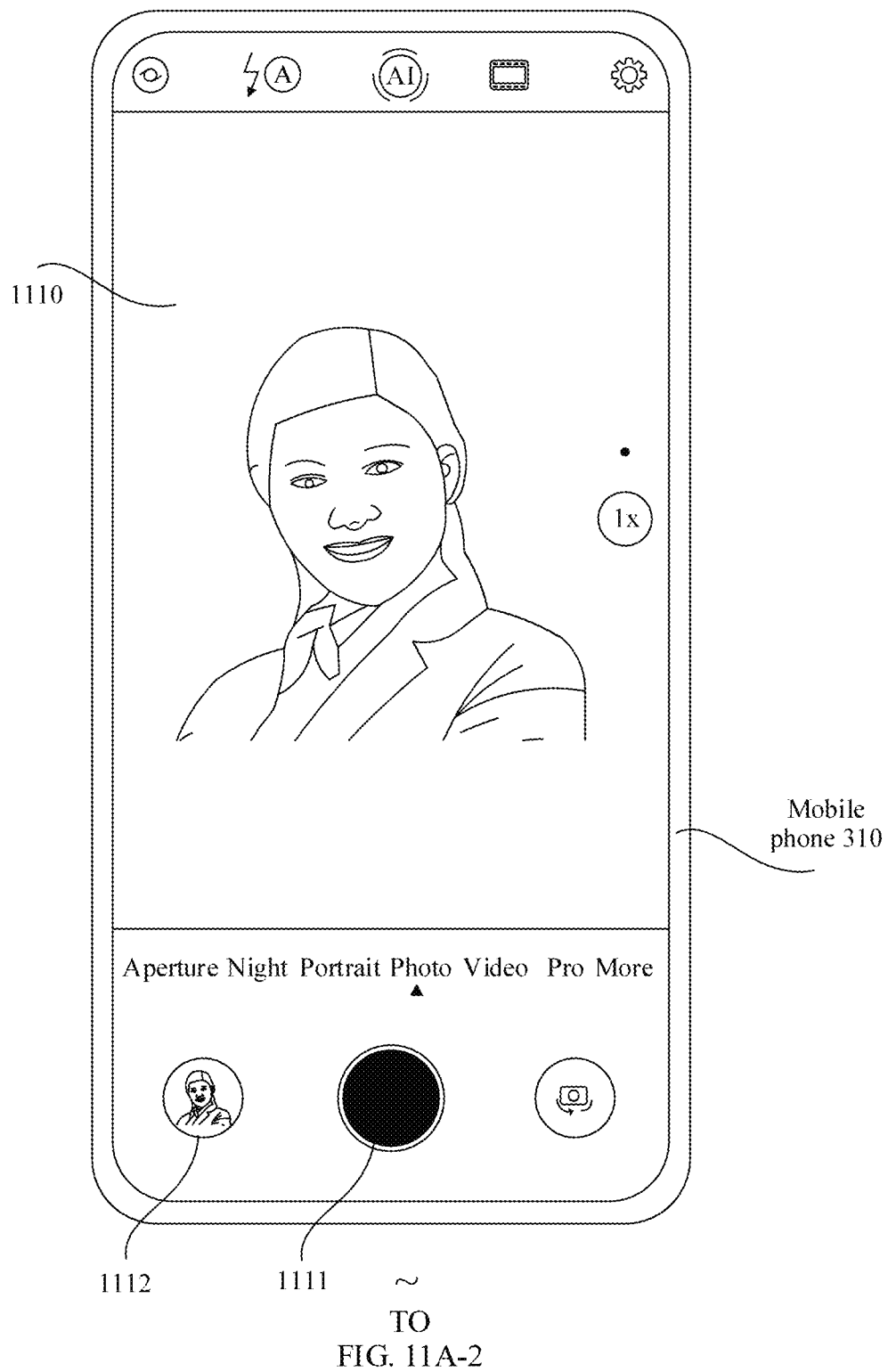
Figures 2, 11A:
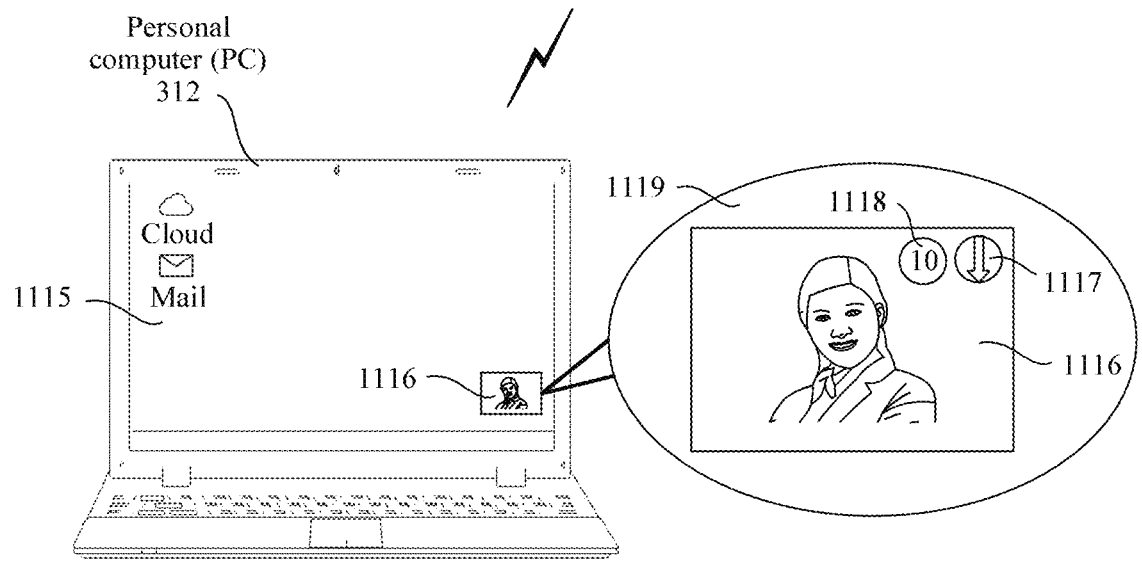

FIG. 11A-1 and FIG. 11A-2 include the mobile phone 310 and the personal computer (PC) 312. The figure shows an example of an interface 1110 of Camera of the mobile phone 310. The interface 1110 is the same as the interface 220 shown in FIG. 2B. Therefore, the text description of the interface 220 in FIG. 2B is also applicable to the interface 1110 of the mobile phone 310 in FIG. 11A-1 and FIG. 11A-2. Details are not described herein again. The mobile phone 310 may receive an operation (such as tapping) performed by the user on a photographing button 1111 for continuous photographing. In response to the operation, in this case, a thumbnail of the last picture of the plurality of pictures that are just taken consecutively is displayed in a thumbnail button 1112 for a latest picture in Gallery.

Each time the mobile phone 310 takes a picture, the mobile phone 310 sends, in a near field communication manner (for example, Bluetooth or Wi-Fi) to the another device that is logged in to by using the same ID as the mobile phone 310 and that is in the connection state, a "picture to be received" message. After receiving "picture to be received" messages of the plurality of pictures, the personal computer (PC) 312 serving as the another device detects a mouse sliding operation performed by the user, and sends a request message for a plurality of thumbnails to the mobile phone 310. The mobile phone 310 sends, to the personal computer (PC) 312 in response to the request message for the plurality of thumbnails, a total quantity of the pictures and a thumbnail of the last picture of the plurality of pictures that are just taken. As shown in FIG. 11A-1 and FIG. 11A-2, a notification box 1116 appears in a lower right corner of a desktop of the personal computer (PC) 312, and a partial enlarged view 1119 of the notification box 1116 is shown in the figure. The thumbnail of the last picture of the plurality of pictures that are just consecutively taken by the mobile phone 310 is displayed in the notification box 1116. An icon 1118 for the total quantity of the pictures is displayed in an upper right corner of the notification box 1116, and a download button 1117 is further displayed in an upper right corner of the notification box 1116.

Figure 11B:
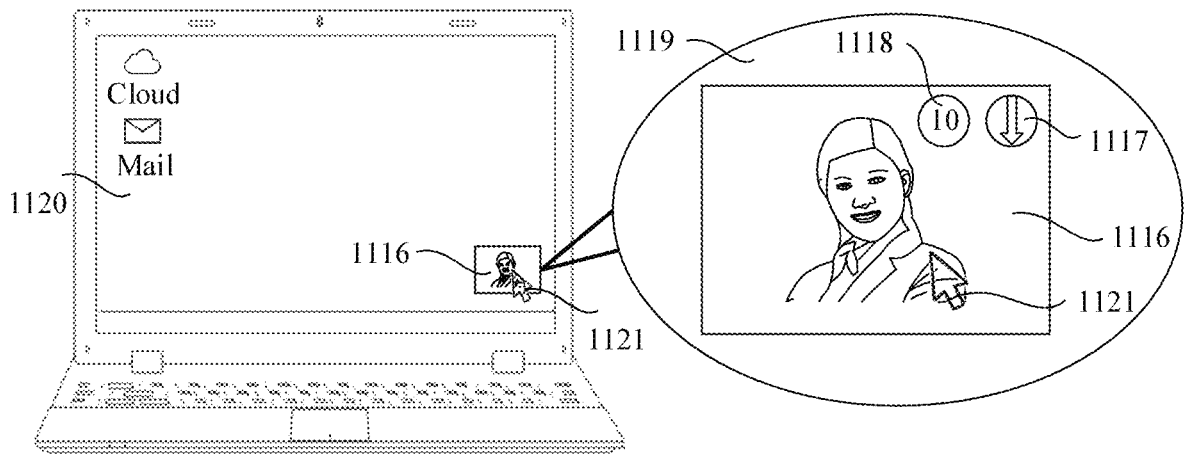

As shown in FIG. 11B, the personal computer (PC) 312 may receive a click operation performed by the user on the thumbnail in the notification box 1116. For example, the user uses a mouse to place a cursor 1121 on the thumbnail in the notification box 1116 to perform a left-mouse-button single click operation. The partial enlarged view 1119 of the notification box 1116 is shown in the figure. In this case, the personal computer (PC) 312 sends a thumbnail request message of the remaining picture other than the last picture to the mobile phone 310, and the mobile phone 310 sends a thumbnail of the remaining picture other than the last picture to the personal computer (PC) 312 in response to the thumbnail request message of the remaining picture other than the last picture.

Figure 11C:
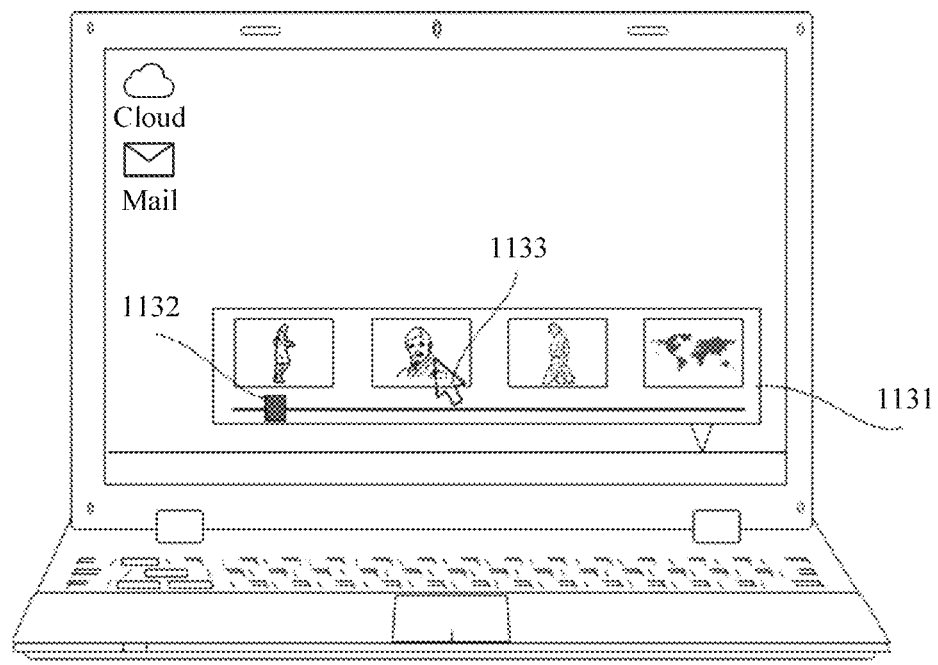

As shown in FIG. 11C, after receiving the thumbnail of the remaining picture other than the last picture, the personal computer (PC) 312 expands and displays a plurality of pieces of thumbnail information 1131 in combination with the received thumbnail of the last picture. An icon 1132 is a progress bar. The user may drag the progress bar leftward or rightward to view the remaining picture thumbnail that is not displayed. The user may perform a click operation on one of the plurality of pieces of thumbnail information. For example, the user may use the mouse to place a cursor 1133 on a thumbnail to perform a left-mouse-button single click operation. The personal computer (PC) 312 sends, to the mobile phone 310 in response to the single click operation performed by the user on the thumbnail, a request for an original picture corresponding to the thumbnail.

Figure 11D:
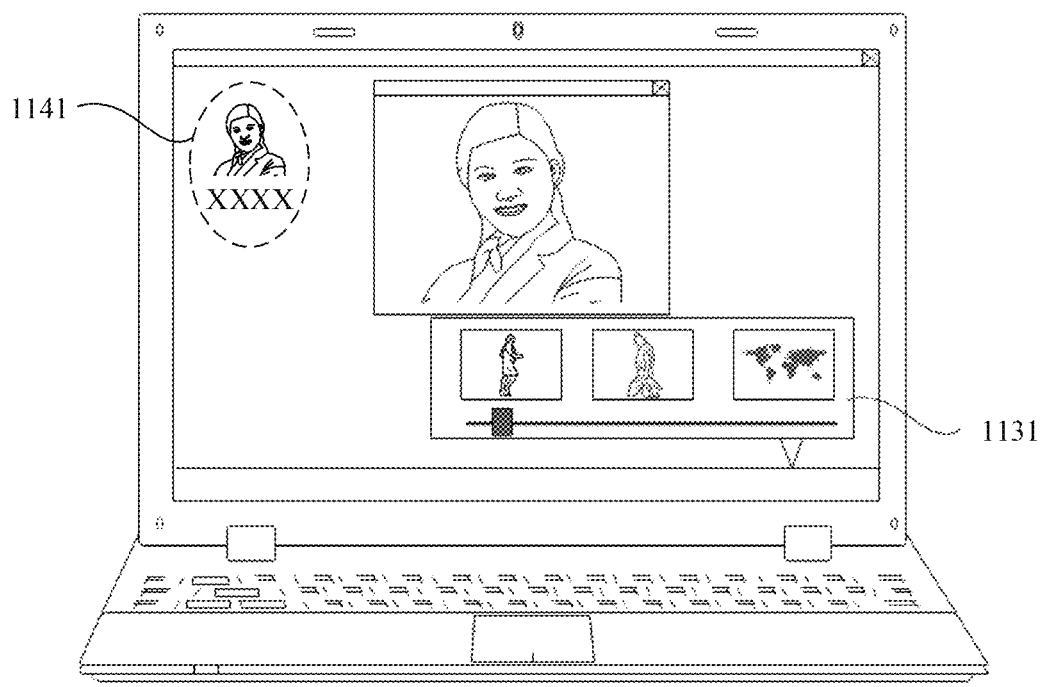

The mobile phone 310 sends an original picture to the personal computer (PC) 312 after receiving the request for the original picture. After receiving the original picture, the personal computer (PC) 312 invokes a photo viewer to open the original picture. As shown in FIG. 11D, the thumbnail that is just clicked and that is of the picture is deleted from an expanded thumbnail notification box 1131, the personal computer (PC) 312 is opening a folder that stores the original picture, and the folder shows an icon 1141 including the thumbnail of the picture and a file name of the picture.

Figure 11E:
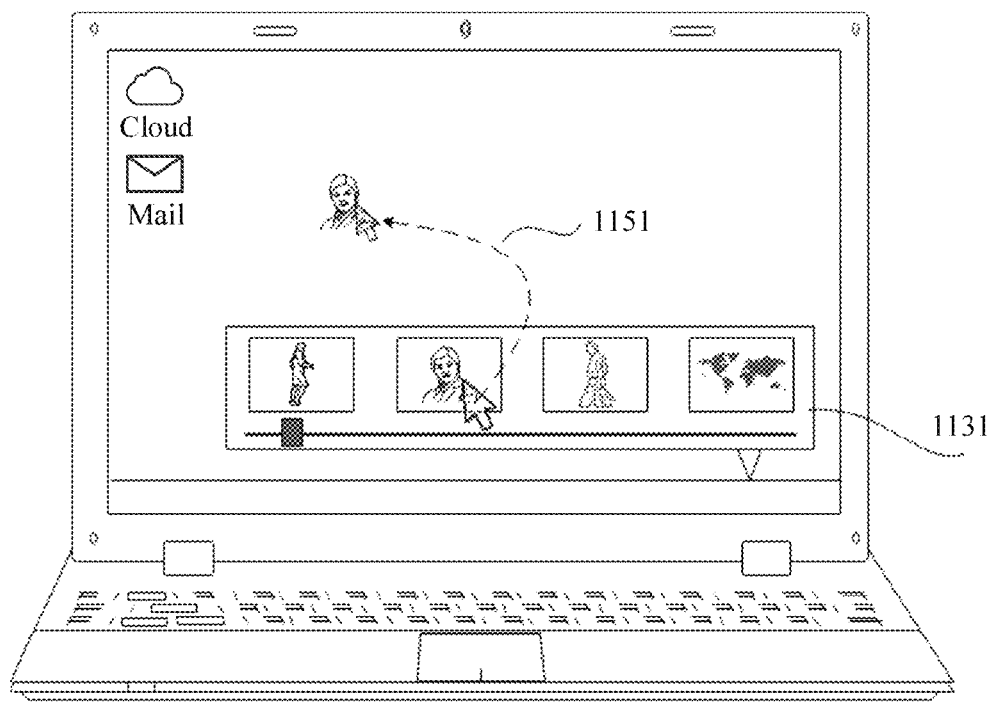
Figure 11F:
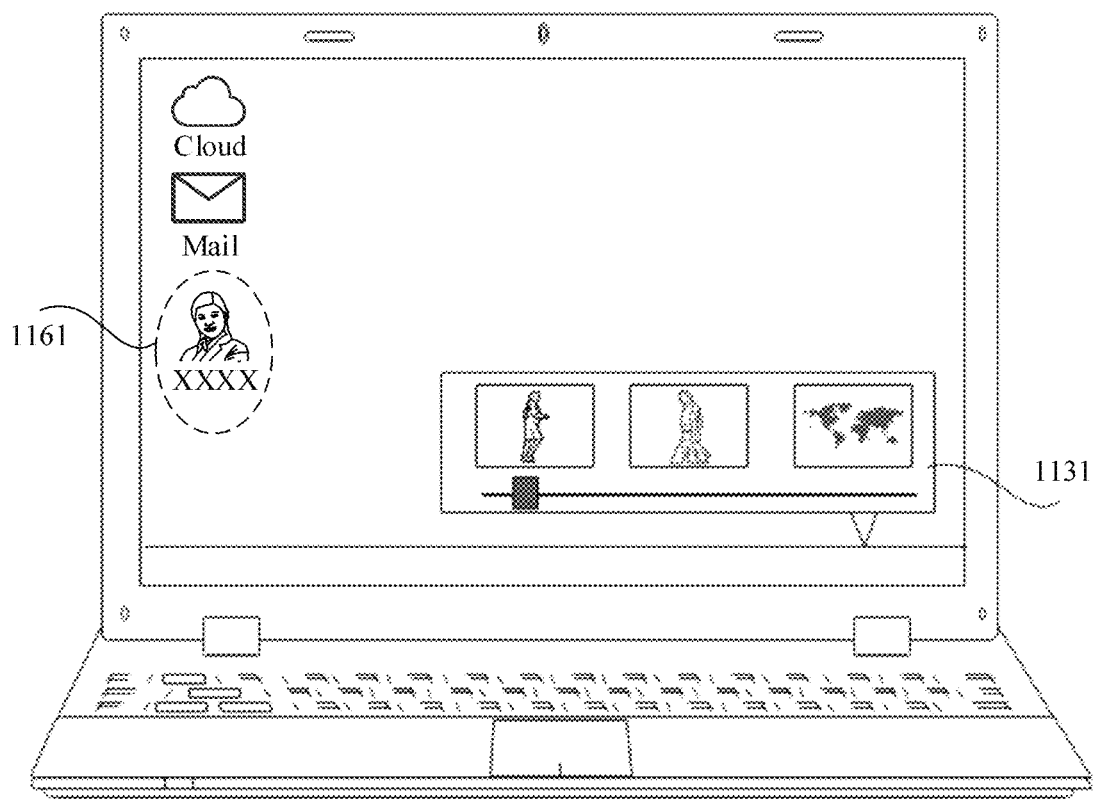

In some embodiments, after the personal computer (PC) 312 expands and displays the received thumbnails of the plurality of pictures, the user may drag one of the thumbnails to a target folder. As shown in FIG. 11E, the user may place a mouse cursor on a thumbnail, press and hold a left mouse button, and drag the thumbnail along a dashed-line track 1151 to the desktop (or another folder). The user drags the thumbnail to the desktop and then releases the left mouse button. In this case, the personal computer (PC) 312 sends an original picture request to the mobile phone 310, and the mobile phone 310 sends a corresponding original picture of the thumbnail to the personal computer (PC) 312 in response to the original picture request message. The personal computer (PC) 312 displays thumbnail information and file name information 1161 of the picture on the desktop. As shown in FIG. 11F, in this case, the thumbnail that is just dragged and that is of the picture is deleted from the expanded thumbnail notification box 1131. The user may view the picture by performing an operation such as double-clicking.

Figure 11G:
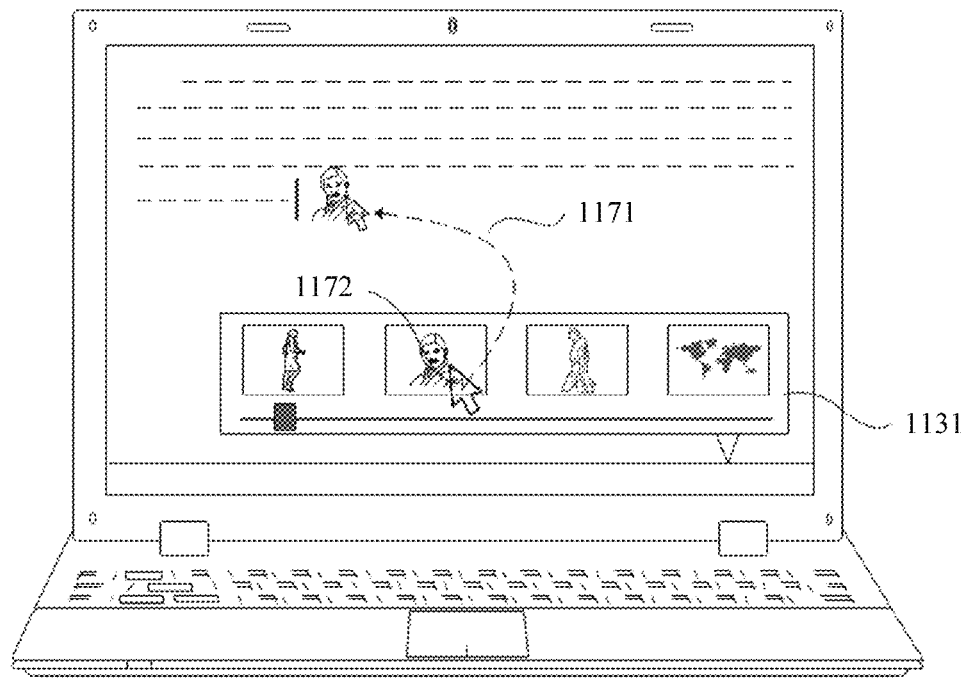

In some embodiments, after the personal computer (PC) 312 expands and displays the received thumbnails of the plurality of pictures, the user may drag one of the thumbnails to a target application, for example, a document editing program. As shown in FIG. 11G, the personal computer (PC) 312 displays the document editing program being enabled. In this case, the user may place a mouse cursor 1172 on a thumbnail, press and hold the left button, and drag the thumbnail along a dashed-line track 1171 to the document editing program. The user drags the thumbnail to a specific location of the document editing program and then releases the left mouse button. In this case, the personal computer (PC) 312 sends an original picture request to the mobile phone 310. The mobile phone 310 sends a corresponding original picture of the thumbnail to the personal computer (PC) 312 in response to the original picture request message. The personal computer (PC) 312 displays the original picture of the picture in a document editor. The user may perform a further operation on the picture subsequently.

Figure 11H:
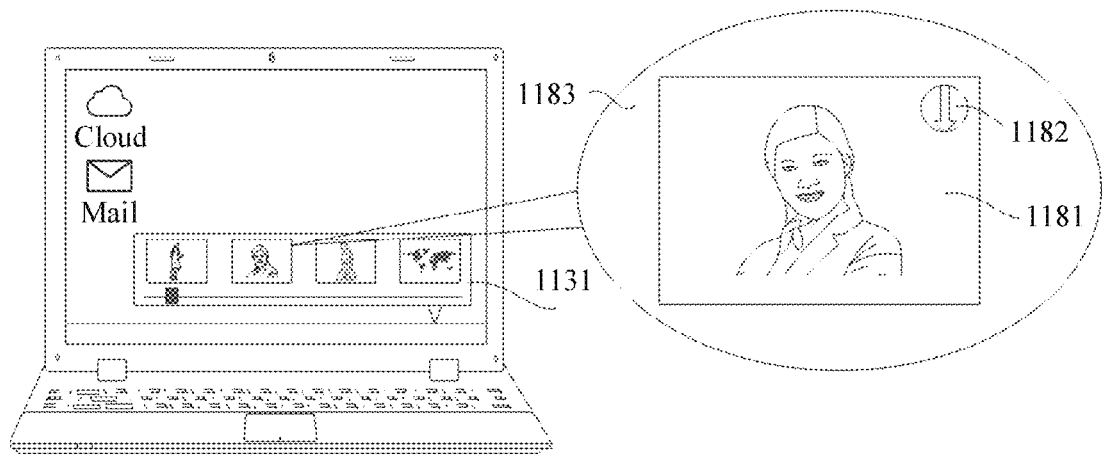

In some embodiments, after the personal computer (PC) 312 expands and displays the received thumbnails of the plurality of pictures, the user may perform a click operation on a download button in an upper right corner of one of the thumbnails. As shown in FIG. 11H, a partial enlarged view 1183 of one of the thumbnails is shown, and there is a download button 1182 in an upper right corner of the thumbnail. The user may click the download button 1182 in the upper right corner of the one of the thumbnails by using the mouse cursor. In this case, the personal computer (PC) 312 sends an original picture request to the mobile phone 310. The mobile phone 310 sends a corresponding original picture to the personal computer (PC) 312 in response to the original picture request message. The personal computer (PC) 312 stores the original picture in a default folder or a folder specified by the user.

Figure 11I:
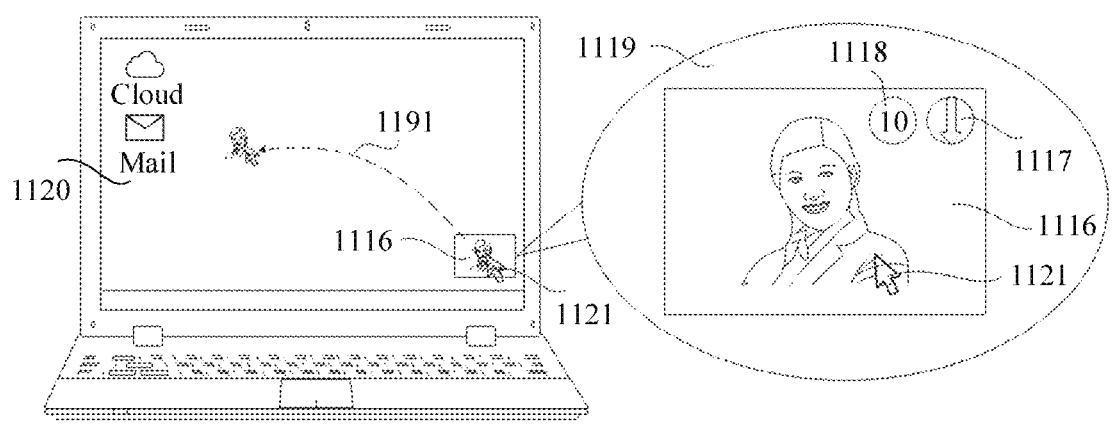

In some embodiments, after the personal computer (PC) 312 displays, on the desktop, the notification box 1116 that includes the total quantity of the pictures and the thumbnail of the last picture of the plurality of pictures, the user may directly perform a drag operation on the thumbnail in the notification box 1116. As shown in FIG. 11I, the user may place the mouse cursor 1121 on the thumbnail in the notification box 1116, press and hold the left button, and drag the thumbnail along a dashed-line track 1191 to the desktop (or another folder). In this case, the personal computer (PC) 312 sends an original picture request of the plurality of pictures to the mobile phone 310. The terminal sends a plurality of original pictures to the personal computer (PC) 312 in response to the original picture request message of all the pictures. The personal computer (PC) 312 automatically creates a folder on the desktop to store the plurality of received original pictures.

In some embodiments, after the personal computer (PC) 312 displays, on the desktop, the notification box 1116 that includes the total quantity of the pictures and the thumbnail of the last picture of the plurality of pictures, the user may directly perform a click operation on the download button 1117 (as shown in FIG. 11A-1 and FIG. 11A-2) in the upper right corner of the notification box 1116. The user may click the download button 1117 in the upper right corner of the notification box 1116 by using the mouse cursor. In this case, the personal computer (PC) 312 sends an original picture request of all the pictures to the mobile phone 310. The terminal sends a plurality of original pictures to the personal computer (PC) 312 in response to the original picture request message of all the pictures. The personal computer (PC) 312 may store the plurality of received original pictures in a specified folder or a default folder.

The embodiment in FIG. 11 is described by using photographing as an example. Transmission of a plurality of consecutive pictures is also applicable to application scenarios such as screen capture and scanning. An operation is similar to that in the foregoing embodiment. Details are not described herein again.

Figure 12:
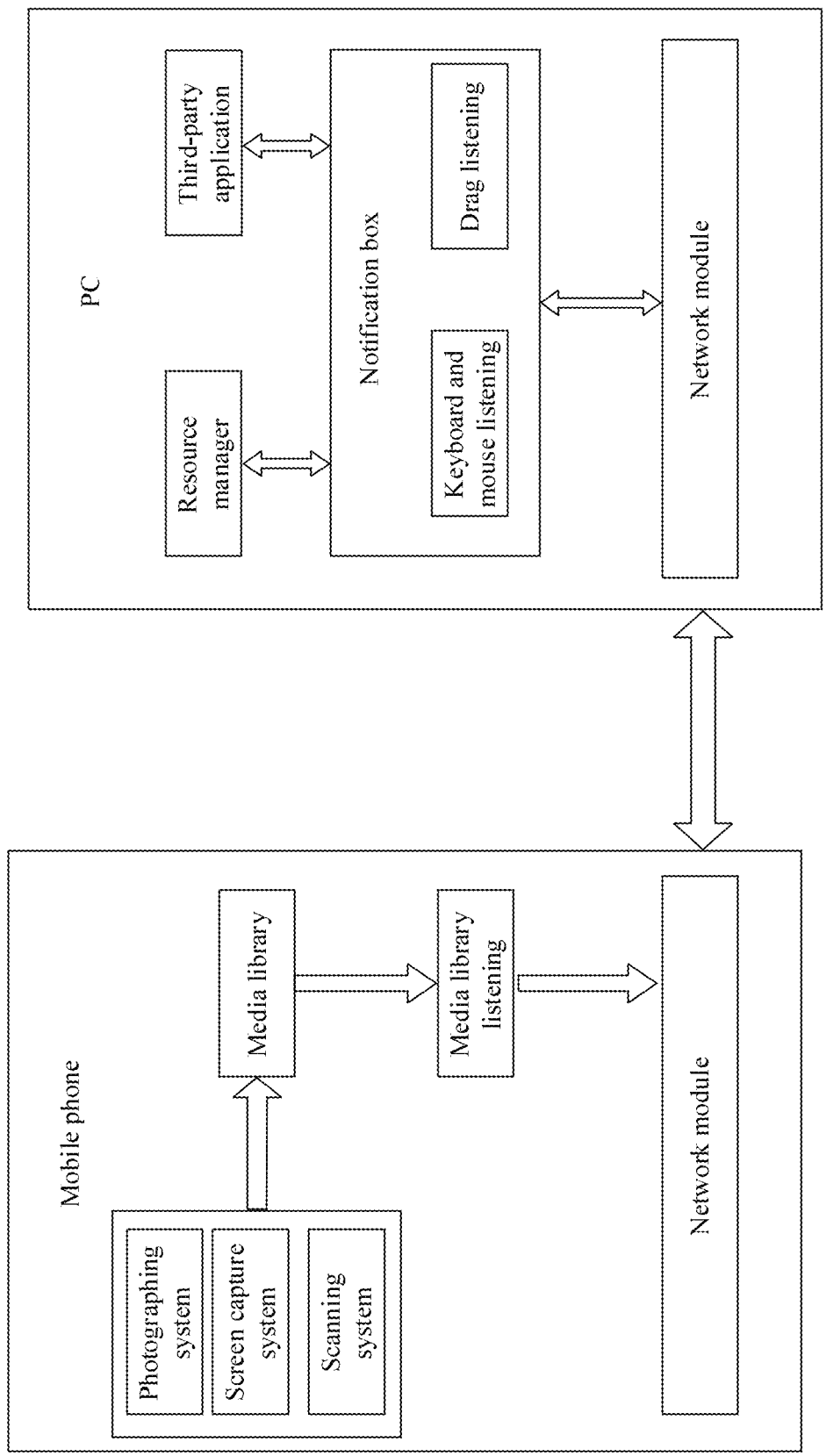
FIG. 12 is a diagram of a module architecture of a picture sharing system according to an embodiment of this application.

Based on the description of the foregoing embodiment, the following describes an underlying implementation in embodiments of this application with reference to a module architecture of a picture sharing system and message exchange between main modules in embodiments of this application. As shown in FIG. 12, an example in which a picture sending end is a mobile phone, and a picture receiving end is a personal computer (PC) is used for description.

The mobile phone mainly includes a photographing system, a screen capture system, a scanning system, a media library, a media library listening module, a network module, and the like. The photographing system mainly invokes a camera of the mobile phone to capture a static image or a video. A photosensitive material in the camera converts an optical signal into an electrical signal, and then transfers the electrical signal to an image signal processor (ISP) to convert the electrical signal into a digital image signal. Finally, the ISP generates a picture by using the digital image signal, and stores the picture in a memory of the mobile phone. An application processor in the screen capture system mainly collects content on a display of the mobile phone in response to an operation of a user, generates a picture, and stores the picture in the memory of the mobile phone. The scanning system mainly invokes the camera of the mobile phone to collect an image of a paper file, and an internal software algorithm of the mobile phone crops or corrects the collected image. The media library is mainly used to manage files such as a picture and a video in the mobile phone, may implement functions such as displaying the picture and playing the video to the user, and may also share the files such as the picture and the video in combination with other software. The network module mainly implements a function of communicating with an external device by using hardware such as Bluetooth or Wi-Fi in the mobile phone, for example, transferring a file. The media library listening module mainly implements functions such as automatically notifying another device of a newly added picture in the media library and sending a picture in this embodiment of this application. The photographing system, the screen capture system, the scanning system, the media library, and the network module are built in an operating system of the mobile phone, and the media library listening module is a newly added module in the technical solutions in this embodiment of this application.

The personal computer (PC) mainly includes a resource manager, a third-party application, a notification box module, a network module, and the like. The resource manager is configured to manage various file resources stored in the personal computer (PC), for example, display specific file information to the user in a list manner. The third-party application mainly refers to various applications installed in the personal computer (PC), for example, a document editing program and an instant messaging program. The network module mainly implements a function of communicating with an external device by using hardware such as Bluetooth or Wi-Fi in the PC, for example, transferring a file. The notification box module mainly implements a function of receiving a picture in this embodiment of this application, for example, drawing a notification box, responding to operations such as mouse clicking and dragging of the user, and requesting a picture. The resource manager, the third-party application, and the network module are built in an operating system of the PC, and the notification box module is a newly added module in the technical solutions in this embodiment of this application.

To implement a function in this embodiment of this application, the mobile phone needs to implement a media library listening function. Specifically, the mobile phone registers a callback function by using a media library interface, and invokes the callback function when detecting that a file is newly added to the media library. The callback function recognizes whether the file newly added to the media library is from the photographing system, the screen capture system, or the scanning system. For example, it may be determined by checking whether a file name of the newly added file includes a specific keyword. For example, in an Android system, a file name of a picture obtained through photographing includes a Camera field, a file name of a picture obtained through screen capture includes a Screenshorts field, and a file name of a picture obtained through scanning includes a Scanning field. After it is determined that the newly added file is from the photographing system, the screen capture system, or the scanning system, a message is sent to notify another device that meets a specific condition, that there is a picture to be received. Alternatively, whether the file newly added to the media library is from the photographing system, the screen capture system, or the scanning system may be determined in another manner. This is not limited in this application.

To implement the functions such as the mouse clicking and dragging in the notification box of the personal computer (PC) in this embodiment of this application, a notification box function needs to be implemented. Specifically, the notification box of the personal computer (PC) is an application window for displaying a thumbnail, and may include a button for an operation (for example, opening or downloading). A function such as opening or downloading an original picture are implemented by listening to a click event for the button and a drag action for the window. Different operating systems use different system functions and interfaces. For example, a Windows operating system uses a CButton interface of the Microsoft Foundation Class (MFC) Library and a DoDragDrop method of a window to listen to the click event for the button and the drag event for the window.

Figure 13A:
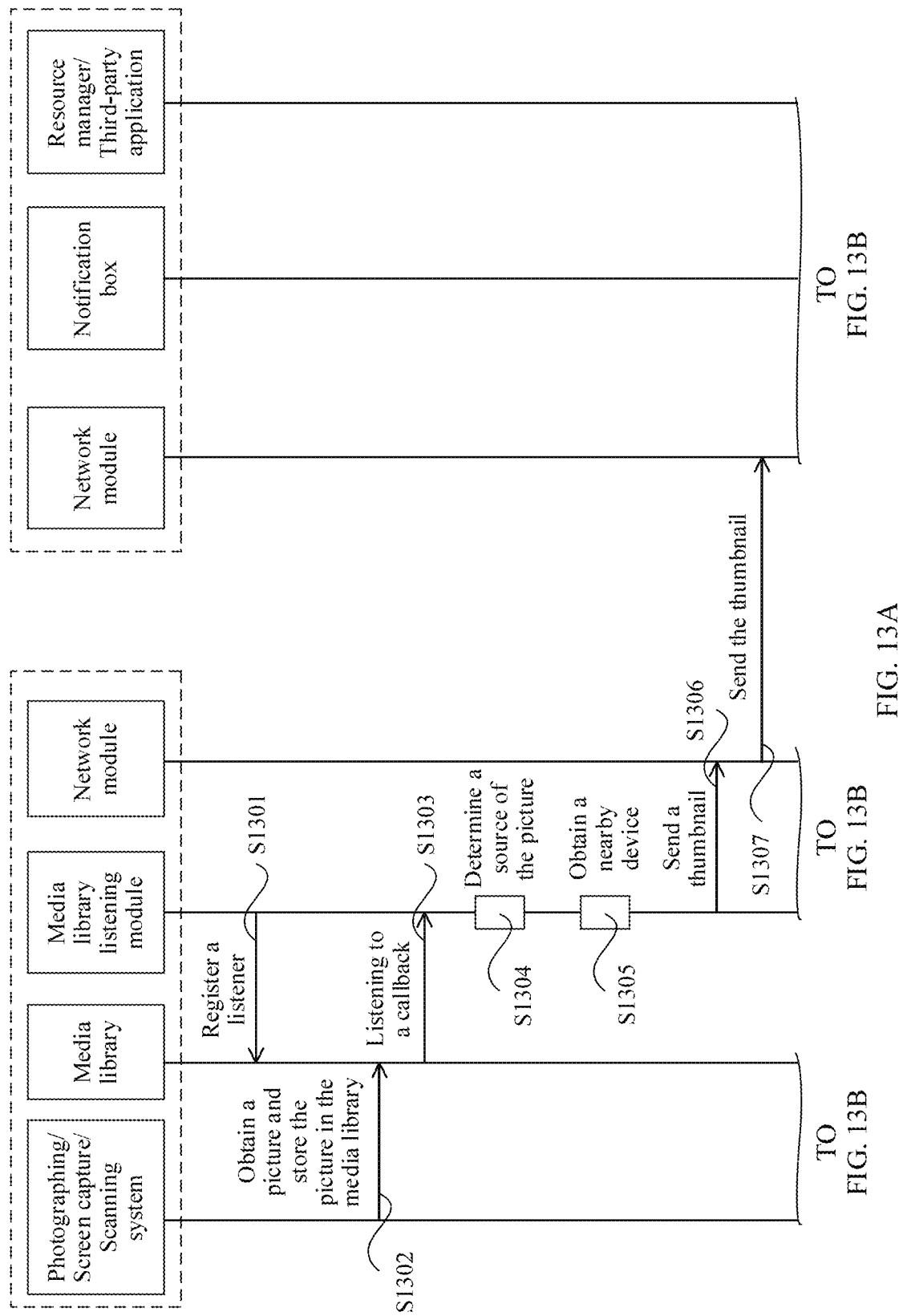

FIG. 13A and FIG. 13B show a procedure of message exchange between main modules in a mobile phone end and a personal computer (PC) end, and specifically include the following steps.

S1301: A media library listening module of the mobile phone registers a listening task with a media library. When the media library detects a newly added file, the media library notifies the media library listening module to process the file. An Android system is used as an example. A callback function may be implemented by using an onChange interface of a ContentObserver media library interface when the file is newly added to the media library.

S1302: The mobile phone invokes a photographing/screen capture/scanning program to obtain a picture, and stores the picture in the media library.

S1303: After detecting that there is a newly added picture, the media library of the mobile phone invokes a corresponding callback function for processing. The Android system is used as an example. The onChange interface is invoked for processing, and a processing function in this embodiment of this application is newly added to the onChange interface.

S1304: The media library listening module of the mobile phone determines whether a source of the newly added picture is a photographing system, a screen capture system, or a scanning system. The source of the newly added picture may be obtained by performing rule determining based on a file name. In the Android system, a file handle transferred by using the onChange interface may be used to obtain a specific file name. Then, whether the newly added file is from the photographing system, the screen capture system, or the scanning system is determined by determining whether the file name includes a Camera, Screenshorts, or Scanning field.

S1305: If the mobile phone determines that the newly added picture is from the photographing system, the screen capture system, or the scanning system, the mobile phone invokes an interface of another module to obtain information about a device that is logged in to by using a same ID in a near field connection state. How the Android system obtains the information about the device that is logged in to by using the same ID in the near field connection (for example, a Wi-Fi connection) state is used as an example. The mobile phone may obtain a public key corresponding to a current account, encrypt the current account by using the public key, and then invoke an interface of a network module to send an encrypted account ciphertext to the device in the near field connection. The device in the near field connection decrypts the received account ciphertext, and if the decryption succeeds, the device replies a response message to the mobile phone to indicate that the device and the mobile phone are logged in with the same account. Alternatively, the information about the device that is logged in to by using the same ID may be obtained in another manner. This is not specifically limited herein.

S1306: The media library listening module of the mobile phone invokes the interface provided by the network module, to send a thumbnail of a latest picture to another device. The another device is the device that is just obtained and that is logged in to by using the same ID in the near field connection state.

S1307: The network module of the mobile phone sends the thumbnail of the picture to a network module of a personal computer (PC) by using a universal network socket interface.

S1308: After receiving the thumbnail of the picture, the network module of the personal computer (PC) sends the thumbnail of the picture to a notification box module. After the notification box module detects a user interaction event by using an interaction event response interface registered with an operating system, the notification box module draws a thumbnail notification box. For example, a Windows operating system uses a MessageBox interface of the Microsoft Foundation Class (MFC) Library to display a notification box.

S1309: After detecting an operation performed by a user on the drawn notification box, the operating system of the personal computer (PC) invokes a processing function corresponding to the notification box module for processing. For example, the user clicks a thumbnail in the notification box, and the corresponding processing function invokes an interface of the network module to send an original picture request message to the mobile phone. The Windows operating system is used as an example. A CButton interface of the Microsoft Foundation Class (MFC) Library and a DoDragDrop method of a window may be used to register the processing function to implement a specific operation.

S1310: The network module of the personal computer (PC) sends the original picture request message to the network module of the mobile phone by using the universal network socket interface. A specific thumbnail handle is encapsulated in the original picture request message. After receiving the original picture request message, the mobile phone may find a corresponding original picture based on the thumbnail handle in the message.

S1311: The network module of the mobile phone sends the original picture request message to the media library listening module.

S1312: The media library listening module of the mobile phone parses the corresponding original picture request message, extracts the thumbnail handle from the original picture request message, obtains a corresponding original picture from the media library based on the thumbnail handle, and then invokes the interface of the network module to send the original picture to the personal computer (PC).

S1313: The network module of the mobile phone sends the original picture to the network module of the personal computer (PC) by using the universal network socket interface.

S1314: After receiving the original picture, the network module of the personal computer (PC) sends the original picture to the notification box module.

S1315: The notification box module of the personal computer (PC) inserts the original picture into a third-party application based on an operation of the user, or invokes a photo viewer to open and display the original picture.

Optionally, in step S1307 in the message exchange procedure of the foregoing modules, the mobile phone may send, to the personal computer (PC) by using the socket interface of the network module, a "picture to be received" message. After the notification box module of the personal computer (PC) detects a user interaction event by using an interaction event response interface registered with an operating system, the notification box module invokes the socket interface of the network module to send a thumbnail request to the mobile phone. After receiving the thumbnail request, the media library listening module of the mobile phone sends a thumbnail to the personal computer (PC). A subsequent procedure is the same as the foregoing message exchange procedure.

In embodiments of this application, the personal computer (PC) is used as a picture receiving end. Certainly, in the embodiments of this application, another type of device, for example, a mobile phone, a television (TV), or a tablet computer (PAD), may alternatively be used as a picture receiving end. A mobile phone using an Android system is used as an example. For example, the mobile phone 311 is used as a picture receiving end. The mobile phone 310 is used as a picture sending end. After taking a picture, the mobile phone 310 sends thumbnail information to the mobile phone 311. The mobile phone 311 detects a screen turning-on or screen sliding operation. A notification box module of the mobile phone 311 invokes an interface of a notification module in the Android system to display, to the user, a notification message that a new picture is received. The thumbnail information may be displayed to the user in the notification information. After the user taps the notification message, the mobile phone 311 sends an original picture request message to the mobile phone 310, and the mobile phone 310 sends an original picture to the mobile phone 311 in response to the original picture request message. After receiving the original picture, the mobile phone 311 invokes an album program to open the picture. If the user does not tap the notification message of the new picture within a period of time, the notification message is automatically hidden. Subsequently, the user may find the notification message in a notification center of the mobile phone 311 to continue performing an operation.

In embodiments of this application, the mobile phone is used as a picture sending end. Certainly, in the embodiments of this application, another device, for example, a personal computer (PC), a television (TV), or a tablet computer (PAD) may alternatively be used as a picture sending end. For example, the personal computer (PC) 312 on which a Microsoft operating system is installed is used as a picture sending end, and the mobile phone 310 on which an Android system is installed is used as a picture receiving end. The personal computer (PC) 312 may obtain a screenshot in response to a screen capture operation of the user. A media library listening module in the personal computer (PC) 312 registers a callback function by using the Microsoft Foundation Class (MFC) Library. After detecting that a picture file is added to a folder, a resource manager invokes the callback function to send a thumbnail of a picture to the mobile phone 310. The mobile phone 310 detects a screen turning-on or screen sliding operation. A notification box module of the mobile phone 310 invokes an interface of a notification module in the Android system to display, to the user, a notification message that a new picture is received. Thumbnail information may be displayed to the user in the notification information. After the user taps the notification message, the mobile phone 310 sends an original picture request message to the personal computer (PC) 312, and the personal computer (PC) 312 sends an original picture to the mobile phone 310 in response to the original picture request message. After receiving the original picture, the mobile phone 310 invokes an album program to open the picture.

Figure 14:
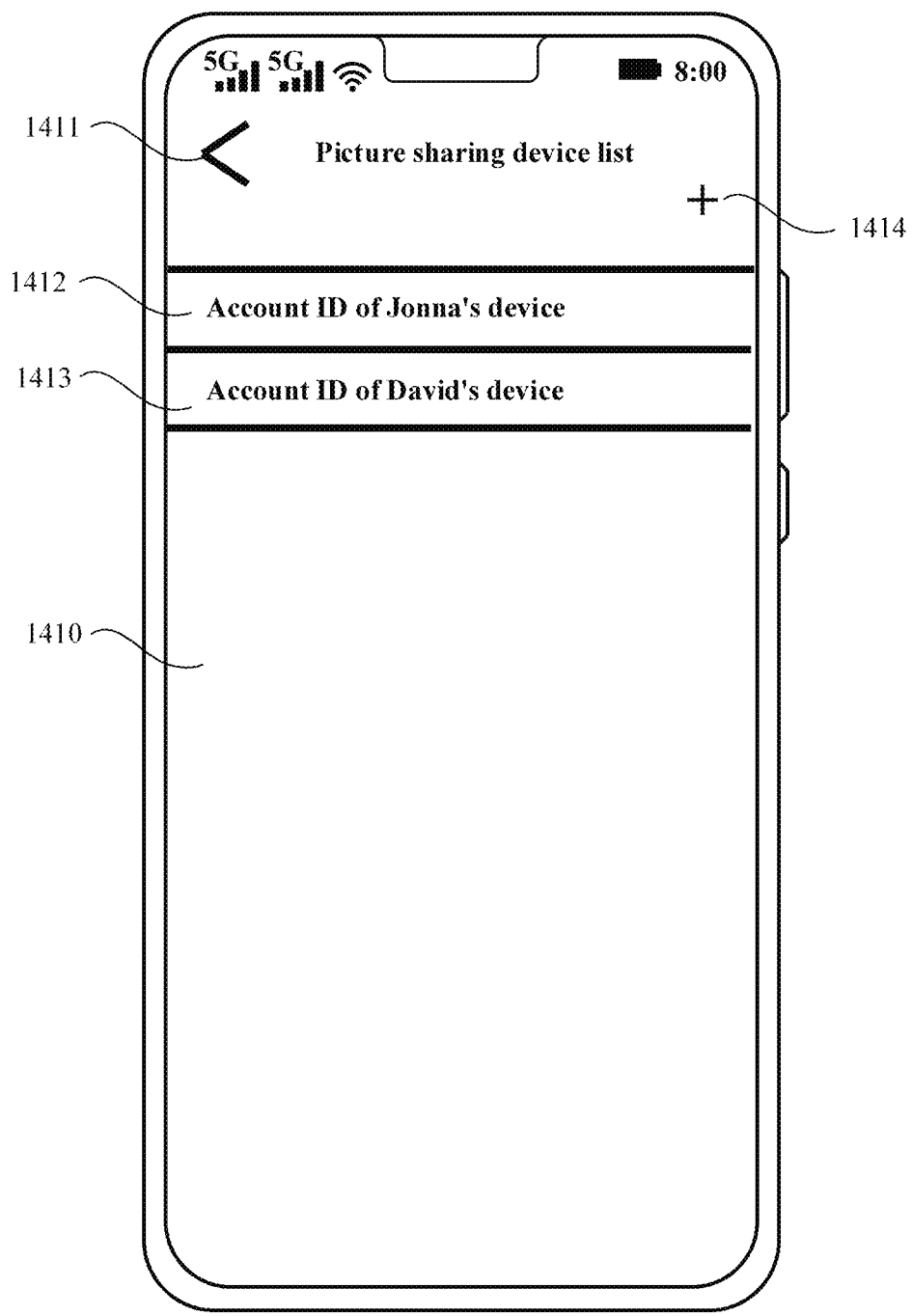
FIG. 14 is a UI diagram of settings of a picture sharing list according to an embodiment of this application.

In embodiments of this application, that the mobile phone 310 is logged in to by using the same ID as the mobile phone 311 and the personal computer (PC) 312 is used as an example. In embodiments of this application, picture transmission between devices logged in to by using different IDs (for example, Huawei account IDs) is also supported. A picture sharing device list may be set on the mobile phone 310 for picture transmission in embodiments of this application. For example, an ID of the mobile phone 311 and an ID of the personal computer (PC) 312 are set as a list of picture sharing devices to which the mobile phone 310 shares a picture. FIG. 14 is a settings screen 1410 for a picture sharing device list of a mobile phone 310. The settings screen 1410 includes a back button 1411, ID information 1412 of a target picture sharing device, ID information 1413 of a target picture sharing device, and a picture sharing device adding button 1414. The back button 1411 may be triggered to back to a previous-level settings menu interface, and the picture sharing device adding button 1414 may be triggered to add a picture sharing device. A media library listening module in the mobile phone 310 may obtain information about the picture sharing device list by using an interface provided by a setting module in the mobile phone. In this way, when the mobile phone 311, the personal computer (PC) 312, and the mobile phone 310 are in a near field connection state, the mobile phone 310 may share, with the mobile phone 311 and the personal computer (PC) 312, a picture obtained through photographing, scanning, or screen capture. In this way, the user may customize a picture sharing device list, and share a picture to a specified device. This improves user experience.

Embodiments of this application may further include another implementation. For example, after obtaining a picture through photographing, scanning, or screen capture, a first device directly sends an original picture to a second device, and the second device may also be configured to perform some default operations after receiving the picture, for example, directly open and display the picture.

In embodiments of this application, in addition to picture sharing, the embodiments of this application may further include another implementation, for example, may be applied to sharing of a video or a short video. For example, the mobile phone 310 using the Android system is used as a video sending end, and the personal computer (PC) 312 using the Microsoft operating system is used as a video receiving end. The mobile phone 310 uses a Camera for photographing to obtain a video, and the media library listening module of the mobile phone 310 registers a callback function by using a media library interface. When a file is newly added to a media library, the callback function is invoked to determine whether the file is a video file, which may be implemented by determining whether a file name of the newly added file includes a keyword. If it is determined that the newly added file is a video file, a corresponding thumbnail of the video is sent to the personal computer (PC) 312. The personal computer (PC) 312 detects a user interaction event and displays a thumbnail notification of the video to the user. The personal computer (PC) 312 sends a video file request message to the mobile phone 310 in response to clicking performed by the user on the thumbnail of the video. The mobile phone 310 sends a video file to the personal computer (PC) 312 in response to the video file request message.

Figure 15A:
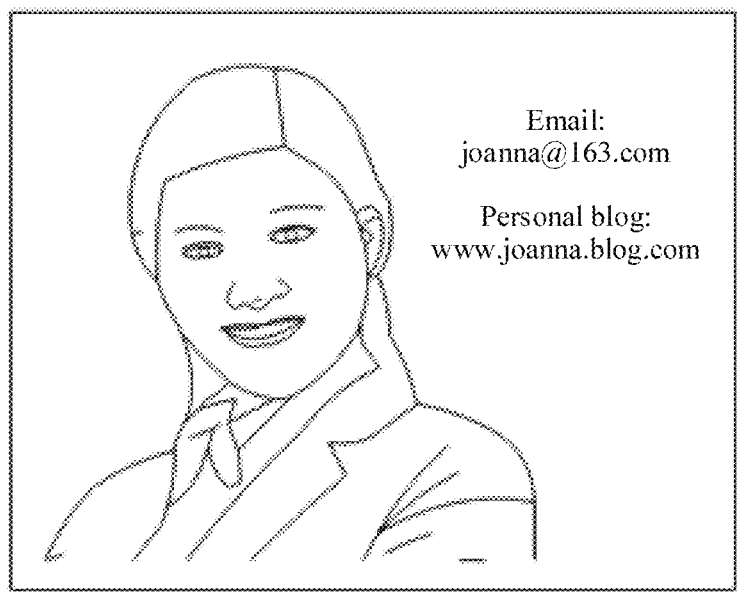
FIG. 15A to FIG. 15B are a schematic diagram of a content sharing method according to an embodiment of this application.
Figure 15B:
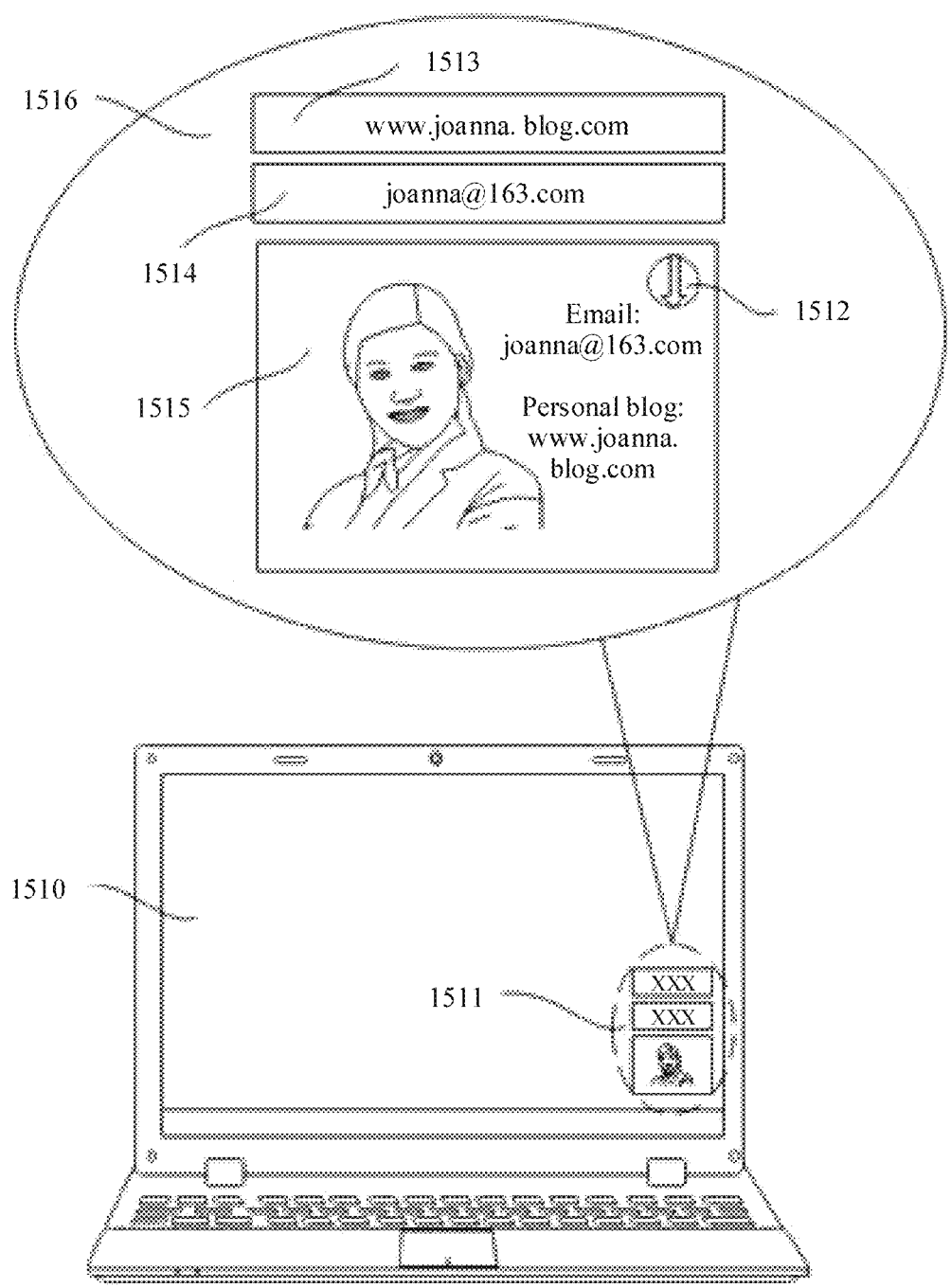

Embodiments of this application may further include another implementation. In combination with some picture recognition technologies, after obtaining a picture, the first device may extract some key information, for example, an email address and a website link, by using the picture recognition technology, and then share the key information with the second device. The first device scans a poster by using a scanning program to obtain a picture. As shown in FIG. 15A, the picture includes a portrait, an email address, and a personal blog address, where the email address is joanna@163.com, and the personal blog address is www.joanna.blog.com. After obtaining the picture, the first device extracts the email address and the personal blog address from the picture by using a picture recognition technology, packs a thumbnail of the picture, a text of the email address, and a text of the personal blog address into a message, and sends the message to the second device. After detecting an interaction event, the second device displays a notification box to the user. The personal computer (PC) 312 is used as an example. As shown in FIG. 15B, a thumbnail notification box 1511 is displayed in a lower right corner of a desktop interface 1510 of the personal computer (PC) 312. FIG. 15B shows a partial enlarged view 1516 of a thumbnail notification box 1511. The thumbnail notification box 1511 includes a thumbnail 1515, a personal blog card address card 1513, an email address card 1514, and a download button 1512. The user may click the personal blog address card 1513 to conveniently access a personal blog, and may further click the email address card 1514 to perform an operation such as email sending. In this way, key information in the picture is extracted and sent to another device that needs the information, to facilitate an operation of the another device. This can improve user experience.

Embodiments of this application may further include another implementation. A website of a web page that is being browsed may be shared with another device. For example, the first device is browsing a web page by using a browser. In this case, the first device extracts a website of the browser in response to a specific gesture operation (for example, consecutively tapping a screen three times) of the user. Then, the website is sent to another device by using an interface of a network module. After detecting an interaction event, the another device draws a notification card. Content in the card is a link to the website, and the user may continue to browse the web page on the another device. In this way, the website that is being browsed is quickly shared with another device that needs the website, so that the web page can continue to be browsed on the another device. This can improve user experience.

Embodiments of this application may further include another implementation. A file that is just downloaded and that is on a terminal device may be shared with another device. For example, the first device is downloading an e-book file by using a browser. A media library listening module registers a callback function with a resource manager to listening to a change of a file in a folder. When a file is newly added to the folder, the callback function is triggered to send a file name of the file to another device by using a network module. The another device draws a notification card after detecting an interaction event. Content in the notification card is the file name of the file. The user may tap the notification card to request the file from the first device. In this way, the device can quickly share just downloaded content with the another device that needs to use the content. This can improve user experience.

Based on the description of the foregoing plurality of embodiments, the solutions in embodiments of this application can be used for content sharing, for example, sharing when a new picture is obtained through photographing, scanning, or screen capture, and sharing when a new file is obtained through downloading, and may also be used for sharing of key information in combination with a picture recognition technology. In the sharing method, a sending device does not need to perform another operation, and a receiving device needs to detect an interaction event to see a notification of content. This improves purposefulness and efficiency of content sharing, and improves user experience.

Figure 16:
FIG. 16 is a diagram of a module architecture of a content sharing apparatus according to this application.

An embodiment of this application provides a content sharing apparatus. As shown in FIG. 16, the content sharing apparatus is disposed on a first terminal, and the content sharing apparatus includes: a generation unit, configured to detect a first operation and generate first content; and a sending unit, configured to send a first message to a second terminal in response to the generated first content. The first terminal and the second terminal are in a near field connection state, and the first terminal and the second terminal have a predetermined association relationship. The first message enables the second terminal to display a first prompt when the second terminal detects a second operation. The first prompt is a prompt for the first content. The sending unit is further configured to send the first content to the second terminal in response to a second message. The second message is a message sent by the second terminal to the first terminal after the second terminal detects a third operation on the first prompt.

Figure 17:
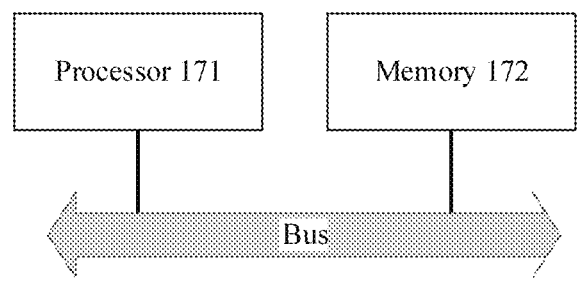
FIG. 17 is a schematic diagram of a structure of a picture transmission apparatus according to an embodiment of this application.

An embodiment of this application provides a first terminal. As shown in FIG. 17, the first terminal 170 includes one or more processors 171 and one or more memories 172, the one or more memories 172 store one or more computer programs, and the one or more computer programs include instructions. When the instructions are run by the one or more processors 171, the technical solutions in the foregoing embodiments are performed. Implementation principles and technical effects thereof are similar to those in the foregoing method embodiments, and details are not described herein again.

An embodiment of this application provides a content sharing system, including a first terminal and a second terminal. The first terminal and the second terminal are in a near field connection state. The system is configured to perform the technical solutions of content sharing in the foregoing embodiments. Implementation principles and technical effects thereof are similar to those in the foregoing method embodiments, and details are not described herein again.

An embodiment of this application provides a computer program product. When the computer program product runs on a first terminal, the first terminal is enabled to perform the technical solutions in the foregoing embodiments. Implementation principles and technical effects thereof are similar to those in the foregoing method embodiments, and details are not described herein again.

An embodiment of this application provides a readable storage medium. The readable storage medium includes instructions. When the instructions are run on a first terminal, the first terminal is enabled to perform the technical solutions in the foregoing embodiments. Implementation principles and technical effects thereof are similar, and details are not described herein again.

An embodiment of this application provides a chip. The chip is configured to execute instructions. When the chip runs, the technical solutions in the foregoing embodiments are performed. Implementation principles and technical effects thereof are similar, and details are not described herein again.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by a combination of hardware and a software module in the processor.

In embodiments of this application, the memory may be a nonvolatile memory such as a hard disk drive (hard disk drive, HDD) or a solid-state drive (solid-state drive, SSD), or may be a volatile memory (volatile memory) such as a random access memory (random access memory, RAM). The memory is any other medium that can carry or store expected program code in a form of an instruction structure or a data structure and that can be accessed by a computer, but is not limited thereto.

The memory in embodiments of this application may alternatively be a circuit or any other apparatus that can implement a storage function, and is configured to store program instructions and/or data. The methods in embodiments of this application may be all or partially implemented by using software, hardware, firmware, or any combination thereof When software is used to implement the embodiments, the embodiments may be all or partially implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, a network device, user equipment, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A system for content sharing, comprising:
a first terminal comprising a first memory storing first programming instructions and a first processor executing the first programming instructions to cause the first terminal to communicate with a second terminal via a near field connection, wherein the second terminal comprises a second memory storing second programming instructions and a second processor executing the second programming instructions,
wherein the first terminal is configured to:
generate a first picture in response to detecting a first operation;
send, to the second terminal via the near field connection, a first message comprising a thumbnail of the first picture to indicate the second terminal to display a first prompt that comprises the thumbnail of the first picture;
wherein the second terminal is configured to:
display the thumbnail in a thumbnail notification box;
when the second terminal detects a second operation regarding the thumbnail performed on the notification box within a period of time, sending a second message corresponding to the second operation;
when the second terminal detects no second operation performed on the thumbnail notification box within the period of time, stop displaying the thumbnail notification box, provide a thumbnail notification in a notification bar of the second terminal, and send a fourth message corresponding to a fourth operation regarding the thumbnail performed on a notification bar expansion window;
wherein the first terminal is further configured to:
receive, from the second terminal, the second message or the fourth message; and
send the first picture to the second terminal in response to the second message.

2. The system according to claim 1, wherein the second terminal is configured to receive one or more second thumbnails of one or more second pictures from the first terminal prior to receiving the first thumbnail within a first time range, and display the first thumbnail in the thumbnail notification box without displaying the one or more second thumbnails in the thumbnail notification box.

3. The system according to claim 1, wherein the second operation comprises a detected tap operation on the thumbnail, a detected tap operation on a download button of a thumbnail notification box comprising the thumbnail, or a detected drag operation on the thumbnail.

4. The system according to claim 1, wherein the second terminal is configured to display the thumbnail in the thumbnail notification box, receive a third message from the first terminal with the third message received after the first message is received and comprising a thumbnail of a second picture and display the thumbnail of the second picture in the same thumbnail notification box.

5. The system according to claim 1, wherein the first picture is from a photographing application, a scanning application, or a screen capture application.

6. The system according to claim 1, wherein the near field connection comprises a Bluetooth connection or a Wi-Fi connection.

7. A second terminal, comprising:
at least one processor; and
a memory coupled to the at least one processor and configured to store programming instructions that, when executed by the at least one processor, cause the second terminal to:
receive, from a first terminal via a near field connection, a first message comprising a thumbnail of the first picture to indicate the second terminal to display a first prompt that comprises a thumbnail of a first picture;
display the thumbnail in a thumbnail notification box;
when the second terminal detects a first operation regarding the thumbnail performed on the thumbnail notification box within a period of time, send, to the first terminal, a second message corresponding to the first operation;
when the second terminal detects no first operation performed on the thumbnail notification box within the period of time, stop displaying the thumbnail notification box, provide a thumbnail notification in a notification bar of the second terminal, and send, to the first terminal, a third message corresponding to a third operation performed on the thumbnail in the notification bar; and receive the first picture from the first terminal in response to the second message or the third message.

8. The second terminal according to claim 7, wherein the second terminal is configured to receive one or more second thumbnails of one or more second pictures from the first terminal prior to receiving the first thumbnail within a first time range, and display the first thumbnail in the thumbnail notification box without displaying the one or more second thumbnails in the thumbnail notification box.

9. The second terminal according to claim 7, wherein the first picture is from a photographing application, a scanning application, or a screen capture application.

10. The second terminal according to claim 7, wherein the near field connection comprises a Bluetooth connection or a Wi-Fi connection.

11. A non-transitory computer readable medium storing programming instructions for execution by a processor of a second terminal, the programming instructions including instructions for:
receiving, from a first terminal via a near field connection, a first message comprising a thumbnail of the first picture to indicate the second terminal to display a first prompt that comprises a thumbnail of a first picture;
displaying the thumbnail in a thumbnail notification box;
when the second terminal detects a first operation regarding the thumbnail performed on the thumbnail notification box within a period of time, sending, to the first terminal, a second message corresponding to the first operation;
when the second terminal detects no first operation performed on the thumbnail notification box within the period of time, stopping displaying the thumbnail notification box, providing a thumbnail notification in a notification bar of the second terminal, and sending, to the first terminal, a third message corresponding to a third operation performed on the thumbnail in the notification bar; and
receiving the first picture from the first terminal in response to the second message or the third message.

12. The non-transitory computer readable medium according to claim 11, wherein the programming instructions including instructions for:
receiving one or more second thumbnails of one or more second pictures from the first terminal prior to receiving the first thumbnail within a first time range, and
displaying the first thumbnail in the thumbnail notification box without displaying the one or more second thumbnails in the thumbnail notification box.

13. The non-transitory computer readable medium according to claim 11, wherein the first picture is from a photographing application, a scanning application, or a screen capture application.

14. The non-transitory computer readable medium according to claim 11, wherein the near field connection comprises a Bluetooth connection or a Wi-Fi connection.

* * * * *